(12) United States Patent
Sakurai et al.

(10) Patent No.: US 8,319,476 B2
(45) Date of Patent: Nov. 27, 2012

(54) BATTERY STATE MONITORING CIRCUIT AND BATTERY DEVICE

(75) Inventors: Atsushi Sakurai, Chiba (JP); Kazuaki Sano, Chiba (JP)

(73) Assignee: Seiko Instruments Inc., Chiba (JP)

( * ) Notice: Subject to any disclaimer, the term of this patent is extended or adjusted under 35 U.S.C. 154(b) by 274 days.

(21) Appl. No.: 12/667,979

(22) PCT Filed: Jul. 3, 2008

(86) PCT No.: PCT/JP2008/062025
§ 371 (c)(1),
(2), (4) Date: Nov. 4, 2010

(87) PCT Pub. No.: WO2009/008314
PCT Pub. Date: Jan. 15, 2009

(65) Prior Publication Data
US 2011/0037432 A1   Feb. 17, 2011

(30) Foreign Application Priority Data

Jul. 6, 2007 (JP) ................................ 2007-178834
Jan. 17, 2008 (JP) ................................ 2008-007773

(51) Int. Cl.
*H02J 7/00* (2006.01)
*G08B 17/10* (2006.01)

(52) U.S. Cl. ........ 320/118; 320/130; 320/145; 320/148; 320/149; 320/150; 340/636.1; 340/636.21

(58) Field of Classification Search .................... 320/118
See application file for complete search history.

(56) References Cited

U.S. PATENT DOCUMENTS 5,825,155 A * 10/1998 Ito et al. ........................ 320/118
6,329,796 B1 * 12/2001 Popescu ........................ 320/134
6,741,066 B1 * 5/2004 Densham et al. ............. 320/145

(Continued)

FOREIGN PATENT DOCUMENTS

GB    2433359 A    6/2007

(Continued)

OTHER PUBLICATIONS

International Search Report for International Application No. PCT/JP2008/062025, dated Aug. 26, 2008, 1 page.

(Continued)

*Primary Examiner* — Yalkew Fantu
(74) *Attorney, Agent, or Firm* — Brinks Hofer Gilson & Lione

(57) ABSTRACT

Provided are a battery state monitoring circuit and a battery device which can be readily adapted to variation in number of batteries, and has low withstand voltage and a simple circuit configuration. The battery state monitoring circuit includes: a first voltage monitoring terminal; a second voltage monitoring terminal; a first transmitting terminal; a second transmitting terminal; a first receiving terminal; a second receiving terminal; a control terminal; an overcharge detector circuit for detecting whether a battery is in an overcharged state or not based on a voltage between the first voltage monitoring terminal and the second voltage monitoring terminal and outputting an overcharge detection signal indicating the detection result; and an overcharge information communication circuit for transmitting an overcharge signal indicative of an overcharged state to an external from the first transmitting terminal when at least one of an overcharge signal indicating whether another battery is in the overcharged state or not, which has been received through the first receiving terminal, and the overcharge detection signal, is indicative of the overcharged state.

26 Claims, 16 Drawing Sheets

U.S. PATENT DOCUMENTS

| | | | |
|---|---|---|---|
| 2002/0109484 A1* | 8/2002 | Yokota et al. | 320/134 |
| 2003/0169050 A1* | 9/2003 | Aikawa et al. | 324/426 |
| 2005/0077878 A1 | 4/2005 | Carrier et al. | |
| 2005/0182987 A1* | 8/2005 | Sakurai | 713/340 |
| 2005/0242780 A1 | 11/2005 | Sakuma et al. | |

FOREIGN PATENT DOCUMENTS

| | | |
|---|---|---|
| JP | 09-140067 A | 5/1997 |
| JP | 2002-320324 A | 10/2002 |
| JP | 2003-303626 A | 10/2003 |
| JP | 2005-318736 A | 11/2005 |

OTHER PUBLICATIONS

Extended European Search Report for European Application No. 08790829.9, dated Oct. 19, 2010, 14 pages.

* cited by examiner

US 8,319,476 B2

BATTERY STATE MONITORING CIRCUIT AND BATTERY DEVICE

TECHNICAL FIELD

The present invention relates to a battery state monitoring circuit that monitors a state of a battery, and a battery device that includes a plurality of the battery state monitoring circuits.

BACKGROUND ART

FIG. 7 illustrates a configuration block diagram of a conventional battery device. As illustrated in FIG. 7, the conventional battery device schematically includes n batteries $BT_1$ to $BT_n$ connected in series, a battery state monitoring circuit 100, a switch circuit 110, a first external terminal 120, and a second external terminal 130.

The batteries $BT_1$ to $BT_n$ are, for example, lithium-ion cells, both ends (positive terminal and negative terminal) of each battery is connected to the battery state monitoring circuit 100, the positive terminal of the battery $BT_1$ is connected to one terminal of the switch circuit 110, and the negative terminal of the battery $BT_n$ is connected to the second external terminal 130. The battery state monitoring circuit 100 detects the voltages of the respective batteries $BT_1$ to $BT_n$ by a voltage detector circuit (not shown) disposed therein to monitor charged/discharged states of the respective batteries $BT_1$ to $BT_n$, and controls an on/off operation of the switch circuit 110 according to the charged/discharged state. The switch circuit 110 switches between connection and disconnection of two terminals thereof under the control of the battery state monitoring circuit 100, one terminal of the switch circuit 110 is connected to the positive terminal of the battery $BT_1$, and another terminal of the switch circuit 110 is connected to the first external terminal 120.

Now, the operation of the above-mentioned conventional battery device is described.

The battery state monitoring circuit 100 controls the switch circuit 110 to be turned on when the voltages of the respective batteries $BT_1$ to $BT_n$ are lower than an overcharge voltage and equal to or higher than an overdischarge voltage, thereby connecting the positive terminal of the battery $BT_1$ to the first external terminal 120 to allow charging and discharging of the respective batteries $BT_1$ to $BT_n$. Here, the overcharge voltage indicates a chargeable upper limit voltage, and the overdischarge voltage indicates a dischargeable lower limit voltage.

During charging, that is, when a charger 200 is connected between the first external terminal 120 and the second external terminal 130, the respective batteries $BT_1$ to $BT_n$ are charged. Even during the charging, the battery state monitoring circuit 100 monitors the charged state through detection of the voltages of the respective batteries $BT_1$ to $BT_n$. Upon detecting that the voltage of at least one battery of the respective batteries $BT_1$ to $BT_n$ is equal to or more than the overcharge voltage, the battery state monitoring circuit 100 controls the switch circuit 110 to be turned off, and prohibits the charging to the respective batteries $BT_1$ to $BT_n$.

On the other hand, during discharging, that is, when a load 300 is connected between the first external terminal 120 and the second external terminal 130, the respective batteries $BT_1$ to $BT_n$ are discharged. Even during the discharging, the battery state monitoring circuit 100 monitors the discharged state through detection of the voltages of the respective batteries $BT_1$ to $BT_n$. Upon detecting that the voltage of at least one battery of the respective batteries $BT_1$ to $BT_n$ is lower than the overdischarge voltage, the battery state monitoring circuit 100 controls the switch circuit 110 to be turned off, and prohibits the discharging to the load 300 (for example, refer to the following Patent Document 1). Patent Document 1: JP 2002-320324 A

DISCLOSURE OF THE INVENTION

Problems to be Solved by the Invention

The conventional battery state monitoring circuit 100 is designed on the basis of the number of batteries within the battery device, which means that the battery state monitoring circuit 100 is designed every time the battery device is changed in specification to change the number of batteries. Hence, a schedule for development of the circuit design becomes longer, resulting in such a problem that the development costs are increased. In addition, when the number of batteries is larger, the circuit configuration of the battery state monitoring circuit 100 is complicated, leading to such a problem that the manufacturing yield of the battery state monitoring circuit 100 is lowered. Further, the battery state monitoring circuit 100 requires a higher withstand voltage as the number of batteries is increased, resulting in such a problem that the available manufacturing process is restricted.

The present invention has been made in view of the above-mentioned circumstances, and an object thereof is to provide a battery state monitoring circuit and a battery device which can be readily adapted to variation in number of batteries, and has low withstand voltage and a simple circuit configuration.

Means for Solving the Problems

In order to achieve the above-mentioned object, as means for solving the above-mentioned problems, the present invention provides a battery state monitoring circuit including: a first voltage monitoring terminal used for connection to a positive terminal of one battery; a second voltage monitoring terminal used for connection to a negative terminal of the battery; a first transmitting terminal; a second transmitting terminal; a first receiving terminal; a second receiving terminal; a control terminal; an overcharge detector circuit that detects whether the battery is in an overcharged state or not, on the basis of a voltage between the first voltage monitoring terminal and the second voltage monitoring terminal to output an overcharge detection signal indicative of the detection result; an overdischarge detector circuit that detects whether the battery is in an overdischarged state or not, on the basis of the voltage between the first voltage monitoring terminal and the second voltage monitoring terminal to output an overdischarge detection signal indicative of the detection result; a cell balance circuit that detects whether the battery needs to be subjected to cell balance control or not, on the basis of the voltage between the first voltage monitoring terminal and the second voltage monitoring terminal to output a cell balance signal indicative of the detection result to the control terminal; an overcharge information communication circuit that transmits an overcharge signal indicative of an overcharged state to an external from the first transmitting terminal when at least one of an overcharge signal indicating whether another battery is in the overcharged state or not, which has been received through the first receiving terminal, and the overcharge detection signal, is indicative of the overcharged state; and an overdischarge information communication circuit that transmits an overdischarge signal indicative of an overdischarged state to an external from the second transmitting terminal when at least one of an overdischarge signal indicating whether another battery is in the overdischarged state or not, which has been received through the second receiving terminal, and the overdischarge detection signal, is indicative of the overdischarged state, in which the battery state monitoring circuit is configured as one semiconductor device.

Effect of the Invention

In the present invention, the design is made so that the battery state monitoring circuit with the identical circuit configuration is individually disposed for each of the plurality of batteries, and hence even if the battery device is changed in specification to change the number of batteries, it is only necessary to add or remove the battery state monitoring circuit according to an increase or decrease in number of batteries. That is, the use of the battery state monitoring circuit according to the present invention can be readily adapted to the specification change of the battery device, and can reduce the schedule for development of the circuit design and reduce the development costs.

Further, the circuit configuration is simple such that the battery state monitoring circuit configured as one semiconductor device is disposed for each of the batteries, and hence, when one of the battery state monitoring circuits is defective, only that circuit is replaced with a non-defective one, thereby normally operating the battery device. Further, the battery state monitoring circuit is individually disposed for each of the batteries, and hence the withstand voltage per one battery state monitoring circuit can be lowered as compared with the conventional one, and a range of the available manufacturing process is expanded.

BEST MODE FOR CARRYING OUT THE INVENTION

First Embodiment

Figure 1:
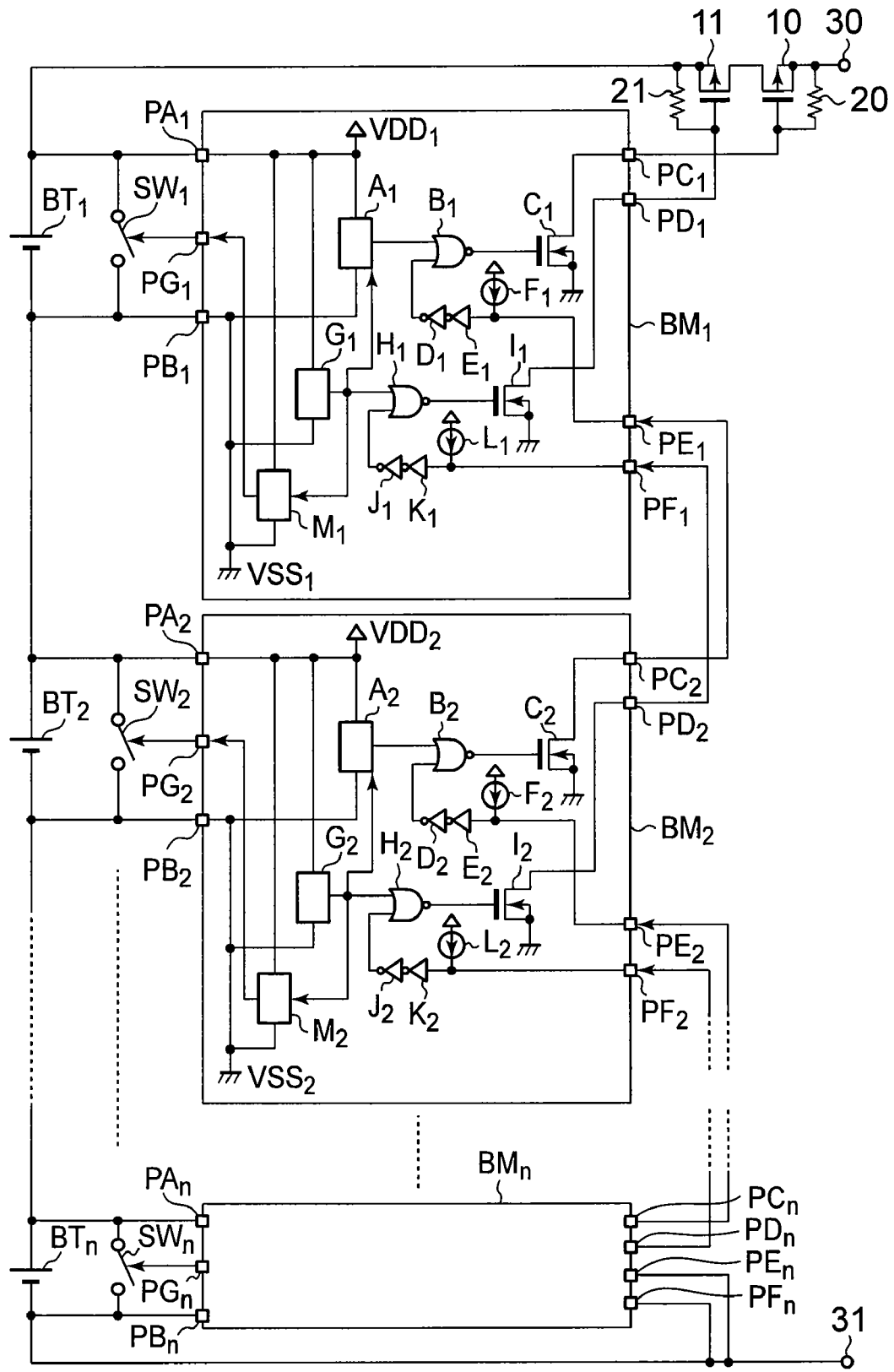
FIG. 1 A circuit configuration diagram illustrating a battery device according to a first embodiment of the present invention.

FIG. 1 is a circuit configuration diagram illustrating a battery device according to a first embodiment. As illustrated in FIG. 1, the battery device according to the first embodiment includes n batteries $BT_1$ to $BT_n$ that are connected in series, n switches (cell balance switch circuits) $SW_1$ to $SW_n$ which are connected in parallel to each of the batteries $Bt_1$ to $BT_n$, n battery state monitoring circuits $BM_1$ to $BM_n$ that are disposed in correspondence with the respective batteries $BT_1$ to $BT_n$, individually, a first transistor (charging p-channel type transistor) 10, a second transistor (discharging p-channel type transistor) 11, a first resistive element (first bias resistive element) 20, a second resistive element (second bias resistive element) 21, a first external terminal 30, and a second external terminal 31.

The battery state monitoring circuit $BM_1$ includes an overcharge detector circuit $A_1$, a first NOR circuit $B_1$, a first output transistor $C_1$, a first inverter $D_1$, a second inverter $E_1$, a first current source $F_1$, an overdischarge detector circuit $G_1$, a second NOR circuit $H_1$, a second output transistor $I_1$, a third inverter $J_1$, a fourth inverter $K_1$, a second current source $L_1$, a cell balance circuit $M_1$, a first voltage monitoring terminal $PA_1$, a second voltage monitoring terminal $PB_1$, a first transmitting terminal $PC_1$, a second transmitting terminal $PD_1$, a first receiving terminal $PE_1$, a second receiving terminal $PF_1$, and a control terminal $PG_1$. The battery state monitoring circuit $BM_1$ including the above-mentioned components is configured as an IC (semiconductor device) of one chip. In the above-mentioned components, the first NOR circuit $B_1$, the first output transistor $C_1$, the first inverter $D_1$, the second inverter $E_1$, and the first current source $F_1$ configure an overcharge information communication circuit in the present invention, and the second NOR circuit $H_1$, the second output transistor $I_1$, the third inverter $J_1$, the fourth inverter $K_1$, and the second current source $L_1$ configure the overdischarge information communication circuit in the present invention.

The other battery state monitoring circuits $BM_2$ to $BM_n$ have the same components as those of the battery state monitoring circuit $BM_1$, and therefore are illustrated with a change in only symbols. For example, the symbol of the overcharge detector circuit in the battery state monitoring circuit $BM_2$ is $A_2$ whereas the symbol of the overcharge detector circuit in the battery state monitoring circuit $BM_n$ is $A_n$. The same is applied to other components.

All of the battery state monitoring circuits $BM_1$ to $BM_n$ are identical in circuit configuration with each other as described above, and hence the battery state monitoring circuit $BM_1$ corresponding to the battery $BT_1$ is representatively described below.

In the battery state monitoring circuit $BM_1$, the first voltage monitoring terminal $PA_1$ is connected to a positive terminal of the battery $BT_1$ and one terminal of the switch $SW_1$. Further, the first voltage monitoring terminal $PA_1$ is connected to a positive side common power supply line within the battery state monitoring circuit $BM_1$. The second voltage monitoring terminal $PB_1$ is connected to a negative terminal of the battery $BT_1$ and another terminal of the switch $SW_1$. Further, the second voltage monitoring terminal $PB_1$ is connected to a negative side common power supply line within the battery state monitoring circuit $BM_1$. In the following description, the positive side common power supply line is $VDD_1$ and the negative side common power supply line is $VSS_1$ within the battery state monitoring circuit $BM_1$, and the positive side common power supply line is $VDD_2$ and the negative side common power supply line is $VSS_2$ within the battery state monitoring circuit $BM_2$. In the same manner, the positive side common power supply line is $VDD_n$ and the negative side common power supply line is $VSS_n$ within the battery state monitoring circuit $BM_n$.

The overcharge detector circuit $A_1$ has one end connected to the first voltage monitoring terminal $PA_1$, and another end connected to the second voltage monitoring terminal $PB_1$. The overcharge detector circuit $A_1$ detects a voltage between the first voltage monitoring terminal $PA_1$ and the second voltage monitoring terminal $PB_1$ (that is, voltage of battery $BT_1$). When the voltage of the battery $BT_1$ is equal to or higher than an overcharge voltage, the overcharge detector circuit $A_1$ outputs an overcharge detection signal of high level to one input terminal of the first NOR circuit $B_1$. Further, when the voltage of the battery $BT_1$ is lower than the overcharge voltage, the overcharge detector circuit $A_1$ outputs an overcharge detection signal of low level to the first NOR circuit $B_1$. Here, the overcharge voltage is an upper limit chargeable voltage. The overcharge detector circuit $A_1$ has a function of stopping the operation when the overdischarge detection signal of high level is input from the overdischarge detector circuit $G_1$.

To the first NOR circuit $B_1$, the above-mentioned overcharge detection signal and an output signal of the first inverter $D_1$ are input, and the first NOR circuit $B_1$ outputs a NOR signal of both of those signals to a gate terminal of the first output transistor $C_1$. The first output transistor $C_1$ is an n-channel type metal oxide semiconductor (MOS) transistor. The first output transistor $C_1$ has the gate terminal connected to an output terminal of the first NOR circuit $B_1$, a drain terminal connected to the first transmitting terminal $PC_1$, and a source terminal connected to the $VSS_1$.

The first inverter $D_1$ outputs a NOT signal of an output signal from the second inverter $E_1$ to the first NOR circuit $B_1$. The second inverter $E_1$ has an input terminal connected to the first receiving terminal $PE_1$ and an output terminal of the first current source $F_1$, and outputs a NOT signal of a signal input to the input terminal thereof to the first inverter $D_1$. The first current source $F_1$ is a current source having an input terminal connected to the $VDD_1$, and the output terminal connected to the input terminal of the second inverter $E_1$ and the first receiving terminal $PE_1$.

The overdischarge detector circuit $G_1$ has one end connected to the first voltage monitoring terminal $PA_1$, and another end connected to the second voltage monitoring terminal $PB_1$. The overdischarge detector circuit $G_1$ detects a voltage between the first voltage monitoring terminal $PA_1$ and the second voltage monitoring terminal $PB_1$ (that is, voltage of battery $BT_1$). When the voltage of the battery $BT_1$ is lower than an overdischarge voltage, the overdischarge detector circuit $G_1$ outputs an overdischarge detection signal of high level to one input terminal of the second NOR circuit $H_1$, the overcharge detector circuit $A_1$, and the cell balance circuit $M_1$. Further, when the voltage of the battery $BT_1$ is equal to or higher than the overdischarge voltage, the overdischarge detector circuit $G_1$ outputs an overdischarge detection signal of low level. Here, the overdischarge voltage is a lower limit dischargeable voltage.

To the second NOR circuit $H_1$, the above-mentioned overdischarge detection signal and an output signal of the third inverter $J_1$ are input, and the second NOR circuit $H_1$ outputs a NOR signal of both of those signals to a gate terminal of the second output transistor $I_1$. The second output transistor $I_1$ is an n-channel type MOS transistor. The second output transistor $I_1$ has the gate terminal connected to an output terminal of the second NOR circuit $H_1$, a drain terminal connected to the second transmitting terminal $PD_1$, and a source terminal connected to the $VSS_1$.

The third inverter $J_1$ outputs a NOT signal of a signal output from the fourth inverter $K_1$ to the second NOR circuit $H_1$. The fourth inverter $K_1$ has an input terminal connected to the second receiving terminal $PF_1$ and an output terminal of the second current source $L_1$, and outputs a NOT signal of a signal input to the input terminal to the fourth inverter $K_1$. The second current source $L_1$ is a current source having an input terminal connected to the $VDD_1$, and the output terminal connected to the input terminal of the fourth inverter $L_1$ and the second receiving terminal $PF_1$.

The cell balance circuit $M_1$ has one end connected to the first voltage monitoring terminal $PA_1$, and another end connected to the second voltage monitoring terminal $PB_1$. The cell balance circuit $M_1$ detects a voltage between the first voltage monitoring terminal $PA_1$ and the second voltage monitoring terminal $PB_1$ (that is, voltage of battery $BT_1$). When the voltage of the battery $BT_1$ is equal to or higher than a cell balance voltage, the cell balance circuit $M_1$ outputs a cell balance signal to the switch $SW_1$ through the control terminal $PG_1$. Further, when the voltage of the battery $BT_1$ is lower than the cell balance voltage, the cell balance circuit $M_1$ outputs a cell balance signal of low level to the switch $SW_1$ through the control terminal $PG_1$. Here, the cell balance voltage is a voltage that is equal to or lower than the overcharge voltage in the case in which the battery $BT_1$ comes to a state close to the overcharged state (voltage at which voltage of battery $BT_1$ starts to be adjusted to voltages of other batteries for cell balance). The cell balance circuit $M_1$ has a function of stopping the operation when the overdischarge detection signal of high level is input to the cell balance circuit $M_1$ from the overdischarge detector circuit $G_1$.

The first transmitting terminal $PC_1$ is connected to a gate terminal of the first transistor 10 and one end of the first resistive element 20. The second transmitting terminal $PD_1$ is connected to a gate terminal of the second transistor 11 and one end of the second resistive element 21. The first receiving terminal $PE_1$ is connected to a first transmitting terminal $PC_2$ of the battery state monitoring circuit $BM_2$. The second receiving terminal $PF_1$ is connected to a second transmitting terminal $PD_2$ of the battery state monitoring circuit $BM_2$.

Further, a first receiving terminal $PE_2$ of the battery state monitoring circuit $BM_2$ is connected to a first transmitting terminal $PC_3$ of the battery state monitoring circuit $BM_3$, and a second receiving terminal $PF_2$ of the battery state monitoring circuit $BM_2$ is connected to a second transmitting terminal $PD_3$ of the battery state monitoring circuit $BM_3$. The same is applied to the battery state monitoring circuits $BM_3$ to $BM_n$. That is, the first receiving terminal of the battery state monitoring circuit on an upstream side (battery $BT_1$ side) is connected to the first transmitting terminal of the battery state monitoring circuit on a downstream side (battery $BT_n$ side). The second receiving terminal of the battery state monitoring circuit on the upstream side is connected to the second transmitting terminal of the battery state monitoring circuit on the downstream side. A first receiving terminal $PE_n$ and a second receiving terminal $PF_n$ of the battery state monitoring circuit $BM_n$ which is located on the most downstream side are connected to a negative terminal of the battery $BT_n$.

The switch $SW_1$ is connected in parallel to the battery $BT_1$, and switches between the connection and the disconnection of the two terminals (that is, positive terminal and negative terminal of battery $BT_1$) according to the cell balance signal that is input to the switch $SW_1$ through the control terminal $PG_1$. The switch $SW_1$ is turned on, that is, switches the two terminals to the connection state when the cell balance signal is input. The same is applied to the other switches $SW_2$ to $SW_n$.

The first transistor 10 is a p-channel type MOS transistor. The first transistor 10 has the gate terminal connected to the first transmitting terminal $PC_1$ of the battery state monitoring circuit $BM_1$ and the one end of the first resistive element 20. The first transistor 10 also has a drain terminal connected to a drain terminal of the second transistor 11, and a source terminal connected to another terminal of the first resistive element 20 and the first external terminal 30. The second transistor 11 is a p-channel type MOS transistor. The second transistor 11 has the gate terminal connected to the second transmitting terminal $PD_1$ of the battery state monitoring circuit $BM_1$ and the one end of the second resistive element 21. The second transistor 11 also has the drain terminal connected to the drain terminal of the first transistor 10, and a source terminal connected to another terminal of the second resistive element 21 and the positive terminal of the battery $BT_1$. On the other hand, the second external terminal 31 is connected to the negative terminal of the battery $BT_n$ on the most downstream side.

In the battery device configured as described above, a load or a charger is connected between the first external terminal 30 and the second external terminal 31 to conduct discharging or charging.

Subsequently, a description is given of the operation of the battery device according to the first embodiment, which is configured as described above.
(Normal State)

First, a description is given of a normal state, that is, a case in which all the voltages of the batteries $BT_1$ to $BT_n$ are lower than the overcharge voltage, and equal to or higher than the overdischarge voltage. In the normal state thus defined, the overcharge detector circuit $A_1$ of the battery state monitoring circuit $BM_1$ outputs the overcharge detection signal of low level to the first NOR circuit $B_1$.

In this situation, a first output transistor $C_2$ of the battery state monitoring circuit $BM_2$ is on (the reason for this is described later). As a result, the input terminal of the second inverter $E_1$ of the battery state monitoring circuit $BM_1$ is at low level, and the output signal of low level is output from the first inverter $D_1$ to the first NOR circuit $B_1$. To the first NOR circuit $B_1$, the overcharge detection signal of low level and the output signal of low level of the first inverter $D_1$ are input, and hence the first NOR circuit $B_1$ outputs the NOR signal of high level to the gate terminal of the first output transistor $C_1$. As a result, the first output transistor $C_1$ is turned on, and hence the first transmitting terminal $PC_1$ becomes at low level, and the first transistor 10 is turned on.

Now, the reason why the first output transistor $C_2$ of the battery state monitoring circuit $BM_2$ is on is described below. The first receiving terminal $PE_n$ of the battery state monitoring circuit $BM_n$ on the most downstream side is connected to the negative terminal of the battery $BT_n$, and hence an input terminal of a second inverter $E_n$ is always held at low level. Accordingly, a first inverter $D_n$ always outputs the output signal of low level to a first NOR circuit $B_n$, and the overcharge detector circuit $A_n$ outputs the overcharge detection signal of low level to the first NOR circuit $B_n$. With the above-mentioned arrangement, the first NOR circuit $B_n$ outputs the NOR signal of high level to a gate terminal of a first output transistor $C_n$, and the first output transistor $C_n$ of the battery state monitoring circuit $BM_n$ is turned on.

As a result, an input terminal of a second inverter $E_{n-1}$ in the battery state monitoring circuit $BM_{n-1}$ becomes at low level, and the output signal of low level is output to a first NOR circuit $B_{n-1}$ from a first inverter $D_{n-1}$. On the other hand, an overcharge detector circuit $A_{n-1}$ outputs the overcharge detection signal of low level to the first NOR circuit $B_{n-1}$, and hence the first NOR circuit $B_{n-1}$ outputs the NOR signal of high level to a gate terminal of a first output transistor $C_{n-1}$. As a result, the first output transistor $C_{n-1}$ of the battery state monitoring circuit $BM_{n-1}$ is turned on.

The above-mentioned operation is repeated in the upstream side battery state monitoring circuit and the downstream side battery state monitoring circuit, and the first output transistor $C_2$ of the battery state monitoring circuit $BM_2$ is turned on.

Further, in the above-mentioned normal state, the overdischarge detector circuit $G_1$ of the battery state monitoring circuit $BM_1$ outputs the overdischarge detection signal of low level to the second NOR circuit $H_1$. In this situation, a second output transistor $I_2$ of the battery state monitoring circuit $BM_2$ is also on, and hence the input terminal of the fourth inverter $K_1$ of the battery state monitoring circuit $BM_1$ becomes at low level, and the output signal of low level is output to the second NOR circuit $H_1$ from the third inverter $J_1$. To the second NOR circuit $H_1$, the overdischarge detection signal of low level and the output signal of low level of the third inverter $J_1$ are input, and hence the second NOR circuit $H_1$ outputs the NOR signal of high level to the gate terminal of the second output transistor $I_1$. As a result, the second output transistor $I_1$ is turned on, and hence the second transmitting terminal $PD_1$ becomes at low level, and the second transistor 11 is turned on.

As described above, in the normal state, the first transistor 10 and the second transistor 11 are turned on, and hence the battery device becomes chargeable and dischargeable.
(Overcharged State)

Subsequently, a description is given of an overcharged state, that is, a case in which a charger is connected between the first external terminal 30 and the second external terminal 31 to charge the batteries $BT_1$ to $BT_n$, and at least one voltage of those batteries $BT_1$ to $BT_n$ becomes equal to or higher than the overcharge voltage. In the following description, it is assumed that the voltage of the battery $BT_2$ is equal to or higher than the overcharge voltage.

In this case, the overcharge detector circuit $A_2$ of the battery state monitoring circuit $BM_2$ outputs the overcharge detection signal of high level to a first NOR circuit $B_2$. In this situation, the output signal of low level is output from a first inverter $D_2$, and hence the first NOR circuit $B_2$ outputs the NOR signal of low level to a gate terminal of the first output transistor $C_2$. As a result, the first output transistor $C_2$ is turned off.

That is, the input terminal of the second inverter $E_1$ is pulled up to high level by means of the first current source $F_1$, and the output signal of high level is output to the first NOR circuit $B_1$ from the first inverter $D_1$. On the other hand, the overcharge detector circuit $A_1$ outputs the overcharge detection signal of low level to the first NOR circuit $B_1$, and hence the first NOR circuit $B_1$ outputs the NOR signal of low level to the gate terminal of the first output transistor $C_1$. As a result, the first output transistor $C_1$ is turned off.

As described above, when the first output transistor $C_1$ is turned off, the gate of the first transistor 10 becomes at high level by means of the first resistive element 20, and the first transistor 10 is turned off. As a result, the charging from the charger is prohibited.

In the above-mentioned description, it is assumed that the voltage of the battery $BT_2$ is equal to or higher than the overcharge voltage. The same is applied to a case in which the voltages of the other batteries are equal to or higher than the overcharge voltage. That is, a fact that the overcharged state occurs is communicated from the battery state monitoring circuit corresponding to the battery that has become in the overcharged state to the upstream side battery state monitoring circuit, and the communication reaches the most upstream side battery state monitoring circuit $BM_1$. As a result, the first transistor 10 is turned off to prohibit the charging from the charger.

(Overdischarged State)

Subsequently, a description is given of an overdischarged state, that is, a case in which a load is connected between the first external terminal 30 and the second external terminal 31 to discharge the batteries $BT_1$ to $BT_n$, and at least one voltage of those batteries $BT_1$ to $BT_n$ becomes lower than the overdischarge voltage. In the following description, it is assumed that the voltage of the battery $BT_2$ is lower than the overdischarge voltage.

In this case, an overdischarge detector circuit $G_2$ of the battery state monitoring circuit $BM_2$ outputs the overdischarge detection signal of high level to a second NOR circuit $H_2$. In this situation, the output signal of low level is output from a third inverter $J_2$, and hence the second NOR circuit $H_2$ outputs the NOR signal of low level to a gate terminal of the second output transistor $I_2$. As a result, the second output transistor $I_2$ is turned off.

That is, the input terminal of the fourth inverter $K_1$ is pulled up to high level by means of the second current source $L_1$, and the output signal of high level is output to the second NOR circuit $H_1$ from the third inverter $J_1$. On the other hand, the overdischarge detector circuit $G_1$ outputs the overdischarge detection signal of low level to the second NOR circuit $H_1$, and hence the second NOR circuit $H_1$ outputs the NOR signal of low level to the gate terminal of the second output transistor $I_1$. As a result, the second output transistor $I_1$ is turned off.

As described above, when the second output transistor $I_1$ is turned off, the gate of the second transistor 11 becomes at high level by means of the second resistive element 21, and the second transistor 11 is turned off. As a result, the discharging to the load is prohibited.

Further, in the above-mentioned overdischarged state, the overdischarge detector circuit $G_2$ that has detected the overdischarged state outputs the overdischarge detection signal of high level to the overcharge detector circuit $A_2$ and a cell balance circuit $M_2$. With the above-mentioned configuration, the overcharge detector circuit $A_2$ and the cell balance circuit $M_2$ stop the operation, and hence it is possible to reduce the power consumption. Further, a first voltage monitoring terminal $PA_2$ also functions as a VDD power source terminal of the battery state monitoring circuit $BM_2$, and the battery state monitoring circuit $BM_2$ receives a power from the battery $BT_2$. As a result, the voltage of the overdischarged battery $BT_2$ becomes lower, and the power consumption of the battery state monitoring circuit $BM_2$ is reduced as much.

In this example, when the characteristic variation occurs in the respective batteries to decrease the voltage of the battery $BT_2$ earlier than the voltages of the other batteries during discharging, the overdischarge detector circuit $G_2$ of the battery state monitoring circuit $BM_2$ outputs the overdischarge detection signal earlier than other battery state monitoring circuits. Then, the second transistor 11 is turned off to prohibit the discharging. In this situation, in the battery state monitoring circuit $BM_2$, the power consumption is reduced more than those of the other battery state monitoring circuits. The battery $BT_2$ is lower in discharging speed than the other batteries as much as the power consumption thereof is reduced, and the other batteries discharge electricity in the usual manner. Therefore, the discharging speed of the overdischarged battery $BT_2$ becomes lower, and hence the battery device is capable of conforming the voltages of the respective batteries to each other (taking cell balance).

In the above-mentioned description, it is assumed that the voltage of the battery $BT_2$ is lower than the overdischarge voltage. The same is applied to a case in which the voltages of the other batteries are lower than the overdischarge voltage. That is, a fact that the overdischarged state occurs is communicated from the battery state monitoring circuit corresponding to the battery that has become in the overdischarged state to the upstream side battery state monitoring circuit, and the communication reaches the most upstream side battery state monitoring circuit $BM_1$. As a result, the second transistor 11 is turned off to prohibit the discharging to the load.

(Cell Balance State)

Subsequently, a description is given of a cell balance state, that is, a case in which a charger is connected between the first external terminal 30 and the second external terminal 31 to charge the batteries $BT_1$ to $BT_n$, and at least one voltage of those batteries $BT_1$ to $BT_n$ becomes equal to or higher than the cell balance voltage. In the following description, it is assumed that the voltage of the battery $BT_2$ is equal to or higher than the cell balance voltage.

In this case, the cell balance circuit $M_2$ of the battery state monitoring circuit $BM_2$ outputs the cell balance signal to the switch $SW_2$ through a control terminal $PG_2$. With the above-mentioned configuration, the switch $SW_2$ is turned on, and the charged battery $BT_2$ discharges electricity through the switch $SW_2$.

In this example, when the characteristic variation occurs in the respective batteries to increase the voltage of the battery $BT_2$ earlier than the voltages of the other batteries during charging, the battery state monitoring circuit $BM_2$ outputs the cell balance signal earlier than the other battery state monitoring circuits. Then, the switch $SW_2$ is turned on earlier than the other switches, and the battery $BT_2$ is different from the other batteries in change in charge amount. For example, the battery $BT_2$ is lower in charging speed than the other batteries, and the other batteries are charged in the usual manner. Alternatively, the battery $BT_2$ is discharged, and the other batteries are charged in the usual manner. As a result, the charging speed of the overcharged battery $BT_2$ becomes lower, or the overcharged battery $BT_2$ is discharged, and hence the battery device is capable of taking the cell balance.

As described above, in the battery device according to the first embodiment, the battery state monitoring circuits $BM_1$ to $BM_n$ with the identical circuit configuration are disposed for the respective batteries $BT_1$ to $BT_n$, individually, and hence even if the battery device is changed in specification to change the number of batteries, it is only necessary to add or remove the battery state monitoring circuit according to the change in number of batteries. That is, the battery state monitoring circuit according to the first embodiment can be readily adapted to the specification change of the battery device, and can reduce the schedule for development of the circuit design in time and reduce the development costs.

Further, the battery state monitoring circuit configured as an IC of one chip is disposed for each of the batteries to thereby ease the circuit configuration per one chip, and the manufacturing yield of the single battery state monitoring circuit can be improved. Further, when one of the battery state monitoring circuits is defective, only that battery state monitoring circuit is replaced with a non-defective one, whereby the battery device can normally operate. As a result, the maintenance property of the battery device can be improved, and the manufacturing yield of the battery device per se can be improved.

Further, even if a characteristic variation occurs among the respective batteries, and a change in charge amount of the respective batteries is different, the battery device takes cell balance before the respective batteries become in the overcharged state. Therefore, it is difficult to make the respective batteries in the overcharged state, and it is difficult to prohibit charging. Hence, the operating time of the battery device can be lengthened. Further, even if the characteristic variation occurs among the respective batteries, and a change in charge amount of the respective batteries is different, when the respective batteries become in the overdischarged state, the battery device takes the cell balance. Therefore, initial values of the charge amounts of the respective batteries in subsequent charging operation approach the same value, and cell balance before the respective batteries become in the overcharged state is easily taken. Even with this configuration, the operating time of the battery device can be lengthened.

Further, the conventional battery state monitoring circuit requires the withstand voltage as high as the total number of batteries. However, as described above, in the first embodiment, in the battery state monitoring circuit that has detected the overcharged state or the overdischarged state, the first output transistor or the second output transistor are turned off, and the voltage for two cells (for two batteries) is applied to the first output transistor or the second output transistor on the downstream side, which has been turned off due to the pull-up operation in the battery state monitoring circuit on the upstream side. That is, it is only necessary that the withstand voltage of one battery state monitoring circuit be equal to or higher than the voltage for at least two cells. Therefore, according to the first embodiment, the battery state monitoring circuit that is lower in the withstand voltage than the conventional one can be manufactured, and hence the range of the available manufacturing process can be widened.

Second Embodiment

Subsequently, a description is given of a battery device according to a second embodiment. In the first embodiment, the description is given of a case in which the n-channel type MOS transistors are used as the first output transistor and the second output transistor in the battery state monitoring circuit. In contrast, in the second embodiment, a description is given of a battery device in the case where p-channel type MOS transistors are used as the first output transistor and the second output transistor.

Figure 2:
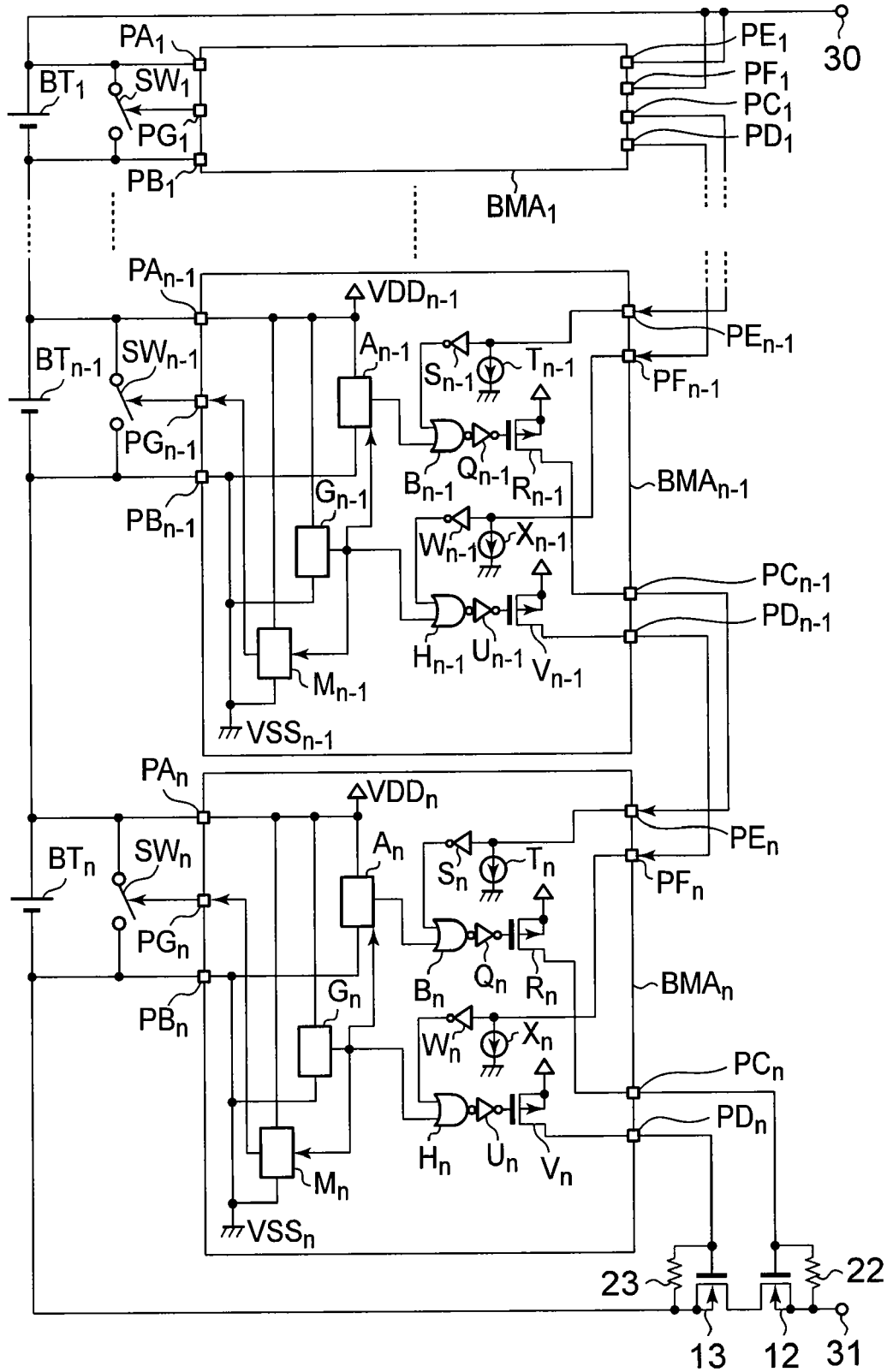
FIG. 2 A circuit configuration diagram illustrating a battery device according to a second embodiment of the present invention.

FIG. 2 is a circuit configuration diagram illustrating the battery device according to the second embodiment. In FIG. 2, the same components as those of FIG. 1 are denoted by identical symbols, and their description is omitted. In order to distinguish from FIG. 1, the symbols of the battery state monitoring circuits are $BMA_1$ to $BMA_n$, the symbol of the first transistor is 12, the symbol of the second transistor is 13, the symbol of the first resistive element is 22, and the symbol of the second resistive element is 23. Further, the circuit configurations of those battery state monitoring circuits $BMA_1$ to $BMA_n$ are identical with each other, and hence the most downstream side battery state monitoring circuit $BMA_n$ is representatively described below.

The battery state monitoring circuit $BMA_n$ according to the second embodiment includes the overcharge detector circuit $A_n$, the first NOR circuit $B_n$, a first inverter $Q_n$, a first output transistor $R_n$, a second inverter $S_n$, a first current source $T_n$, an overdischarge detector circuit $G_n$, a second NOR circuit $H_n$, a third inverter $U_n$, a second output transistor $V_n$, a fourth inverter $W_n$, a second current source $X_n$, a cell balance circuit $M_n$, a first voltage monitoring terminal $PA_n$, a second voltage monitoring terminal $PB_n$, a first transmitting terminal $PC_n$, a second transmitting terminal $PD_n$, a first receiving terminal $PE_n$, a second receiving terminal $PF_n$, and a control terminal $PG_n$. The battery state monitoring circuit $BMA_n$ including the above-mentioned components is configured as an IC of one chip.

To the first NOR circuit $B_n$, an overcharge detection signal that is output from the overcharge detector circuit $A_n$, and an output signal of the second inverter $S_n$ are input, and the first NOR circuit $B_n$ outputs a NOR signal of those signals to the first inverter $Q_n$. The first inverter $Q_n$ outputs the NOT signal of the NOR signal that is input from the first NOR circuit $B_n$ to a gate terminal of the first output transistor $R_n$. The first output transistor $R_n$ is a p-channel type MOS transistor. The first output transistor $R_n$ has the gate terminal connected to an output terminal of the first inverter $Q_n$, a drain terminal connected to the first transmitting terminal $PC_n$, and a source terminal connected to the $VDD_n$.

The second inverter $S_n$ has an input terminal connected to the first receiving terminal $PE_n$ and an input terminal of the first current source $T_n$, and outputs the NOT signal of the signal input to the input terminal thereof to the first NOR circuit $B_n$. The first current source $T_n$ is a current source that has the input terminal connected to the first receiving terminal $PE_n$ and the input terminal of the second inverter $S_n$, and an output terminal connected to the $VSS_n$.

To the second NOR circuit $H_n$, an overdischarge detection signal that is output from the overdischarge detector circuit $G_n$ and the output signal of the fourth inverter $W_n$ are input, and the second NOR circuit $H_n$ outputs a NOR signal of those signals to the third inverter $U_n$. The third inverter $U_n$ outputs the NOT signal of the NOR signal that is input from the second NOR circuit $H_n$ to a gate terminal of the second output transistor $V_n$. The second output transistor $V_n$ is a p-channel type MOS transistor, and has the gate terminal connected to an output terminal of the third inverter $U_n$, a drain terminal connected to the second transmitting terminal $PD_n$, and a source terminal connected to the $VDD_n$.

The fourth inverter $W_n$ has an input terminal connected to the second receiving terminal $PF_n$ and an input terminal of the second current source $X_n$, and outputs the NOT signal of the signal input to the input terminal thereof to the second NOR circuit $H_n$. The second current source $X_n$ is a current source that has the input terminal connected to the second receiving terminal $PF_n$ and the input terminal of the fourth inverter $W_n$, and an output terminal connected to the $VSS_n$.

The first transmitting terminal $PC_n$ is connected to a gate terminal of the first transistor 12 and one end of the first resistive element 22. The second transmitting terminal $PD_n$ is connected to a gate terminal of the second transistor 13 and one end of the second resistive element 23. The first receiving terminal $PE_n$ is connected to a first transmitting terminal $PC_{n-1}$ of the battery state monitoring circuit $BMA_{n-1}$. The second receiving terminal $PF_n$ is connected to a second transmitting terminal $PD_{n-1}$ of the battery state monitoring circuit $BMA_{n-1}$.

The same is applied to the other battery state monitoring circuits, and the first receiving terminal of the battery state monitoring circuit on the downstream side (battery $BT_n$ side) is connected to the first transmitting terminal of the battery state monitoring circuit on the upstream side (battery $BT_1$ side). The second receiving terminal of the battery state monitoring circuit on the downstream side is connected to the second transmitting terminal of the battery state monitoring circuit on the upstream side. The first receiving terminal $PE_1$ and the second receiving terminal $PF_1$ of the battery state monitoring circuit $BMA_1$ which is located on the most upstream side are connected to the positive terminal of the battery $BT_1$.

The first transistor 12 is an n-channel type MOS transistor. The first transistor 12 has the gate terminal connected to the first transmitting terminal $PC_n$ of the battery state monitoring circuit $BMA_n$ and the one end of the first resistive element 22. The first transistor 12 also has a drain terminal connected to a drain terminal of the second transistor 13, and a source terminal connected to another terminal of the first resistive element 22 and the second external terminal 31. The second transistor 13 is an n-channel type MOS transistor. The second transistor 13 has the gate terminal connected to the second transmitting terminal $PD_n$ of the battery state monitoring circuit $BMA_n$ and the one end of the second resistive element 23. The second transistor 13 also has the drain terminal connected to the drain terminal of the second transistor 12, and a source terminal connected to another terminal of the second resistive element 23 and the negative terminal of the battery $BT_n$. On the other hand, the first external terminal 30 is connected to the positive terminal of the battery $BT_1$ on the most upstream side.

Subsequently, a description is given of the operation of the battery device according to the second embodiment, which is configured as described above. The operation in the cell balance state is identical with that of the first embodiment, and therefore its description is omitted.

(Normal State)

First, a description is given of a normal state, that is, a case in which the voltages of all the batteries $BT_1$ to $BT_n$ are lower than the overcharge voltage, and equal to or higher than the overdischarge voltage. In the normal state thus defined, the overcharge detector circuit $A_n$ of the battery state monitoring circuit $BMA_n$ outputs the overcharge detection signal of low level to the first NOR circuit $B_n$.

In this situation, a first output transistor $R_{n-1}$ of the battery state monitoring circuit $BMA_{n-1}$ is on (the reason for this is described later). As a result, the input terminal of the second inverter $S_n$ of the battery state monitoring circuit $BMA_n$ becomes at high level, and the output signal of low level is output from the second inverter $S_n$ to the first NOR circuit $B_n$. The first NOR circuit $B_n$ outputs the NOR signal of high level to the first inverter $Q_n$, and the first inverter $Q_n$ outputs the NOT signal of low level to the gate terminal of the first output transistor $R_n$. As a result, the first output transistor $R_n$ is turned on, and hence the first transmitting terminal $PC_n$ becomes at high level, and the first transistor 12 is turned on.

Now, the reason why the first output transistor $R_{n-1}$ of the battery state monitoring circuit $BMA_{n-1}$ is on is described below. The first receiving terminal $PE_1$ of the battery state monitoring circuit $BMA_1$ on the most upstream side is connected to the positive terminal of the battery $BT_1$, and hence an input terminal of a second inverter $S_1$ is always held at high level. Accordingly, the second inverter $S_1$ always outputs the output signal of low level to the first NOR circuit $B_1$, and the overcharge detector circuit $A_1$ outputs the overcharge detection signal of low level to the first NOR circuit $B_1$. With the above-mentioned arrangement, the first NOR circuit $B_1$ outputs the NOR signal of high level to a first inverter $Q_1$, and the first inverter $Q_1$ outputs the NOT signal of low level to a gate terminal of a first output transistor $R_1$. As a result, the first output transistor $R_1$ of the battery state monitoring circuit $BMA_1$ is turned on.

In this situation, an input terminal of a second inverter $S_2$ in the battery state monitoring circuit $BMA_2$ that is located on the downstream side of the battery state monitoring circuit $BMA_1$ becomes at high level, and the output signal of low level is output from the second inverter $S_2$ to the first NOR circuit $B_2$. The overcharge detector circuit $A_2$ outputs the overcharge detection signal of low level, and hence the first NOR circuit $B_2$ outputs the NOR signal of high level to a first inverter $Q_2$, and the first inverter $Q_2$ outputs the NOT signal of low level to a gate terminal of a first output transistor $R_2$. As a result, the first output transistor $R_2$ is turned on.

The above-mentioned operation is repeated in the upstream side battery state monitoring circuit and the downstream side battery state monitoring circuit, and the first output transistor $R_{n-1}$ of the battery state monitoring circuit $BMA_{n-1}$ is turned on.

Further, in the above-mentioned normal state, the overdischarge detector circuit $G_n$ of the battery state monitoring circuit $BMA_n$ outputs the overdischarge detection signal of low level to the second NOR circuit $H_n$. In this situation, a second output transistor $V_{n-1}$ of the battery state monitoring circuit $BMA_{n-1}$ is also on, and hence the input terminal of the fourth inverter $W_n$ in the battery state monitoring circuit $BMA_n$ becomes at high level, and the output signal of low level is output to the second NOR circuit $H_n$ from the fourth inverter $W_n$. The second NOR circuit $H_n$ outputs the NOR signal of high level to the third inverter $U_n$, and the third inverter $U_n$ outputs the NOT signal of low level to the gate terminal of the second output transistor $V_n$. As a result, the second output transistor $V_n$ is turned on, and hence the second transmitting terminal $PD_n$ becomes at high level, and the second transistor 13 is turned on.

As described above, in the normal state, the first transistor 12 and the second transistor 13 are turned on, and hence the battery device becomes chargeable and dischargeable.

(Overcharged State)

Subsequently, a description is given of an overcharged state, that is, a case in which a charger is connected between the first external terminal 30 and the second external terminal 31 to charge the batteries $BT_1$ to $BT_n$, and at least one voltage of those batteries $BT_1$ to $BT_n$ becomes equal to or higher than the overcharge voltage. In the following description, it is assumed that the voltage of the battery $BT_{n-1}$ is equal to or higher than the overcharge voltage.

In this case, the overcharge detector circuit $A_{n-1}$ of the battery state monitoring circuit $BMA_{n-1}$ outputs the overcharge detection signal of high level to the first NOR circuit $B_{n-1}$. In this situation, the output signal of low level is output from a second inverter $S_{n-1}$, and hence the first NOR circuit $B_{n-1}$ outputs the NOR signal of low level to a first inverter $Q_{n-1}$, and the first inverter $Q_{n-1}$ outputs the NOT signal of high level to a gate terminal of the first output transistor $R_{n-1}$. As a result, the first output transistor $R_{n-1}$ is turned off.

That is, the input terminal of the second inverter $S_n$ is pulled down to low level by means of the first current source $T_n$, and the output signal of high level is output to the first NOR circuit $B_n$ from the second inverter $S_n$. On the other hand, the overcharge detector circuit $A_n$ outputs the overcharge detection signal of low level to the first NOR circuit $B_n$, and hence the first NOR circuit $B_n$ outputs the NOR signal of low level to the first inverter Qn, and the first inverter Qn outputs the NOT signal of high level to the gate terminal of the first output transistor $R_n$. As a result, the first output transistor $R_n$ is turned off.

As described above, when the first output transistor $R_n$ is turned off, the gate of the first transistor 12 becomes at low level by means of the first resistive element 22, and the first transistor 12 is turned off. As a result, the charging from the charger is prohibited.

In the above-mentioned description, it is assumed that the voltage of the battery $BT_{n-1}$ is equal to or higher than the overcharge voltage. The same is applied to a case in which the voltages of the other batteries are equal to or higher than the overcharge voltage. That is, a fact that the overcharged state occurs is communicated from the battery state monitoring circuit corresponding to the battery that has become in the overcharged state to the downstream side battery state monitoring circuit, and the communication reaches the most downstream side battery state monitoring circuit $BMA_n$. As a result, the first transistor 12 is turned off to prohibit the charging from the charger.

(Overdischarged State)

Subsequently, a description is given of an overdischarged state, that is, a case in which a load is connected between the first external terminal 30 and the second external terminal 31 to discharge the batteries $BT_1$ to $BT_n$, and at least one voltage of those batteries $BT_1$ to $BT_n$ becomes lower than the overdischarge voltage. In the following description, it is assumed that the voltage of the battery $BT_{n-1}$ is lower than the overdischarge voltage.

In this case, an overdischarge detector circuit $G_{n-1}$ of the battery state monitoring circuit $BMA_{n-1}$ outputs the overdischarge detection signal of high level to a second NOR circuit $H_{n-1}$. In this situation, the output signal of low level is output from a fourth inverter $W_{n-1}$, and hence the second NOR circuit $H_{n-1}$ outputs the NOR signal of low level to a third inverter $U_{n-1}$, and the third inverter $U_{n-1}$ outputs the NOT signal of high level to a gate terminal of the second output transistor $V_{n-1}$. As a result, the second output transistor $V_{n-1}$ is turned off.

That is, the input terminal of the fourth inverter $W_n$ is pulled down to low level by means of the second current source $X_n$, and the output signal of high level is output to the second NOR circuit $H_n$ from the fourth inverter $W_n$. On the other hand, the overdischarge detector circuit $G_n$ outputs the overdischarge detection signal of low level to the second NOR circuit $H_n$, and hence the second NOR circuit $H_n$ outputs the NOR signal of low level to the third inverter $U_n$, and the third inverter $U_n$ outputs the NOT signal of high level to the gate terminal of the second output transistor $V_n$. As a result, the second output transistor $V_n$ is turned off.

As described above, when the second output transistor $V_n$ is turned off, the gate of the second transistor 13 becomes at low level by means of the second resistive element 23, and the second transistor 13 is turned off. As a result, the discharging to the load is prohibited.

In the above-mentioned description, it is assumed that the voltage of the battery $BT_{n-1}$ is lower than the overdischarge voltage. The same is applied to a case in which the voltages of the other batteries are lower than the overdischarge voltage.

That is, a fact that the overdischarged state occurs is communicated from the battery state monitoring circuit corresponding to the battery that has become in the overdischarged state to the downstream side battery state monitoring circuit, and the communication reaches the most downstream side battery state monitoring circuit $BMA_n$. As a result, the second transistor 13 is turned off to prohibit the discharging to the load.

Similarly, the same advantages as those of the first embodiment can be obtained by the battery device and the battery state monitoring circuit according to the second embodiment described above.

Third Embodiment

Figure 3:
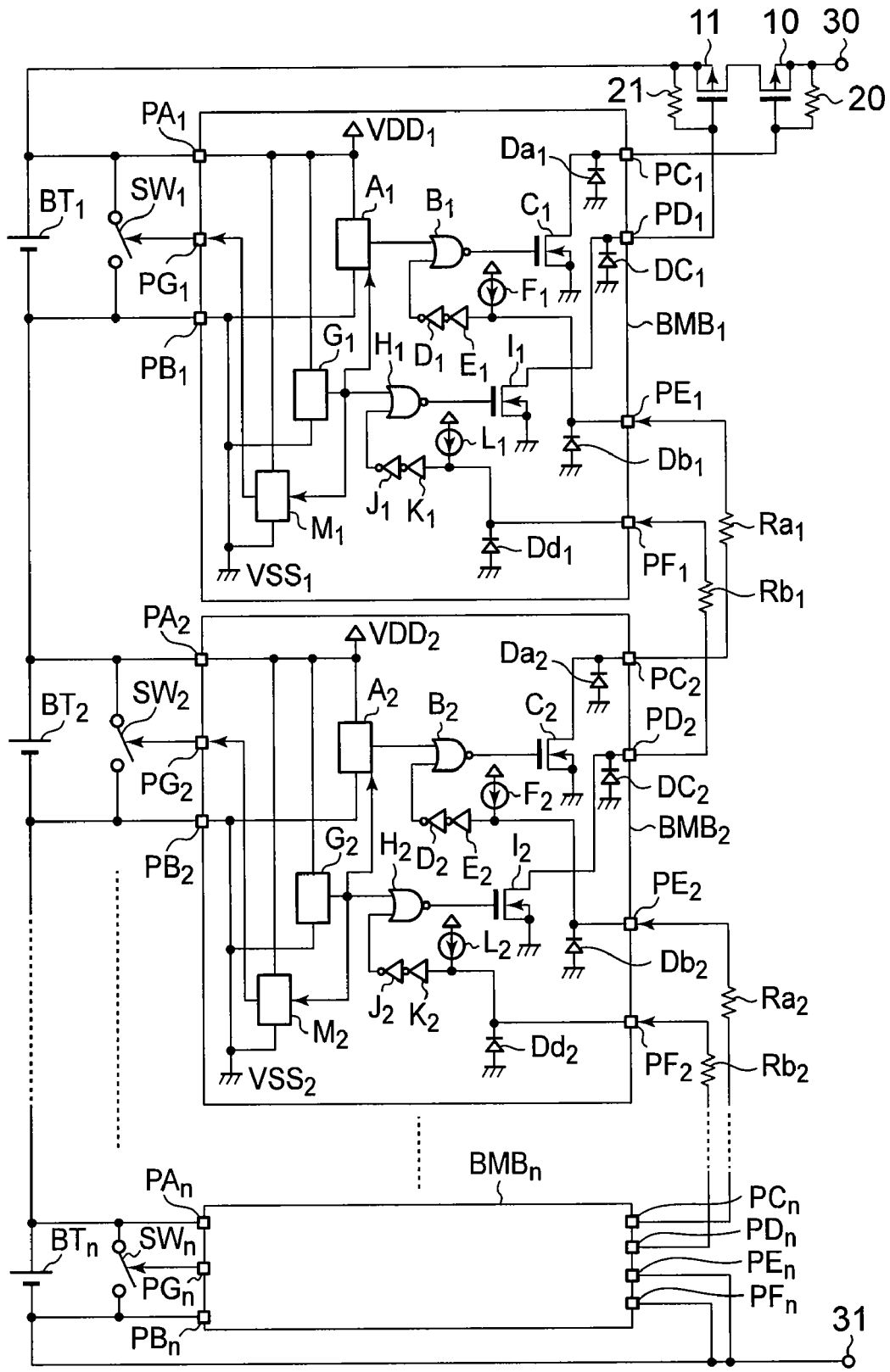
FIG. 3 A circuit configuration diagram illustrating a battery device according to a third embodiment of the present invention.

Subsequently, a description is given of a battery device according to a third embodiment. FIG. 3 is a circuit configuration diagram illustrating the battery device according to the third embodiment. As illustrated in FIG. 3, in the third embodiment, two types of diodes are disposed in the battery state monitoring circuit of the first embodiment. That is, when it is assumed that the symbols of the battery state monitoring circuits are $BMB_1$ to $BMB_n$, the battery state monitoring circuit $BMB_1$ newly includes a first diode $Da_1$, a second diode $Db_1$, a third diode $Dc_1$, and a fourth diode $Dd_1$ in addition to the components of the first embodiment. The same is applied to the other battery state monitoring circuits. In the following description, the battery state monitoring circuit $BMB_1$ is representatively described.

The first diode $Da_1$ has an anode terminal connected to the $VSS_1$, and a cathode terminal connected to the drain terminal of the first output transistor $C_1$. The first diode $Da_1$ has such a characteristic as to generate a reverse current when a reverse voltage corresponding to a voltage (for example, 4.5 V) that exceeds the withstand voltage of the battery state monitoring circuit is applied between the anode terminal and the cathode terminal. The second diode $Db_1$ has an anode terminal connected to the $VSS_1$, and a cathode terminal connected to the input terminal of the second inverter $E_1$. It is assumed that the voltage drop of the second diode $Db_1$ is 0.7 V.

The third diode $Dc_n$ has an anode terminal connected to the $VSS_1$, and a cathode terminal connected to the drain terminal of the second output transistor $I_1$. The third diode $Dc_1$ has such a characteristic as to generate a reverse current when a reverse voltage corresponding to a voltage that exceeds the withstand voltage of the battery state monitoring circuit is applied between the anode terminal and the cathode terminal. The fourth diode $Dd_1$ has an anode terminal connected to the $VSS_1$, and a cathode terminal connected to the input terminal of the fourth inverter $K_1$. It is assumed that the voltage drop of the fourth diode $Dd_1$ is 0.7 V.

Further, resistive elements are connected between the first transmitting terminal of the downstream side battery state monitoring circuit and the first receiving terminal of the upstream side battery state monitoring circuit, and between the second transmitting terminal of the downstream side battery state monitoring circuit and the second receiving terminal of the upstream side battery state monitoring circuit, respectively. Specifically, a resistive element $Ra_1$ is connected between the first transmitting terminal $PC_2$ of the battery state monitoring circuit $BMB_2$ and the first receiving terminal $PE_1$ of the battery state monitoring circuit $BMB_1$, and a resistive element $Rb_1$ is connected between the second transmitting terminal $PD_2$ of the battery state monitoring circuit $BMB_2$ and the second receiving terminal $PF_1$ of the battery state monitoring circuit $BMB_1$, respectively.

Subsequently, a description is given of the operation of the battery device according to the third embodiment, which is configured as described above. The operation in the cell balance state is identical with that of the first embodiment, and therefore its description is omitted.
(Normal State)

First, a description is given of a normal state, that is, a case in which all the voltages of the batteries $BT_1$ to $BT_n$ are lower than the overcharge voltage, and equal to or higher than the overdischarge voltage. In the normal state thus defined, the overcharge detector circuit $A_1$ of the battery state monitoring circuit $BMB_1$ outputs the overcharge detection signal of low level to the first NOR circuit $B_1$.

In this situation, the first output transistor $C_2$ of the battery state monitoring circuit $BMB_2$ is on. As a result, the input terminal of the second inverter $E_1$ of the battery state monitoring circuit $BMB_1$ becomes at low level, and the output signal of low level is output from the first inverter $D_1$ to the first NOR circuit $B_1$. The first NOR circuit $B_1$ outputs the NOR signal of high level to the gate terminal of the first output transistor $C_1$. As a result, the first output transistor $C_1$ is turned on, and hence the first transmitting terminal $PC_1$ becomes at low level, and the first transistor 10 is turned on.

In this situation, when the first output transistor $C_2$ of the battery state monitoring circuit $BMB_2$ is on, the first receiving terminal $PE_1$ of the battery state monitoring circuit $BMB_1$ is connected to the $VSS_2$ through the resistive element $Ra_1$. However, the first receiving terminal $PE_1$ includes the second diode $Db_1$, and hence the voltage is clamped to $VSS_1-0.7$ V, and does not decrease lower than that value.

Further, in the above-mentioned normal state, the overdischarge detector circuit $G_1$ of the battery state monitoring circuit $BMB_1$ outputs the overdischarge detection signal of low level to the second NOR circuit $H_1$. In this situation, the second output transistor $I_2$ of the battery state monitoring circuit $BMB_2$ is also on. Therefore, the input terminal of the fourth inverter $K_1$ in the battery state monitoring circuit $BMB_1$ becomes at low level, and the output signal of low level is output to the second NOR circuit $H_1$ from the third inverter $J_1$. The second NOR circuit $H_1$ outputs the NOR signal of high level to the gate terminal of the second output transistor $I_n$. As a result, the second output transistor $I_1$ is turned on, and hence the second transmitting terminal $PD_1$ becomes at low level, and the second transistor 11 is turned on.

Similarly, the voltage of the second receiving terminal $PF_1$ of the battery state monitoring circuit $BMB_1$ is clamped to $VSS_1-0.7$ V.

As described above, in the normal state, the first transistor 10 and the second transistor 11 are turned on, and hence the battery device becomes chargeable and dischargeable.
(Overcharged State)

Subsequently, a description is given of an overcharged state, that is, a case in which a charger is connected between the first external terminal 30 and the second external terminal 31 to charge the batteries $BT_1$ to $BT_n$, and at least one voltage of those batteries $BT_1$ to $BT_n$ becomes equal to or higher than the overcharge voltage. In the following description, it is assumed that the voltage of the battery $BT_2$ is equal to or higher than the overcharge voltage.

In this case, the overcharge detector circuit $A_2$ of the battery state monitoring circuit $BMB_2$ outputs the overcharge detection signal of high level to the first NOR circuit $B_2$. In this situation, the output signal of low level is output from the first inverter $D_2$, and hence the first NOR circuit $B_2$ outputs the NOR signal of low level to the gate terminal of the first output transistor $C_2$. As a result, the first output transistor $C_2$ is turned off.

That is, the input terminal of the second inverter $E_1$ is pulled up to high level by means of the first current source $F_1$.

As a result, a voltage recognized as high level is applied to the input terminal of the second inverter $E_1$, and the output signal of high level is output to the first NOR circuit $B_1$ from the first inverter $D_1$. On the other hand, the overcharge detector circuit $A_1$ outputs the overcharge detection signal of low level to the first NOR circuit $B_1$ and hence the first NOR circuit $B_1$ outputs the NOR signal of low level to the gate terminal of the first output transistor $C_1$. As a result, the first output transistor $C_1$ is turned off.

In this situation, the first transmitting terminal $PC_2$ of the battery state monitoring circuit $BMB_2$ is pulled up to the $VDD_1$ through the resistive element $Ra_1$. However, the first transmitting terminal $PC_2$ includes a first diode $Da_2$, and hence the terminal voltage is clamped to $VSS_2+4.5$ V by a voltage (4.5 V) that causes the reverse current of the first diode $Da_2$ to be generated. Further, the resistance of the resistive element $Ra_1$ is set to a value that allows the voltage of the input terminal of the second inverter $E_1$ to be pulled up to high level by the first current source $F_1$.

As described above, when the first output transistor $C_1$ is turned off, the gate of the first transistor 10 becomes at high level by means of the first resistive element 20, and the first transistor 10 is turned off. As a result, the charging from the charger is prohibited.
(Overdischarged State)

Subsequently, a description is given of an overdischarged state, that is, a case in which a load is connected between the first external terminal 30 and the second external terminal 31 to discharge the batteries $BT_1$ to $BT_n$, and at least one voltage of those batteries $BT_1$ to $BT_n$ becomes lower than the overdischarge voltage. In the following description, it is assumed that the voltage of the battery $BT_2$ is lower than the overdischarge voltage.

In this case, the overdischarge detector circuit $G_2$ of the battery state monitoring circuit $BMB_2$ outputs the overdischarge detection signal of high level to the second NOR circuit $H_2$. In this situation, the output signal of low level is output from the third inverter $J_2$, and hence the second NOR circuit $H_2$ outputs the NOR signal of low level to the gate terminal of the second output transistor $I_2$. As a result, the second output transistor $I_2$ is turned off.

That is, the input terminal of the fourth inverter $K_1$ is pulled up to high level by means of the second current source $L_1$. As a result, a voltage recognized as high level is applied to the input terminal of the fourth inverter $K_1$, and the output signal of high level is output to the second NOR circuit $H_1$ from the third inverter $J_1$. On the other hand, the overdischarge detector circuit $G_1$ outputs the overdischarge detection signal of low level to the second NOR circuit $H_1$, and hence the second NOR circuit $H_1$ outputs the NOR signal of low level to the gate terminal of the second output transistor $I_1$. As a result, the second output transistor $I_1$ is turned off.

In this situation, the second transmitting terminal $PD_2$ of the battery state monitoring circuit $BMB_2$ is pulled up to the $VDD_1$ through the resistive element $Rb_1$. However, the second transmitting terminal $PD_2$ includes a third diode $Dc_2$, and hence the terminal voltage is clamped to $VSS_2+4.5$ V by a voltage (4.5 V) that causes the reverse current of the third diode $Dc_2$ to be generated. Further, the resistance of the resistive element $Rb_1$ is set to a value that allows the voltage of the input terminal of the fourth inverter $K_1$ to be pulled up to high level by the second current source $L_1$ As described above, when the second output transistor $I_1$ is turned off, the gate of the second transistor 11 becomes at high level, and the second transistor 11 is turned off. As a result, the discharging to the load is prohibited.

As is apparent from the above-mentioned description, in the third embodiment, in the battery state monitoring circuit that has detected the overcharged state or the overdischarged state, the first output transistor or the second output transistor is turned off, and a voltage for one cell (one battery) is applied to the downstream side first output transistor or second output transistor which has been turned off by the pull-up operation in the upstream side battery state monitoring circuit. That is, the withstand voltage of one battery state monitoring circuit needs to be equal to or higher than the voltage for at least one cell. As a result, according to the third embodiment, the battery state monitoring circuit that is lower in withstand voltage than that of the first embodiment can be fabricated, and a range of the available manufacturing process is further broadened.

Fourth Embodiment

Figure 4:
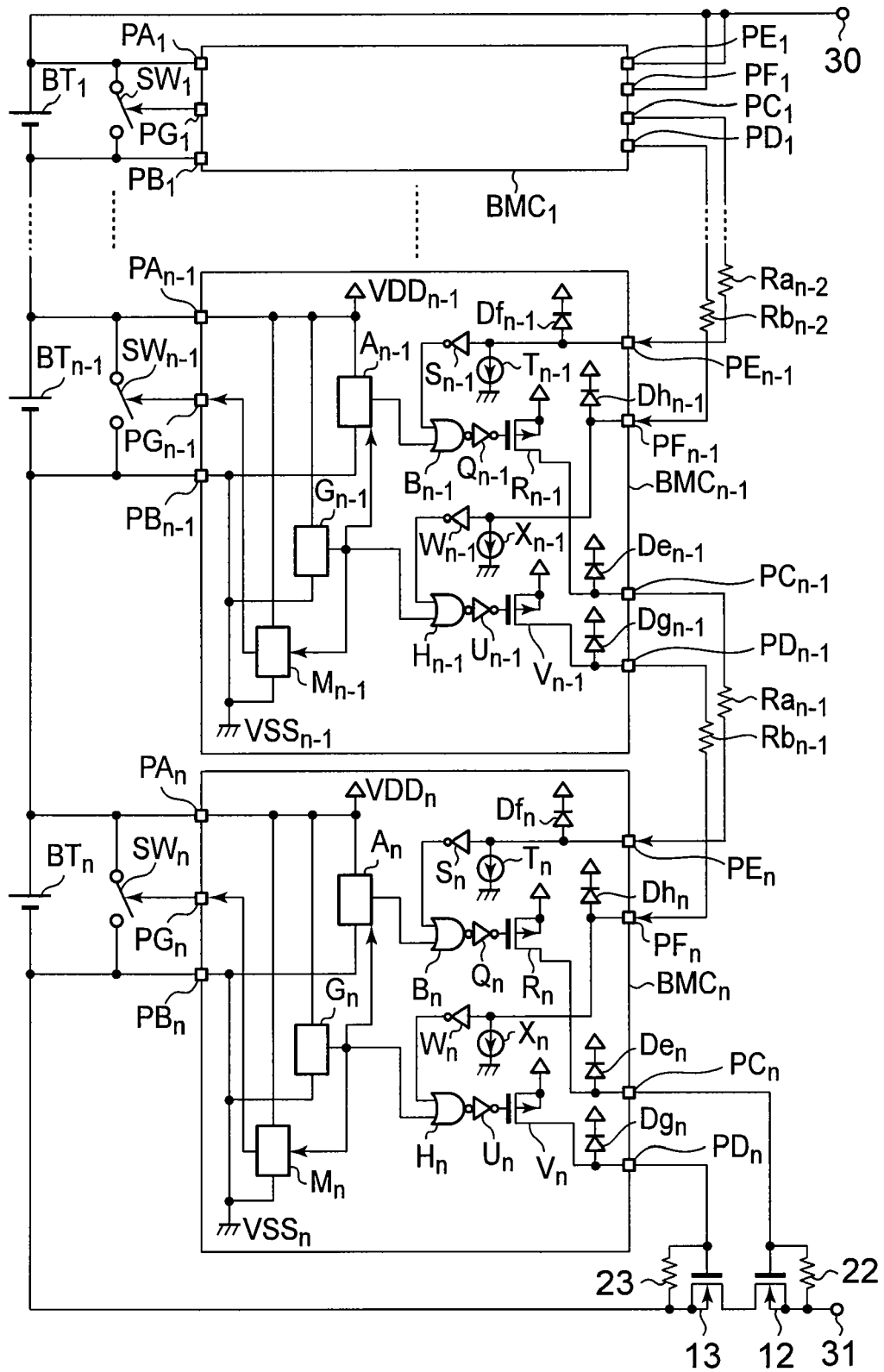
FIG. 4 A circuit configuration diagram illustrating a battery device according to a fourth embodiment of the present invention.

Subsequently, a description is given of a battery device according to a fourth embodiment. FIG. 4 is a circuit configuration diagram illustrating the battery device according to the fourth embodiment. As illustrated in FIG. 4, in the fourth embodiment, two types of diodes are disposed in the battery state monitoring circuit of the second embodiment. That is, when it is assumed that the symbols of the battery state monitoring circuits are $BMC_1$ to $BMC_n$, the battery state monitoring circuit $BMC_n$ newly includes a first diode $De_n$, a second diode $Df_n$, a third diode $Dg_n$, and a fourth diode $Dh_n$ in addition to the components of the second embodiment. The same is applied to the other battery state monitoring circuits. In the following description, the battery state monitoring circuit $BMC_n$ is representatively described.

The first diode $De_n$ has an anode terminal connected to the drain terminal of the first output transistor $R_n$, and a cathode terminal connected to the $VDD_n$. The first diode $De_n$ has such a characteristic as to generate a reverse current when a reverse voltage corresponding to a voltage (for example, 4.5 V) that exceeds the withstand voltage of the battery state monitoring circuit is applied between the anode terminal and the cathode terminal. The second diode $Df_n$ has an anode terminal connected to the input terminal of the second inverter $S_n$, and a cathode terminal connected to the $VDD_n$. It is assumed that the voltage drop of the second diode $Df_n$ is 0.7 V.

The third diode $Dg_n$ has an anode terminal connected to the drain terminal of the second output transistor $V_n$, and a cathode terminal connected to the $VDD_n$. The third diode $Dg_n$ has such a characteristic as to generate a reverse current when a reverse voltage corresponding to a voltage (for example, 4.5 V) that exceeds the withstand voltage of the battery state monitoring circuit is applied between the anode terminal and the cathode terminal. The fourth diode $Dh_n$ has an anode terminal connected to the input terminal of the fourth inverter $W_n$, and a cathode terminal connected to the $VDD_n$. It is assumed that the voltage drop of the fourth diode $Dh_n$ is 0.7 V.

Further, resistive elements are connected between the first transmitting terminal of the upstream side battery state monitoring circuit and the first receiving terminal of the downstream side battery state monitoring circuit, and between the second transmitting terminal of the upstream side battery state monitoring circuit and the second receiving terminal of the downstream side battery state monitoring circuit, respectively. Specifically, a resistive element $Ra_{n-1}$ is connected between the first transmitting terminal $PC_{n-1}$ of the battery state monitoring circuit $BMC_{n-1}$ and the first receiving terminal $PE_n$ of the battery state monitoring circuit $BMC_n$, and a resistive element $Rb_{n-1}$ is connected between the second transmitting terminal $PD_{n-1}$ of the battery state monitoring circuit $BMC_{n-1}$ and the second receiving terminal $PF_{n-1}$ of the battery state monitoring circuit $BMC_n$, respectively.

Subsequently, a description is given of the operation of the battery device according to the fourth embodiment, which is configured as described above. The operation in the cell balance state is identical with that of the first embodiment, and therefore its description is omitted.

(Normal State)

First, a description is given of a normal state, that is, a case in which all the voltages of the batteries $BT_1$ to $BT_n$ are lower than the overcharge voltage, and equal to or higher than the overdischarge voltage. In the normal state thus defined, the overcharge detector circuit $A_n$ of the battery state monitoring circuit $BMC_n$ outputs the overcharge detection signal of low level to the first NOR circuit $B_n$.

In this situation, the first output transistor $R_{n-1}$ of the battery state monitoring circuit $BMC_{n-1}$ is on. As a result, the input terminal of the second inverter $S_n$ of the battery state monitoring circuit $BMC_n$ becomes at high level, and the output signal of low level is output from the second inverter $S_n$ to the first NOR circuit $B_n$. The first NOR circuit $B_n$ outputs the NOR signal of high level to the first inverter $Q_n$, and the first inverter $Q_n$ outputs the NOT signal of low level to the gate terminal of the first output transistor $R_n$. As a result, the first output transistor $R_n$ is turned on, and hence the first transmitting terminal $PC_n$ becomes at high level, and the first transistor 12 is turned on.

Further, in the above-mentioned normal state, the overdischarge detector circuit $G_n$ of the battery state monitoring circuit $BMC_n$ outputs the overdischarge detection signal of low level to the second NOR circuit $H_n$. In this situation, the second output transistor $V_{n-1}$ of the battery state monitoring circuit $BMC_{n-1}$ is on. Therefore, the input terminal of the fourth inverter $W_n$ in the battery state monitoring circuit $BMC_n$ becomes at high level, and the output signal of low level is output to the second NOR circuit $H_n$ from the fourth inverter $W_n$. The second NOR circuit $H_n$ outputs the NOR signal of high level to the third inverter $U_n$, and the third inverter $U_n$ outputs the NOT signal of low level to the gate terminal of the second output transistor $V_n$. As a result, the second output transistor $V_n$ is turned on, and hence the second transmitting terminal $PD_n$ becomes at high level, and the second transistor 13 is turned on.

As described above, in the normal state, the first transistor 12 and the second transistor 13 are turned on, and hence the battery device becomes chargeable and dischargeable.

(Overcharged State)

Subsequently, a description is given of an overcharged state, that is, a case in which a charger is connected between the first external terminal 30 and the second external terminal 31 to charge the batteries $BT_1$ to $BT_n$, and at least one voltage of those batteries $BT_1$ to $BT_n$ becomes equal to or higher than the overcharge voltage. In the following description, it is assumed that the voltage of the battery $BT_{n-1}$ is equal to or higher than the overcharge voltage.

In this case, the overcharge detector circuit $A_{n-1}$ of the battery state monitoring circuit $BMC_{n-1}$ outputs the overcharge detection signal of high level to the first NOR circuit $B_{n-1}$. In this situation, the output signal of low level is output from the second inverter $S_{n-1}$, and hence the first NOR circuit $B_{n-1}$ outputs the NOR signal of low level to the first inverter $Q_{n-1}$, and the first inverter $Q_{n-1}$ outputs the NOT signal of high level to the gate terminal of the first output transistor $R_{n-1}$ As a result, the first output transistor $R_{n-1}$ is turned off.

That is, the input terminal of the second inverter $S_n$ is pulled down to low level by means of the first current source $T_n$. When the pull-down voltage becomes equal to or lower than $VDD_n$-4.5 V, a current flows in the $VSS_n$ through a first diode $De_{n-1}$ of the battery state monitoring circuit $BMC_{n-1}$. That is, the input terminal of the second inverter $S_n$ is clamped to $VDD_n$-4.5 V, and under that condition, the voltage does not satisfy the operating voltage (voltage that is recognized as low level) of the second inverter $S_n$. Therefore, the resistance of the resistive element $Ra_{n-1}$ is set so that the voltage of the input terminal of the second inverter $S_n$ reaches the operating voltage.

With the above-mentioned configuration, a voltage recognized as low level is applied to the input terminal of the second inverter $S_n$, and the output signal of high level is output to the first NOR circuit $B_n$ from the second inverter $S_n$. On the other hand, the overcharge detector circuit $A_n$ outputs the overcharge detection signal of low level to the first NOR circuit $B_n$, and hence the first NOR circuit $B_n$ outputs the NOR signal of low level to the first inverter $Q_n$, and the first inverter $Q_n$ outputs the NOT signal of high level to the gate terminal of the first output transistor $R_n$. As a result, the first output transistor $R_n$ is turned off.

As described above, when the first output transistor $R_n$ is turned off, the gate of the first transistor 12 becomes at low level, and the first transistor 12 is turned off. As a result, the charging from the charger is prohibited.

(Overdischarged State)

Subsequently, a description is given of an overdischarged state, that is, a case in which a load is connected between the first external terminal 30 and the second external terminal 31 to discharge the batteries $BT_1$ to $BT_n$, and at least one voltage of those batteries $BT_1$ to $BT_n$ becomes lower than the overdischarge voltage. In the following description, it is assumed that the voltage of the battery $BT_{n-1}$ is lower than the overdischarge voltage.

In this case, the overdischarge detector circuit $G_{n-1}$ of the battery state monitoring circuit $BMC_{n-1}$ outputs the overdischarge detection signal of high level to the second NOR circuit $H_{n-1}$. In this situation, the output signal of low level is output from the fourth inverter $W_{n-1}$, and thus the second NOR circuit $H_{n-1}$ outputs the NOR signal of low level to the third inverter $U_{n-1}$, and the third inverter $U_{n-1}$ outputs the NOT signal of high level to the gate terminal of the second output transistor $V_{n-1}$. As a result, the second output transistor $V_{n-1}$ is turned off.

That is, the input terminal of the fourth inverter $W_n$ is pulled down to low level by means of the second current source $X_n$. When the pull-down voltage becomes equal to or lower than $VDD_n$-4.5 V, a current flows in the $VSS_n$ through a third diode $Dg_{n-1}$ of the battery state monitoring circuit $BMC_{n-1}$. That is, the input terminal of the fourth inverter $W_n$ is clamped to $VDD_n$-4.5 V, and in that condition, the voltage does not satisfy the operating voltage (voltage that is recognized as low level) of the fourth inverter $W_n$. Therefore, the resistance of the resistive element $Rb_{n-1}$ is set so that the voltage of the input terminal of the fourth inverter $W_n$ reaches the operating voltage.

With the above-mentioned configuration, a voltage recognized as low level is applied to the input terminal of the fourth inverter $W_n$, and the output signal of high level is output to the second NOR circuit $H_n$ from the fourth inverter $W_n$. On the other hand, the overdischarge detector circuit $G_n$ outputs the overdischarge detection signal of low level to the second NOR circuit $H_n$, and thus the second NOR circuit $H_n$ outputs the NOR signal of low level to the third inverter $U_n$, and the third inverter $U_n$ outputs the NOT signal of high level to the gate terminal of the second output transistor $V_n$. As a result, the second output transistor $V_n$ is turned off.

As described above, when the second output transistor $V_n$ is turned off, the gate terminal of the second transistor 13 becomes low level, and the second transistor 13 is turned off. As a result, the discharging to the load is prohibited.

As described above, according to the fourth embodiment, the withstand voltage of one battery state monitoring circuit needs to be equal to or higher than the voltage for at least one cell as in the third embodiment. As a result, according to the fourth embodiment, the battery state monitoring circuit that is further lower in withstand voltage than that of the second embodiment can be fabricated, and a range of the available manufacturing process is further broadened.

Fifth Embodiment

Figure 5:
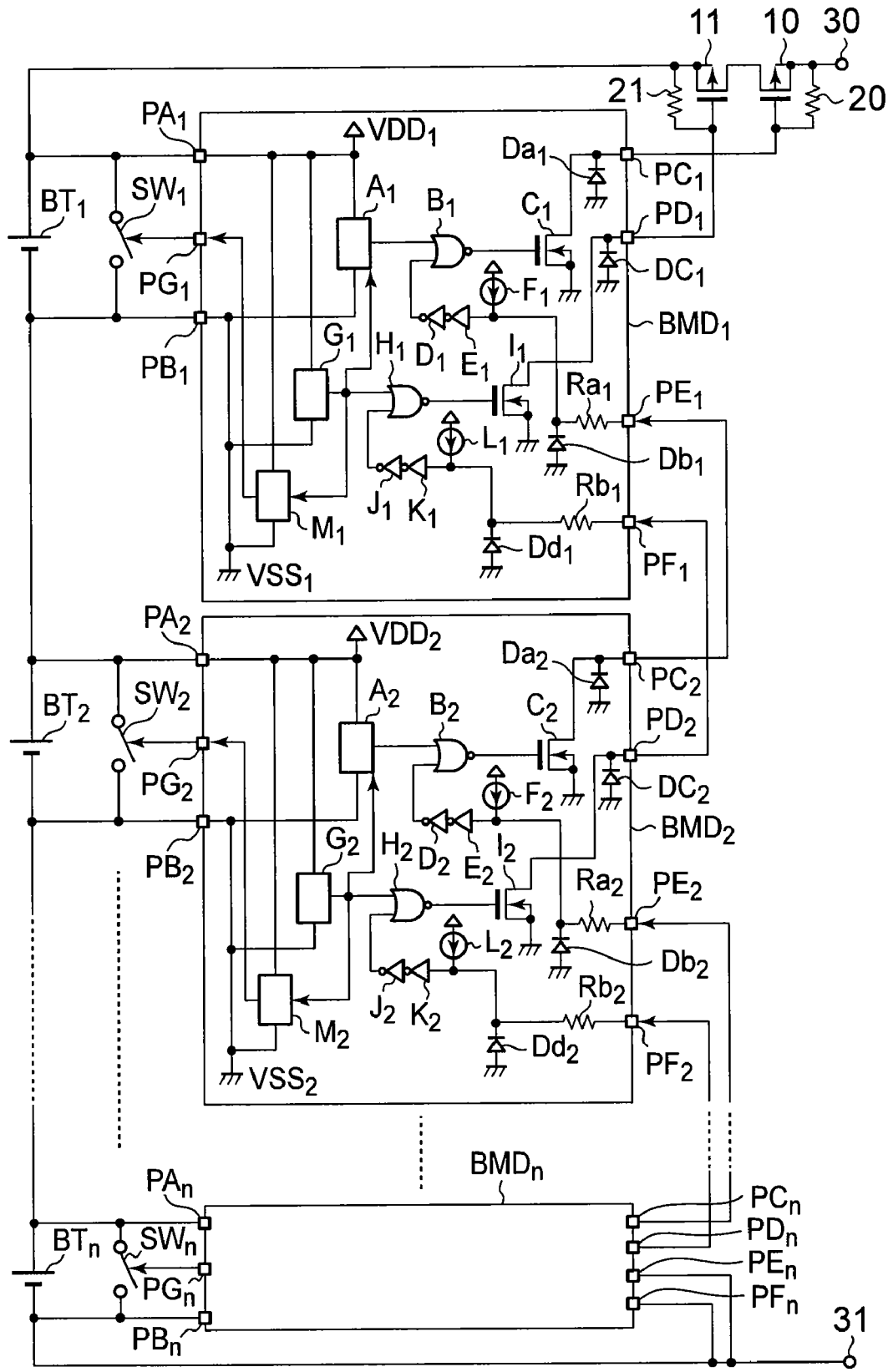
FIG. 5 A circuit configuration diagram illustrating a battery device according to a fifth embodiment of the present invention.

Subsequently, a description is given of a battery device according to a fifth embodiment. FIG. 5 is a circuit configuration diagram illustrating the battery device according to the fifth embodiment. As illustrated in FIG. 5, in the fifth embodiment, the resistive elements that are disposed in the exterior of the battery state monitoring circuit in the third embodiment are disposed in the interior of the battery state monitoring circuit.

Battery state monitoring circuits $BMD_n$ to $BMD_n$ have the same configuration, and hence the battery state monitoring circuit $BMD_1$ is representatively described. The resistive element $Ra_1$ is connected between the first receiving terminal $PE_1$ and the cathode of the second diode $Db_1$ in the battery state monitoring circuit $BMD_n$. Further, the resistive element $Rb_1$ is connected between the second receiving terminal $PF_1$ and the cathode of the fourth diode $Dd_1$.

The operation is identical with that in the third embodiment, and therefore its description is omitted.

With the above-mentioned configuration, a manufacturer of the battery device may merely prepare the battery state monitoring circuits $BMD_1$ of the same number as the number of batteries, and connect the upstream side and downstream side battery state monitoring circuits through no resistive element, thereby contributing to a reduction in manufacturing process. The provision of the resistive elements in the interior of the battery state monitoring circuit causes an increase in sizes of the battery state monitoring circuit and an increase in costs. In order to prevent this drawback, there can be applied the third embodiment.

Sixth Embodiment

Figure 6:
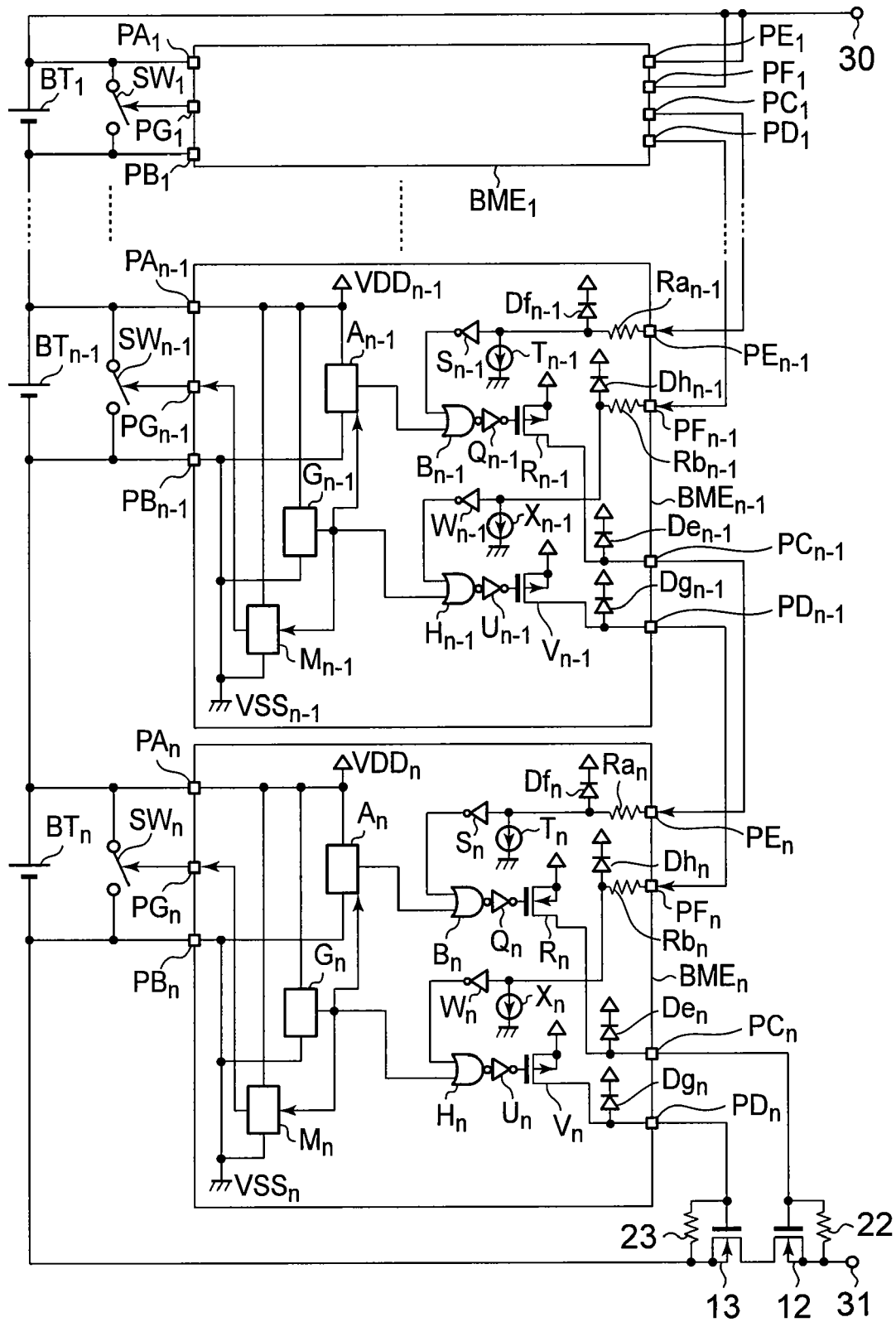
FIG. 6 A circuit configuration diagram illustrating a battery device according to a sixth embodiment of the present invention.
Figure 7:
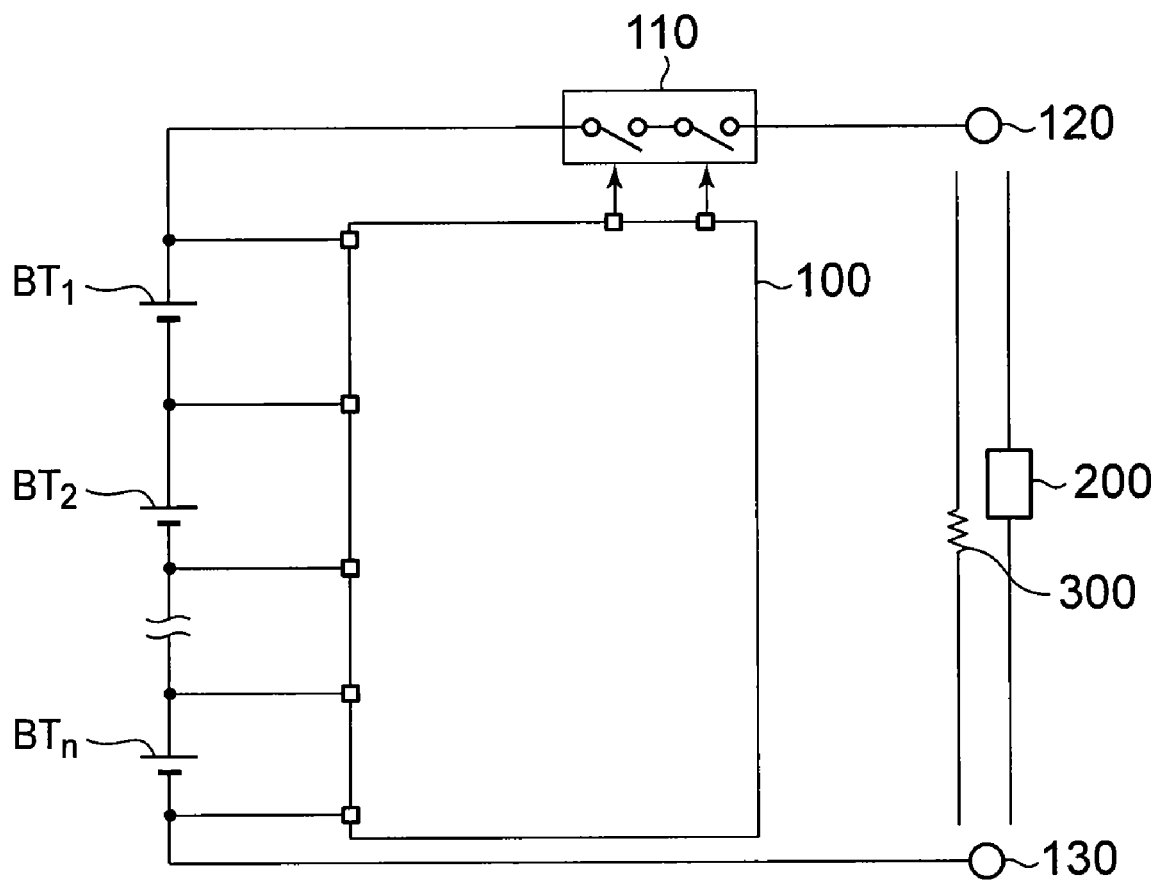
FIG. 7 A circuit configuration diagram illustrating a battery device according to a conventional art.

Subsequently, a description is given of a battery device according to a sixth embodiment. FIG. 6 is a circuit configuration diagram illustrating the battery device according to the sixth embodiment. As illustrated in FIG. 6, in the sixth embodiment, the resistive elements that are disposed in the exterior of the battery state monitoring circuit in the fourth embodiment are disposed in the interior of the battery state monitoring circuit.

The battery state monitoring circuits $BME_1$ to $BME_n$ are of the same configuration, and hence the battery state monitoring circuit $BME_1$ is representatively described. In the battery state monitoring circuit $BME_1$, a resistive element Ran is connected between the first receiving terminal $PE_n$ and the anode of the second diode $Df_n$, and a resistive element $Rb_n$ is connected between the second receiving terminal $PF_n$ and the anode of the fourth diode $Dh_n$.

The operation is identical with that in the fourth embodiment, and therefore its description is omitted.

With the above-mentioned configuration, a manufacturer of the battery device may merely prepare the battery state monitoring circuits $BME_n$ of the same number as the number of batteries, and connect the upstream side and downstream side battery state monitoring circuits through no resistive element, thereby contributing to a reduction in manufacturing process. The provision of the resistive elements in the interior of the battery state monitoring circuit causes an increase in sizes of the battery state monitoring circuit and an increase in costs. In order to prevent this drawback, there can be applied the fourth embodiment.

Seventh Embodiment

Figure 8:
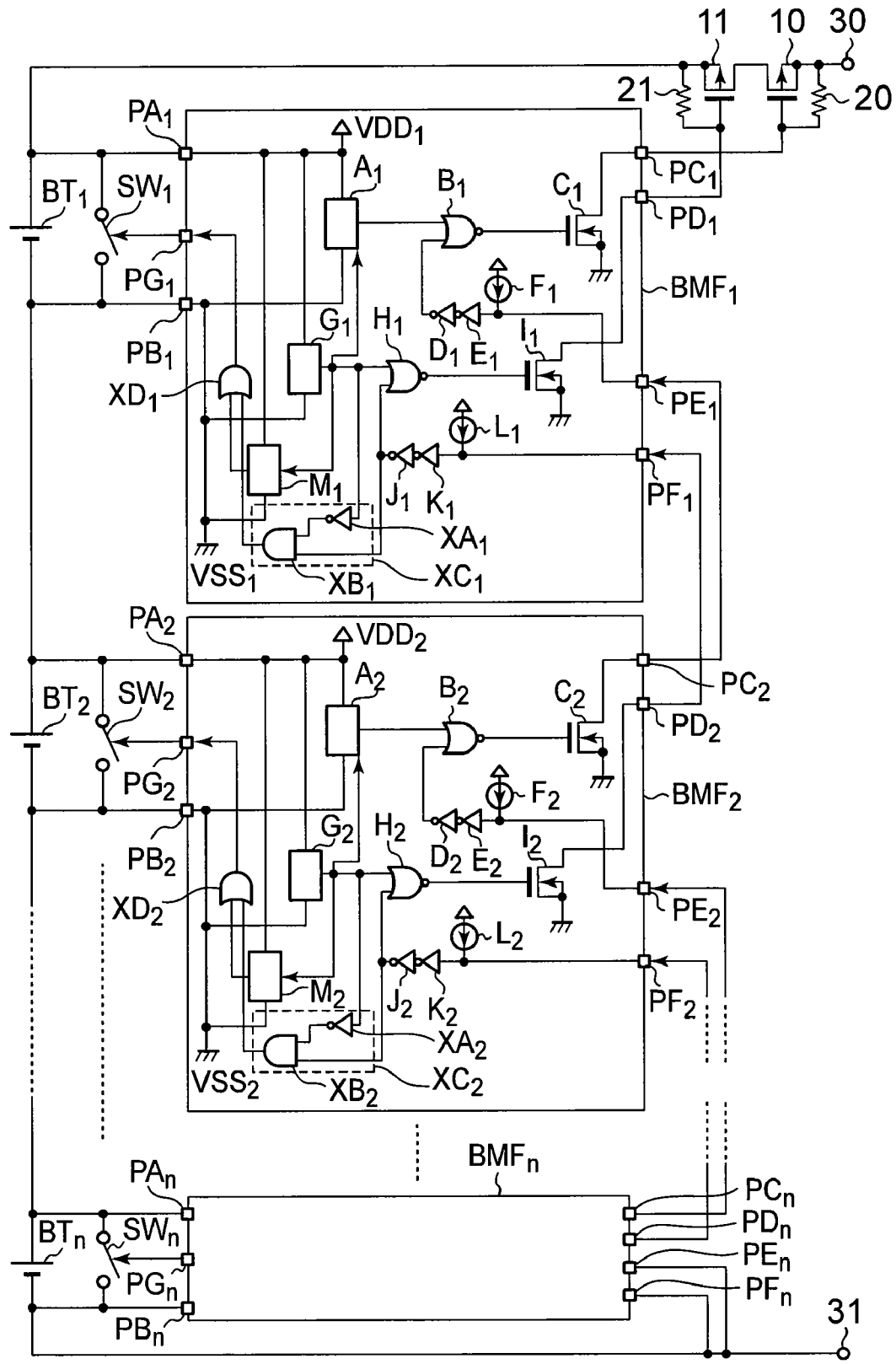
FIG. 8 A circuit configuration diagram illustrating a battery device according to a seventh embodiment of the present invention.

FIG. 8 is a circuit configuration diagram of a battery device according to a seventh embodiment. Referring to FIG. 8, the same configuration elements as those of FIG. 1 are denoted by identical symbols, and their description is omitted. For distinguishing from FIG. 1, the symbols of the battery state monitoring circuits are $BMF_1$ to $BMF_n$. Further, the circuit configurations of those battery state monitoring circuits $BMF_1$ to $BMF_n$ are identical with each other, and hence the battery state monitoring circuit $BMF_1$ is representatively described.

As illustrated in FIG. 8, in the seventh embodiment, an overdischarge cell balance circuit $XC_1$ and a first OR circuit $XD_1$ are added to the battery state monitoring circuit of the first embodiment. The overdischarge cell balance circuit $XC_1$ includes a fifth inverter $XA_1$ that receives an overdischarge detection signal from an overdischarge detector circuit $G_1$, and a first AND circuit $XB_1$ that receives an output of the fifth inverter $XA_1$ and an output of the third inverter $J_1$. Further, the first OR circuit $XD_1$ receives the outputs of the overdischarge cell balance circuit $XC_1$ and the cell balance circuit $M_1$, and outputs a control signal to a switch $SW_1$ through a control terminal $PG_1$. The same is applied to other battery state monitoring circuits.

Subsequently, the operation of the battery device according to the seventh embodiment, which is configured as described above, is described. The operation in the normal state, in the cell balance state, and in the overcharged state is identical with that of the first embodiment, and therefore is omitted from description.

(Overdischarged State)

A description is given of a case of the overdischarged state, that is, a case in which a load is connected between the first external terminal 30 and the second external terminal 31 to discharge the batteries $BT_1$ to $BT_n$, and the voltage of at least one of those batteries $BT_1$ to $BT_n$ is lower than the overdischarge voltage. In the following description, it is assumed that the voltage of the battery $BT_1$ is higher than the overdischarge voltage, and the voltage of the battery $BT_2$ is lower than the overdischarge voltage.

In this case, the overdischarge detector circuit $G_2$ of the battery state monitoring circuit $BMF_2$ outputs an overdischarge detection signal of high level to the second NOR circuit $H_2$. Then, the second NOR circuit $H_2$ outputs a NOR signal of low level to the gate terminal of a second output transistor $I_2$. As a result, the second output transistor $I_2$ is turned off.

An input terminal of a fourth inverter $K_1$ is pulled up to the high level by the second current source $L_1$, and an output signal of the high level is output to the second NOR circuit $H_1$ from the third inverter $J_1$. Then, the second NOR circuit $H_1$ outputs a NOR signal of the low level to the gate terminal of the second output transistor $I_1$. As a result, the second output transistor $I_1$ is turned off.

When the second output transistor $I_1$ is turned off as described above, the gate of the second transistor 11 becomes high level by the second resistive element 21, and the second transistor 11 is turned off. Therefore, discharge to the load is prohibited.

Further, the voltage of the battery $BT_1$ is higher than the overdischarge voltage, and hence the overdischarge detector circuit $G_1$ outputs a signal of the low level. Accordingly, the first AND circuit $XB_1$ outputs a signal of the high level, that is, an overdischarge cell balance signal to the first OR circuit $XD_1$ because the first AND circuit $XB_1$ receives a signal of the high level from the fifth inverter $XA_1$ and a signal of the high level from the third inverter $J_1$ as inputs.

In this case, when the voltage of the battery $BT_1$ is lower than the cell balance voltage, the cell balance circuit $M_1$ outputs no cell balance signal. However, upon receiving the overdischarge cell balance signal, the first OR circuit $XD_1$ turns on the switch $SW_1$ through the control terminal $PG_1$, and the battery $BT_1$ is discharged through the switch $SW_1$. When discharge is advanced, and the voltage of the battery $BT_1$ reaches the overdischarge voltage, an overdischarge detection signal of the high level is output from the overdischarge detector circuit $G_1$. As a result, the first OR circuit $XD_1$ turns off the switch $SW_1$ through the control terminal $PG_1$ to stop the discharge.

With the above-mentioned operation, both of the battery $BT_1$ and the battery $BT_2$ reach a voltage close to the overdischarge voltage. Cell balance is thus taken, thereby enabling the operating time of the battery device to be lengthened.

Eighth Embodiment

Figure 9:
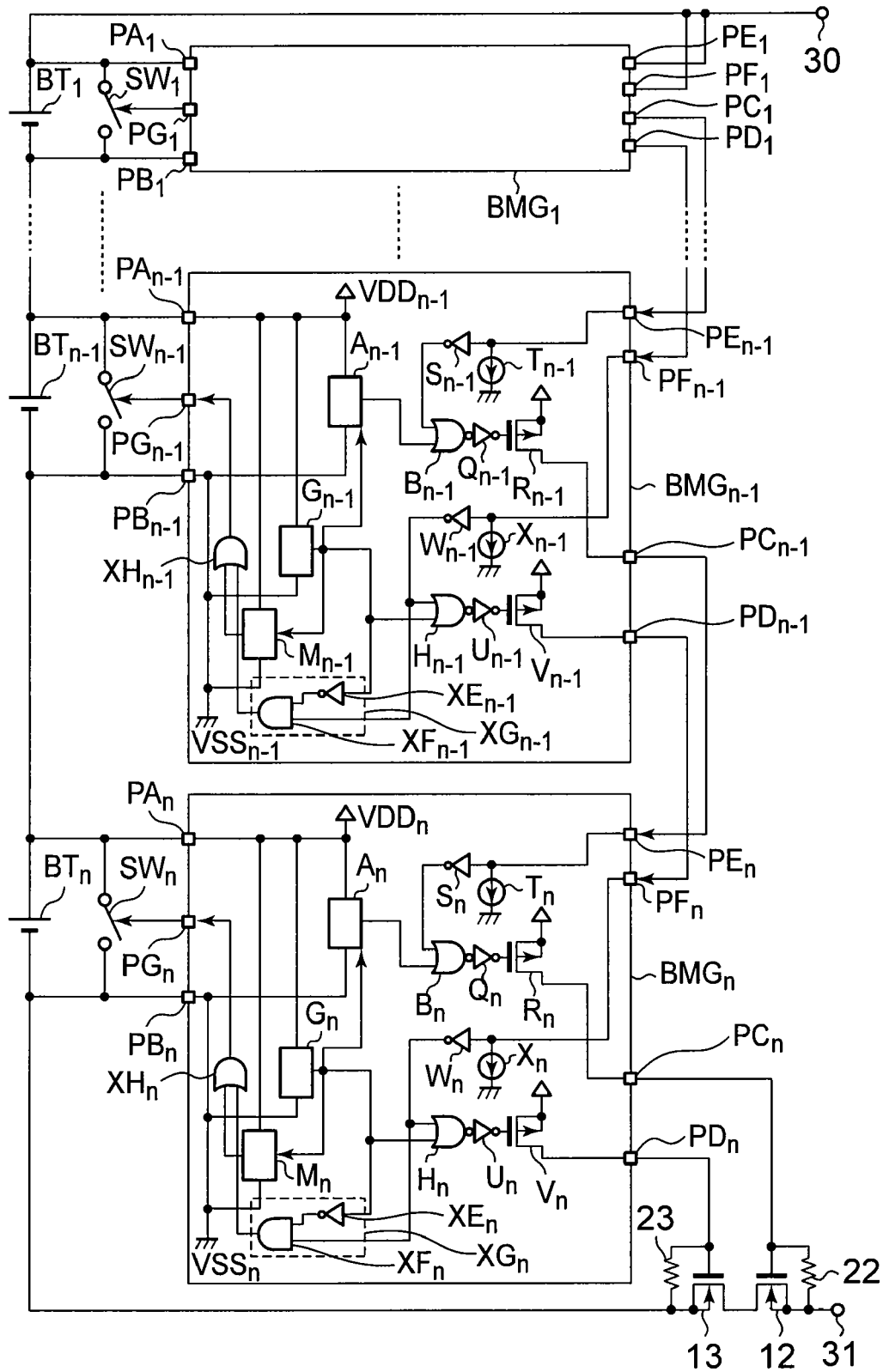
FIG. 9 A circuit configuration diagram illustrating a battery device according to an eighth embodiment of the present invention.

FIG. 9 is a circuit configuration diagram of a battery device according to an eighth embodiment. Referring to FIG. 8, the same configuration elements as those of FIG. 2 are denoted by identical symbols, and their description is omitted. For distinguishing from FIG. 2, the symbols of the battery state monitoring circuits are $BMG_1$ to $BMG_n$. Further, the circuit configurations of those battery state monitoring circuits $BMG_1$ to $BMG_n$ are identical with each other, and hence the battery state monitoring circuit $BMG_n$ is representatively described.

As illustrated in FIG. 9, in the eighth embodiment, an overdischarge cell balance circuit $XG_n$ and a first OR circuit $XH_n$ are added to the battery state monitoring circuit of the second embodiment. The overdischarge cell balance circuit $XG_n$ includes a fifth inverter $XE_n$, that receives an overdischarge detection signal from an overdischarge detector circuit $G_n$, and a first AND circuit $XF_n$ that receives an output of the fifth inverter $XE_n$ and an output of the fourth inverter $W_n$. Further, the first OR circuit $XH_n$ receives the outputs of the overdischarge cell balance circuit $XG_n$ and the cell balance circuit $M_n$, and outputs a control signal to a switch $SW_n$ through a control terminal $PG_n$. The same is applied to other battery state monitoring circuits.

Subsequently, the operation of the battery device according to the eighth embodiment, which is configured as described above, is described. The operation in the normal state, in the cell balance state, and in the overcharged state is identical with that of the second embodiment, and therefore is omitted from description.

(Overdischarged State)

A description is given of a case of the overdischarged state, that is, a case in which a load is connected between the first external terminal 30 and the second external terminal 31 to discharge the batteries $BT_1$ to $BT_n$, and the voltage of at least one of those batteries $BT_1$ to $BT_n$ is lower than the overdischarge voltage. In the following description, it is assumed that the voltage of the battery $BT_n$ is higher than the overdischarge voltage, and the voltage of the battery $BT_{n-1}$ is lower than the overdischarge voltage.

In this case, the overdischarge detector circuit $G_{n-1}$ of the battery state monitoring circuit $BMG_{n-1}$ outputs an overdischarge detection signal of high level to the second NOR circuit $H_{n-1}$. Then, the second NOR circuit $H_{n-1}$ outputs a NOR signal of low level to a third inverter $U_{n-1}$. The third inverter $U_{n-1}$ outputs a NOT signal of the high level to the gate terminal of a second output transistor $V_{n-1n-1}$. As a result, the second output transistor $V_{n-1}$ is turned off.

An input terminal of the fourth inverter $W_n$ is pulled down to the low level by the second current source $X_n$, and an output signal of the high level is output to the second NOR circuit $H_n$, from the fourth inverter $W_n$. Then, the second NOR circuit $H_n$ outputs a NOR signal of the low level to the third inverter $U_n$, and the third inverter $U_n$ outputs a NOT signal of the high level to the gate terminal of the second output transistor $V_n$. As a result, the second output transistor $V_n$ is turned off.

When the second output transistor $V_n$ is turned off as described above, the gate of the second transistor 13 becomes low level by the second resistive element 23, and the second transistor 13 is turned off. Therefore, discharge to the load is prohibited.

Further, the voltage of the battery $BT_n$ is higher than the overdischarge voltage, and hence the overdischarge detector circuit $G_n$ outputs a signal of the low level. Accordingly, the first AND circuit $XF_n$ outputs a signal of the high level, that is, an overdischarge cell balance signal to the first OR circuit $XH_n$ because the first AND circuit $XF_n$ receives a signal of the high level from the fifth inverter $XE_n$ and a signal of the high level from the third inverter $W_n$ as inputs.

In this case, when the voltage of the battery $BT_n$ is lower than the cell balance voltage, the cell balance circuit $M_n$ outputs no cell balance signal. However, upon receiving the overdischarge cell balance signal, the first OR circuit $XH_n$ turns on the switch $SW_n$ through the control terminal $PG_n$, and the battery $BT_n$ is discharged through the switch $SW_n$. When discharge is advanced, and the voltage of the battery $BT_n$ reaches the overdischarge voltage, an overdischarge detection signal of the high level is output from the overdischarge detector circuit $G_n$. As a result, the first OR circuit $XH_n$ turns off the switch $SW_n$ through the control terminal $PG_n$ to stop discharge.

With the above-mentioned operation, both of the battery $BT_n$ and the battery $BT_{n-1}$ reach a voltage close to the overdischarge voltage. Cell balance is thus taken, thereby enabling the operating time of the battery device to be lengthened.

Ninth Embodiment

Figure 10:
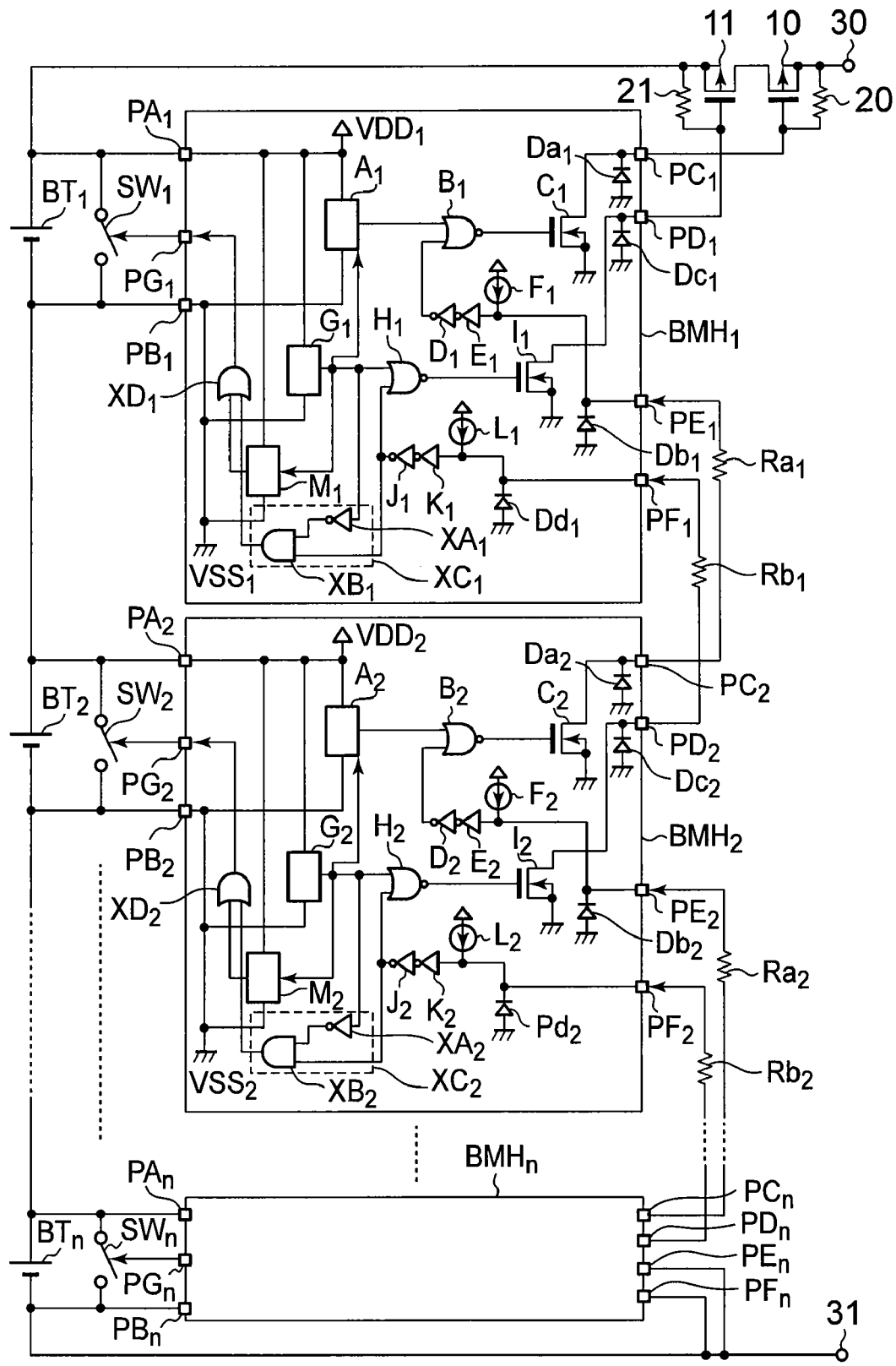
FIG. 10 A circuit configuration diagram illustrating a battery device according to a ninth embodiment of the present invention.

FIG. 10 is a circuit configuration diagram of a battery device according to a ninth embodiment. Referring to FIG. 10, the same configuration elements as those of FIG. 3 are denoted by identical symbols, and their description is omitted. For distinguishing from FIG. 3, the symbols of the battery state monitoring circuits are $BMH_1$ to $BMH_n$. Further, the circuit configurations of those battery state monitoring circuits $BMH_1$ to $BMH_n$ are identical with each other, and hence the battery state monitoring circuit $BMH_1$ is representatively described.

As illustrated in FIG. 10, in the ninth embodiment, an overdischarge cell balance circuit $XC_1$ and a first OR circuit $XD_1$ are added to the battery state monitoring circuit of the third embodiment. The overdischarge cell balance circuit $XC_1$ includes a fifth inverter $XA_1$ that receives an overdischarge detection signal from an overdischarge detector circuit $G_1$, and a first AND circuit $XB_1$ that receives an output of the fifth inverter $XA_1$ and an output of the third inverter $J_1$. Further, the first OR circuit $XD_1$ receives the outputs of the overdischarge cell balance circuit $XC_1$ and the cell balance circuit $M_1$, and outputs a control signal to the switch $SW_1$ through the control terminal $PG_1$. The same is applied to other battery state monitoring circuits.

The operation in the normal state, in the cell balance state, and in the overcharged state is identical with that of the third embodiment, and the operation in the overdischarged state is identical with that of the seventh embodiment, and therefore their description is omitted.

According to the ninth embodiment, the battery state monitoring circuit of the low withstand voltage can be fabricated as in the third embodiment, the region of the available manufacturing process is further widened, and cell balance is taken in the vicinity of the overdischarge detection voltage as in the seventh embodiment, thereby enabling the operating time of the battery device to be lengthened.

Tenth Embodiment

Figure 11:
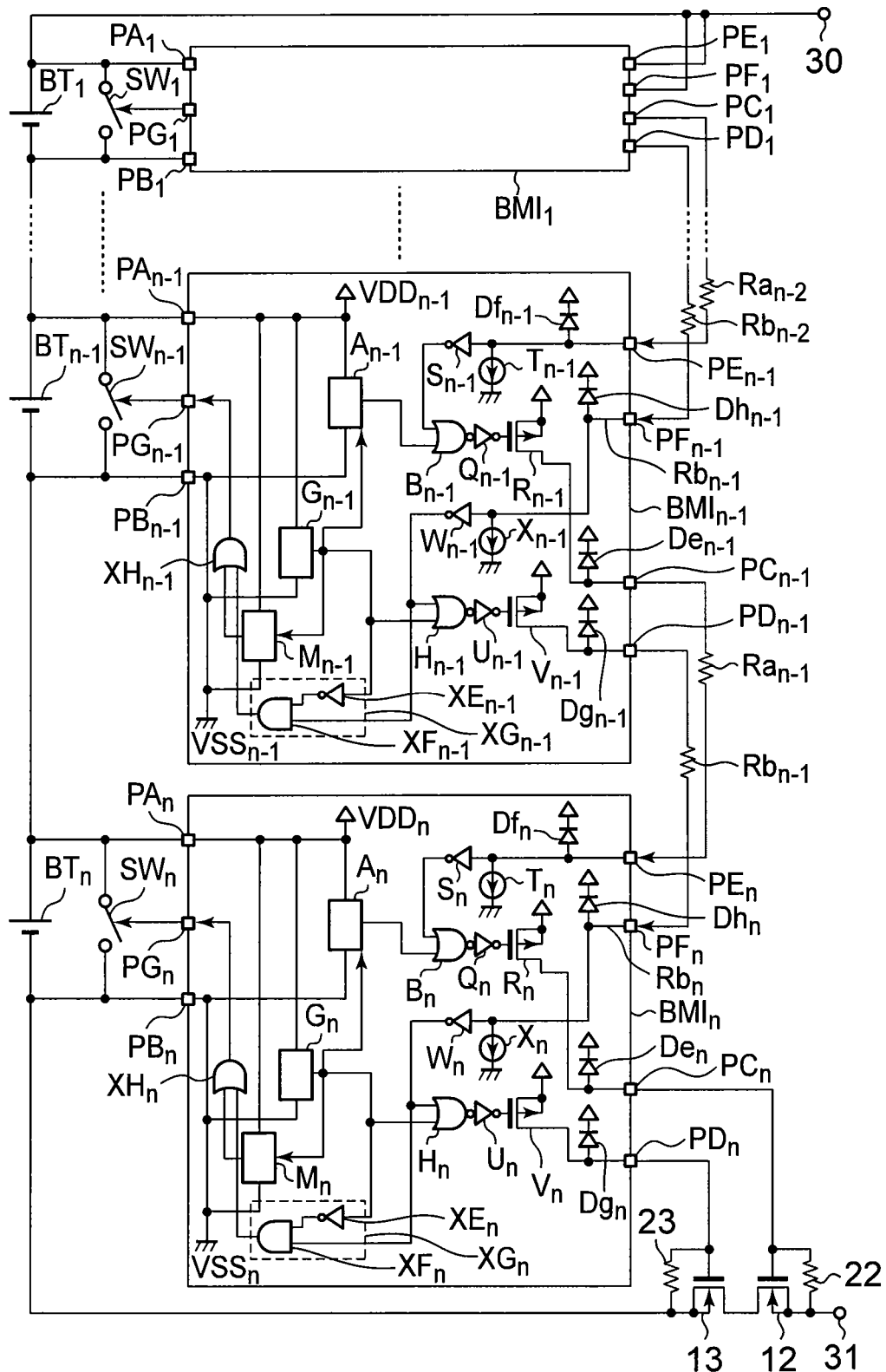
FIG. 11 A circuit configuration diagram illustrating a battery device according to a tenth embodiment of the present invention.

FIG. 11 is a circuit configuration diagram of a battery device according to a tenth embodiment. Referring to FIG. 11, the same configuration elements as those of FIG. 4 are denoted by identical symbols, and their description is omitted. For distinguishing from FIG. 4, the symbols of the battery state monitoring circuits are $BMI_1$ to $BMI_n$. Further, the circuit configurations of those battery state monitoring circuits $BMI_1$ to $BMI_n$ are identical with each other, and hence the battery state monitoring circuit $BMI_n$ is representatively described.

As illustrated in FIG. 11, in the tenth embodiment, an overdischarge cell balance circuit $XG_n$ and a first OR circuit $XH_n$ are added to the battery state monitoring circuit of the fourth embodiment. The overdischarge cell balance circuit $XG_n$ includes a fifth inverter $XE_n$ that receives an overdischarge detection signal from an overdischarge detector circuit $G_n$, and a first AND circuit $XF_n$ that receives an output of the fifth inverter $XE_n$ and an output of the fourth inverter W. Further, the first OR circuit $XH_n$ receives the outputs of the overdischarge cell balance circuit $XG_n$ and the cell balance circuit $M_n$, and outputs a control signal to the switch $SW_n$ through the control terminal $PG_n$. The same is applied to other battery state monitoring circuits.

The operation in the normal state, in the cell balance state, and in the overcharged state is identical with that of the fourth embodiment, and the operation in the overdischarged state is identical with that of the eighth embodiment, and therefore their description is omitted.

According to the tenth embodiment, the battery state monitoring circuit of the low withstand voltage can be fabricated as in the fourth embodiment, the region of the available manufacturing process is further widened, and cell balance is taken in the vicinity of the overdischarge detection voltage as in the eighth embodiment, thereby enabling the operating time of the battery device to be lengthened.

Eleventh Embodiment

Figure 12:
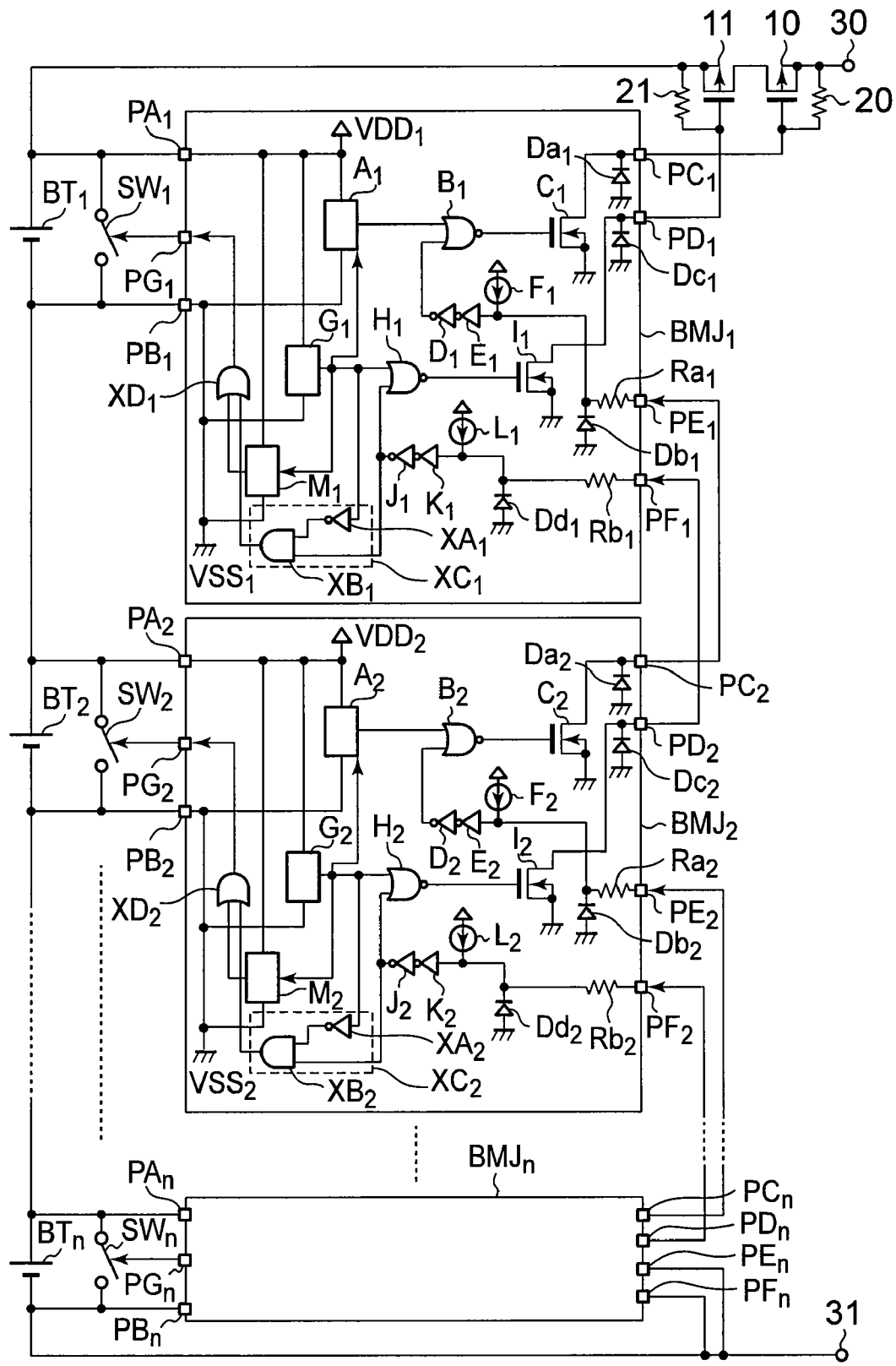
FIG. 12 A circuit configuration diagram illustrating a battery device according to an eleventh embodiment of the present invention.

FIG. 12 is a circuit configuration diagram of a battery device according to an eleventh embodiment. Referring to FIG. 12, the same configuration elements as those of FIG. 5 are denoted by identical symbols, and their description is omitted. For distinguishing from FIG. 5, the symbols of the battery state monitoring circuits are $BMJ_1$ to $BMJ_n$. Further, the circuit configurations of those battery state monitoring circuits $BMJ_1$ to $BMJ_n$ are identical with each other, and hence the battery state monitoring circuit $BMJ_1$ is representatively described.

As illustrated in FIG. 12, in the seventh embodiment, an overdischarge cell balance circuit $XC_1$ and a first OR circuit $XD_1$ are added to the battery state monitoring circuit of the fifth embodiment. The overdischarge cell balance circuit $XC_1$ includes a fifth inverter $XA_1$ that receives an overdischarge detection signal from an overdischarge detector circuit $G_1$, and a first AND circuit $XB_1$ that receives an output of the fifth inverter $XA_1$ and an output of the third inverter $J_1$. Further, the first OR circuit $XD_1$ receives the outputs of the overdischarge cell balance circuit $XC_1$ and the cell balance circuit $M_1$, and outputs a control signal to the switch $SW_1$ through the control terminal $PG_1$. The same is applied to other battery state monitoring circuits.

The operation in the normal state, in the cell balance state, and in the overcharged state is identical with that of the fifth embodiment, and the operation in the overdischarged state is identical with that of the seventh embodiment, and therefore their description is omitted.

According to the eleventh embodiment, it is only necessary that the battery state monitoring circuits at the upper side and the lower side be connected to each other through no resistive element as in the fifth embodiment, which can contribute to a reduction in the manufacturing process, and cell balance is taken in the vicinity of the overdischarge detection voltage as in the seventh embodiment, which enables the operating time of the battery device to be lengthened.

Twelfth Embodiment

Figure 13:
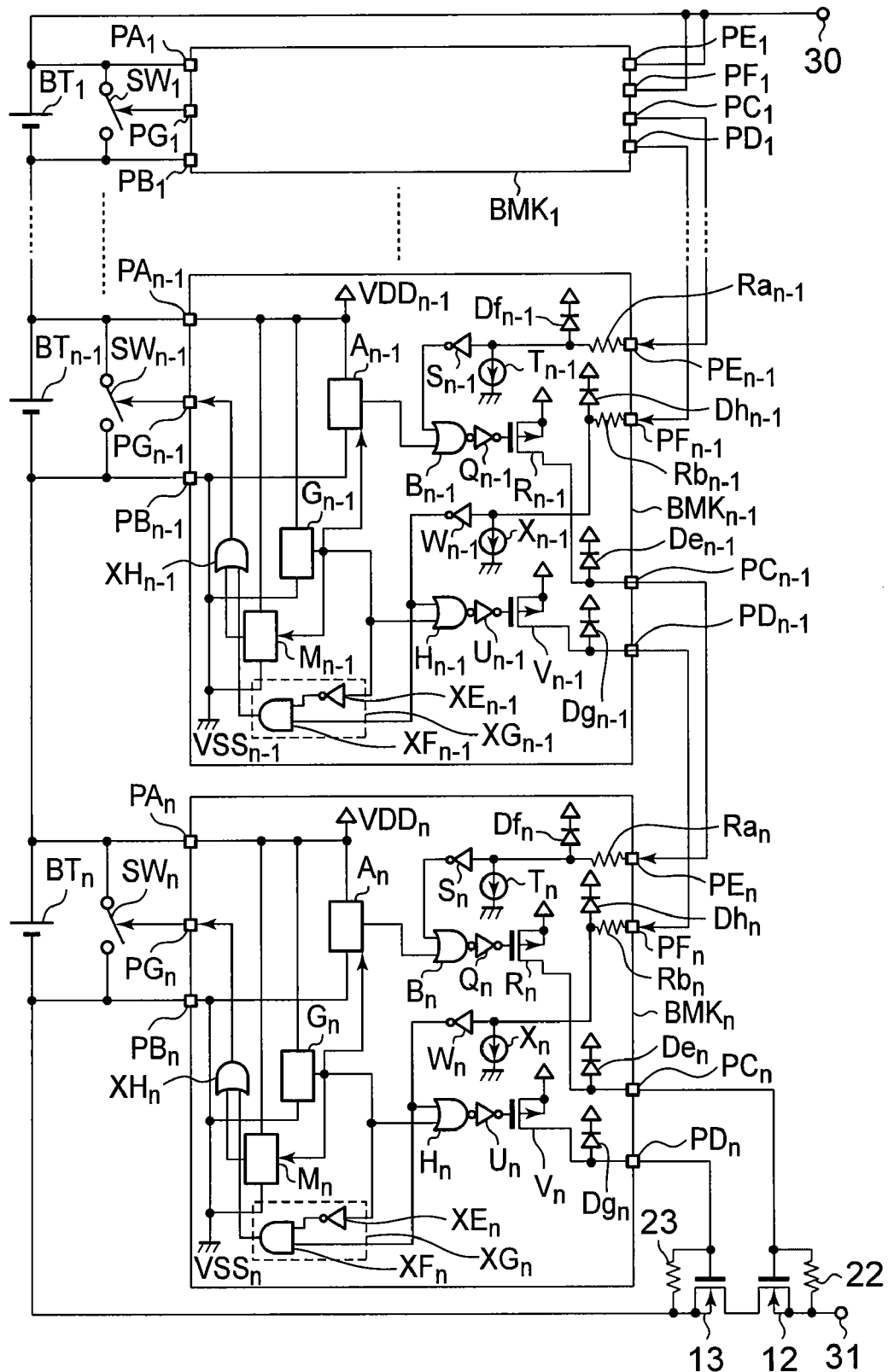
FIG. 13 A circuit configuration diagram illustrating a battery device according to a twelfth embodiment of the present invention.

FIG. 13 is a circuit configuration diagram of a battery device according to a twelfth embodiment. Referring to FIG. 13, the same configuration elements as those of FIG. 6 are denoted by identical symbols, and their description is omitted. For distinguishing from FIG. 6, the symbols of the battery state monitoring circuits are $BMK_1$ to $BMK_n$. Further, the circuit configurations of those battery state monitoring circuits $BMK_1$ to $BMK_n$ are identical with each other, and hence the battery state monitoring circuit $BMK_n$ is representatively described.

As illustrated in FIG. 13, in the twelfth embodiment, an overdischarge cell balance circuit $XG_n$ and a first OR circuit $XH_n$ are added to the battery state monitoring circuit of the sixth embodiment. The overdischarge cell balance circuit $XG_n$ includes a fifth inverter $XE_n$ that receives an overdischarge detection signal from an overdischarge detector circuit $G_n$, and a first AND circuit $XF_n$ that receives an output of the fifth inverter $XE_n$ and an output of the fourth inverter $W_n$. Further, the first OR circuit $XH_n$ receives the outputs of the overdischarge cell balance circuit $XG_n$ and the cell balance circuit $M_n$, and outputs a control signal to the switch $SW_n$ through the control terminal $PG_n$. The same is applied to other battery state monitoring circuits.

The operation in the normal state, in the cell balance state, and in the overcharged state is identical with that of the sixth embodiment, and the operation in the overdischarged state is identical with that in the eighth embodiment, and therefore their description is omitted.

According to the twelfth embodiment, it is only necessary that the battery state monitoring circuits at the upper side and the lower side be connected to each other through no resistive element as in the sixth embodiment, which can contribute to a reduction in the manufacturing process, and cell balance is taken in the vicinity of the overdischarge detection voltage as in the eighth embodiment, which enables the operating time of the battery device to be lengthened.

Thirteenth Embodiment

Figure 14:
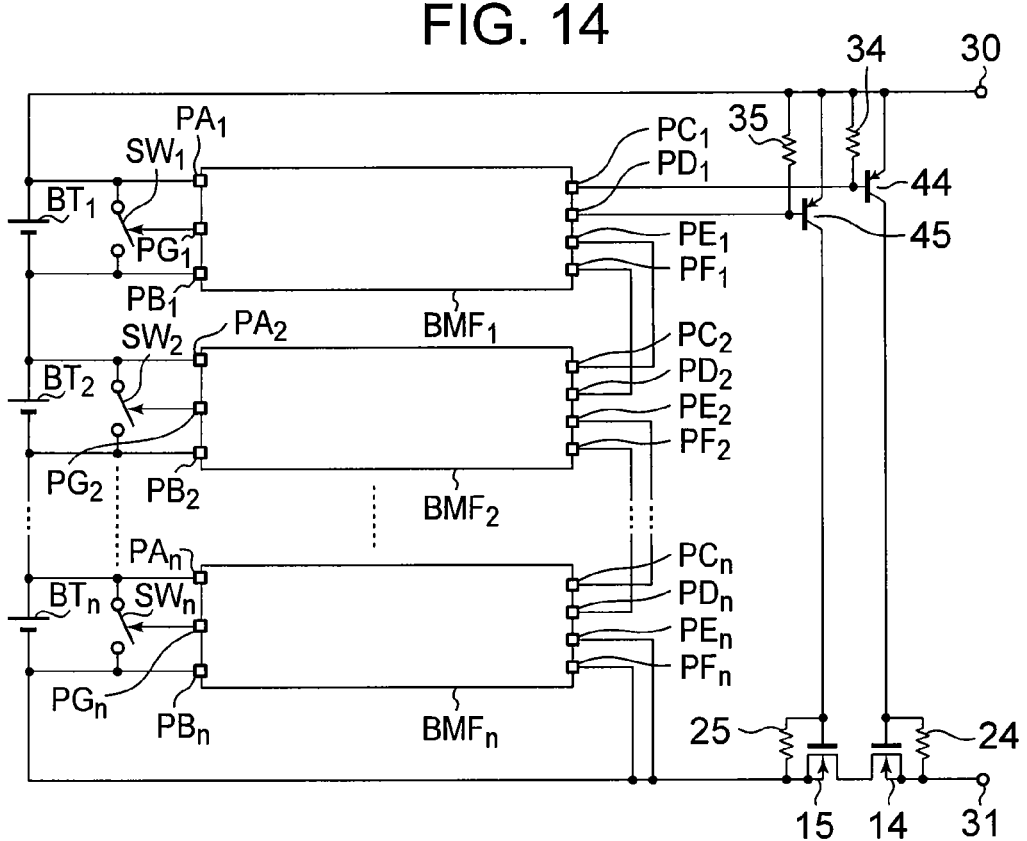
FIG. 14 A circuit configuration diagram illustrating a battery device according to a thirteenth embodiment of the present invention.

FIG. 14 is a circuit configuration diagram of a battery device according to a thirteenth embodiment. $BMF_1$ to $BMF_n$ are used as the battery state monitoring circuits as in the seventh embodiment. A most important difference from FIG. 8 resides in that not the p-channel type transistor but an n-channel type transistor is used for charge/discharge control. Referring to FIG. 14, the same symbols denote the configuration elements identical with those of FIG. 8, and their description is omitted.

A first pnp bipolar transistor 44 has a base terminal connected to a first transmitting terminal $PC_1$ of the battery state monitoring circuit $BMF_1$, an emitter terminal connected to the first external terminal 30, and a collector terminal connected to a gate terminal of a first transistor (charging n-channel type transistor) 14. A third resistive element 34 is connected between the base terminal of the first pnp bipolar transistor 44 and the first external terminal 30.

A second pnp bipolar transistor 45 has a base terminal connected to a second transmitting terminal $PD_1$ of the battery state monitoring circuit $BMF_1$ an emitter terminal connected to the first external terminal 30, and a collector terminal connected to a gate terminal of a second transistor (discharging n-channel type transistor) 15. A fourth resistive element 35 is connected between the base terminal of the second pnp bipolar transistor 45 and the first external terminal 30.

The first transistor 14 has a source terminal connected to the second external terminal 31, and a drain terminal connected to a drain terminal of the second transistor 15. A source terminal of the second transistor 15 is connected to the negative terminal of the lowermost battery $BT_n$. A first resistive element 24 is connected between the gate terminal of the first transistor 14 and the second external terminal 31, and a second resistive element 25 is connected between the gate terminal of the second transistor 15 and the negative terminal of the lowermost battery $BT_n$.

The battery device according to the thirteenth embodiment has a circuit configuration illustrated in FIG. 14, and conducts the following operation.

When all voltages of the batteries $BT_1$ to $BT_n$ are lower than the overcharge voltage and equal to or higher than the overdischarge voltage, that is, in the normal state, the first transmitting terminal $PC_1$ and the second transmitting terminal $PD_1$ of the battery state monitoring circuit $BMF_1$ become low level. Accordingly, a base current is supplied to the base terminals of the first pnp bipolar transistor 44 and the second pnp bipolar transistor 45, and a collector current flows therein. The collector current flows in the first resistive element 24 and the second resistive element 25, respectively, whereby each voltage between the gate and the source of the first transistor 14 and the second transistor 15 becomes high, and the first transistor 14 and the second transistor 15 are turned on.

In this situation, a voltage of $(BT_1+BT_2+ \ldots +BT_n)$ is applied between the gate terminal and the source terminal of the first transistor 14 and the second transistor 15. Accordingly, it is possible to sufficiently turn on the first transistor 14 and the second transistor 15.

In the seventh embodiment illustrated in FIG. 8, in the normal state, only the battery $BT_1$ voltage is applied between the gate terminal and the source terminal of the first transistor 10 and the second transistor 11. For that reason, when the voltage of the battery $BT_1$ is decreased, even if other batteries have sufficient voltages, there is fear that the first transistor 10 and the second transistor 11 cannot sufficiently be turned on. The battery device according to this embodiment is capable of solving the above-mentioned problem.

The circuit configuration using the $BMF_1$ to $BMF_n$ is described above as in the seventh embodiment. However, it is apparent that the same circuit configuration is available to a case in which $BM_1$ to $BM_n$, $BMB_1$ to $BMB_n$, $BMD_1$ to $BMD_n$, $BMH_1$ to $BMH_n$, or $BMJ_1$ to $BMJ_n$ are used as in the first, third, fifth, ninth, or eleventh embodiment. In the case where the circuit is configured by using $BMB_1$ to $BMB_n$ or $BMH_1$ to $BMH_n$, it is apparent that a resistive element is connected between the transmitting terminal and the receiving terminal of the respective battery state monitoring circuits.

Fourteenth Embodiment

Figure 15:
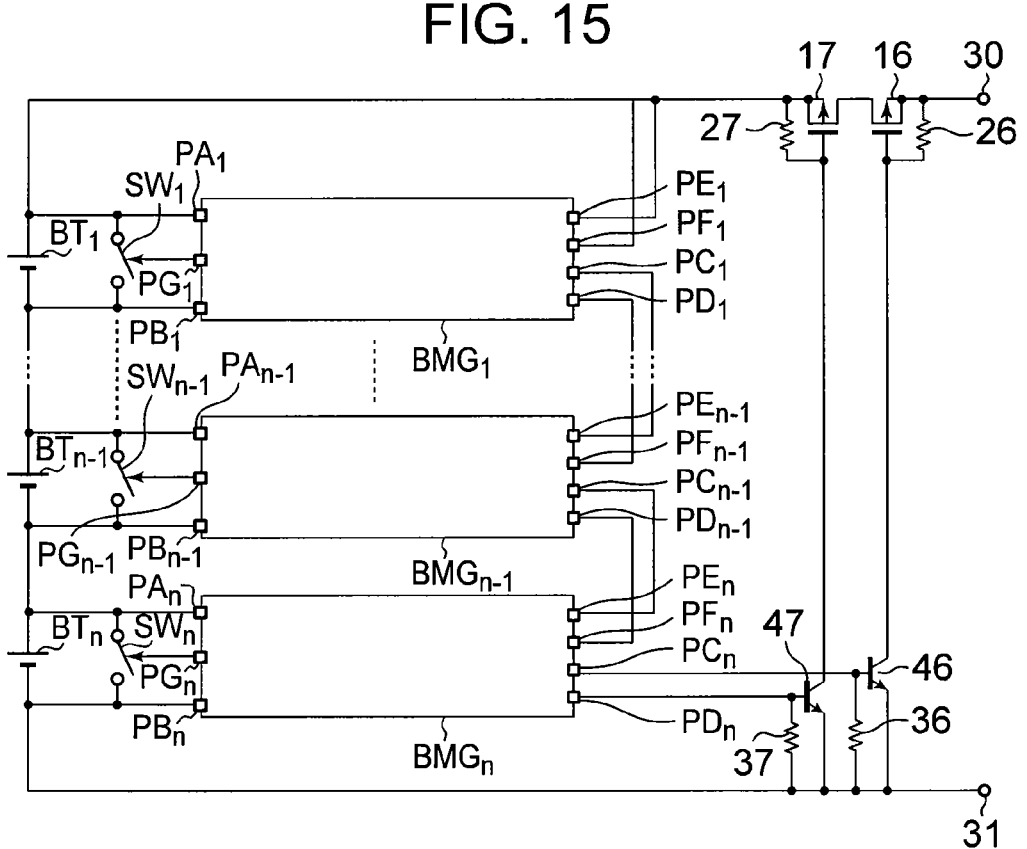
FIG. 15 A circuit configuration diagram illustrating a battery device according to a fourteenth embodiment of the present invention.

FIG. 15 is a circuit configuration diagram of a battery device according to a fourteenth embodiment. $BMG_1$ to $BMG_n$ are used as the battery state monitoring circuits as in the eighth embodiment. A most important difference from FIG. 9 resides in that not the n-channel type transistor but a p-channel type transistor is used for charge/discharge control. Referring to FIG. 15, the same symbols denote the configuration elements identical with those of FIG. 9, and their description is omitted.

A first npn bipolar transistor 46 has a base terminal connected to a first transmitting terminal $PC_n$ of the battery state monitoring circuit $BMG_n$, an emitter terminal connected to the second external terminal 31, and a collector terminal connected to a gate terminal of a first transistor (charging p-channel type transistor) 16. A third resistive element 36 is connected between the base terminal of the first npn bipolar transistor 46 and the second external terminal 31.

A second npn bipolar transistor 47 has a base terminal connected to a second transmitting terminal $PD_n$ of the battery state monitoring circuit $BMG_n$, an emitter terminal connected to the second external terminal 31, and a collector terminal connected to a gate terminal of a second transistor (discharging p-channel type transistor) 17. A fourth resistive element 37 is connected between the base terminal of the second npn bipolar transistor 47 and the second external terminal 31.

The first transistor 16 has a source terminal connected to the first external terminal 30, and a drain terminal connected to a drain terminal of the second transistor 17. A source terminal of the second transistor 17 is connected to the positive terminal of the uppermost battery $BT_1$. A first resistive element 26 is connected between the gate terminal of the first transistor 16 and the first external terminal 30, and a second resistive element 27 is connected between the gate terminal of the second transistor 17 and the positive terminal of the uppermost battery $BT_1$.

The battery device according to the fourteenth embodiment has a circuit configuration illustrated in FIG. 15, and conducts the following operation.

When all voltages of the batteries $BT_1$ to $BT_n$ are lower than the overcharge voltage and equal to or higher than the overdischarge voltage, that is, in the normal state, the first transmitting terminal $PC_1$ and the second transmitting terminal $PD_1$ of the battery state monitoring circuit $BMF_1$ become low level. Accordingly, a base current is supplied to the base terminals of the first pnp bipolar transistor 46 and the second pnp bipolar transistor 47, and a collector current flows therein. The collector current flows in the first resistive element 26 and the second resistive element 27, respectively, whereby each voltage between the gate and the source of the first transistor 16 and the second transistor 17 becomes high, and the first transistor 16 and the second transistor 17 are turned on.

In this situation, a voltage of $(BT_1+BT_2++BT_n)$ is applied between the gate terminal and the source terminal of the first transistor 16 and the second transistor 17. Accordingly, it is possible to sufficiently turn on the first transistor 16 and the second transistor 17.

In the eighth embodiment illustrated in FIG. 9, in the normal state, only the battery $BT_n$ voltage is applied between the gate terminal and the source terminal of the first transistor 12 and the second transistor 13. For that reason, when the voltage of the battery $BT_n$ is decreased, even if other batteries have sufficient voltages, there is fear that the first transistor 12 and the second transistor 13 cannot sufficiently be turned on. The battery device according to this embodiment is capable of solving the above-mentioned problem.

The circuit configuration using the $BMG_1$ to $BMG_n$ is described above as in the eighth embodiment. However, it is apparent that the same circuit configuration is available to a case in which $BMA_1$ to $BMA_n$, $BMC_1$ to $BMC_n$, $BME_1$ to $BME_n$, $BMI_1$ to $BMI_n$, or $BMK_1$ to $BMK_n$ are used as in the second, fourth, sixth, tenth, or twelfth embodiment. In the case where the circuit is configured by using $BMC_1$ to $BMC_n$ or $BMI_1$ to $BMI_n$, it is apparent that a resistive element is connected between the transmitting terminal and the receiving terminal of the respective battery state monitoring circuits.

Fifteenth Embodiment

Figure 16:
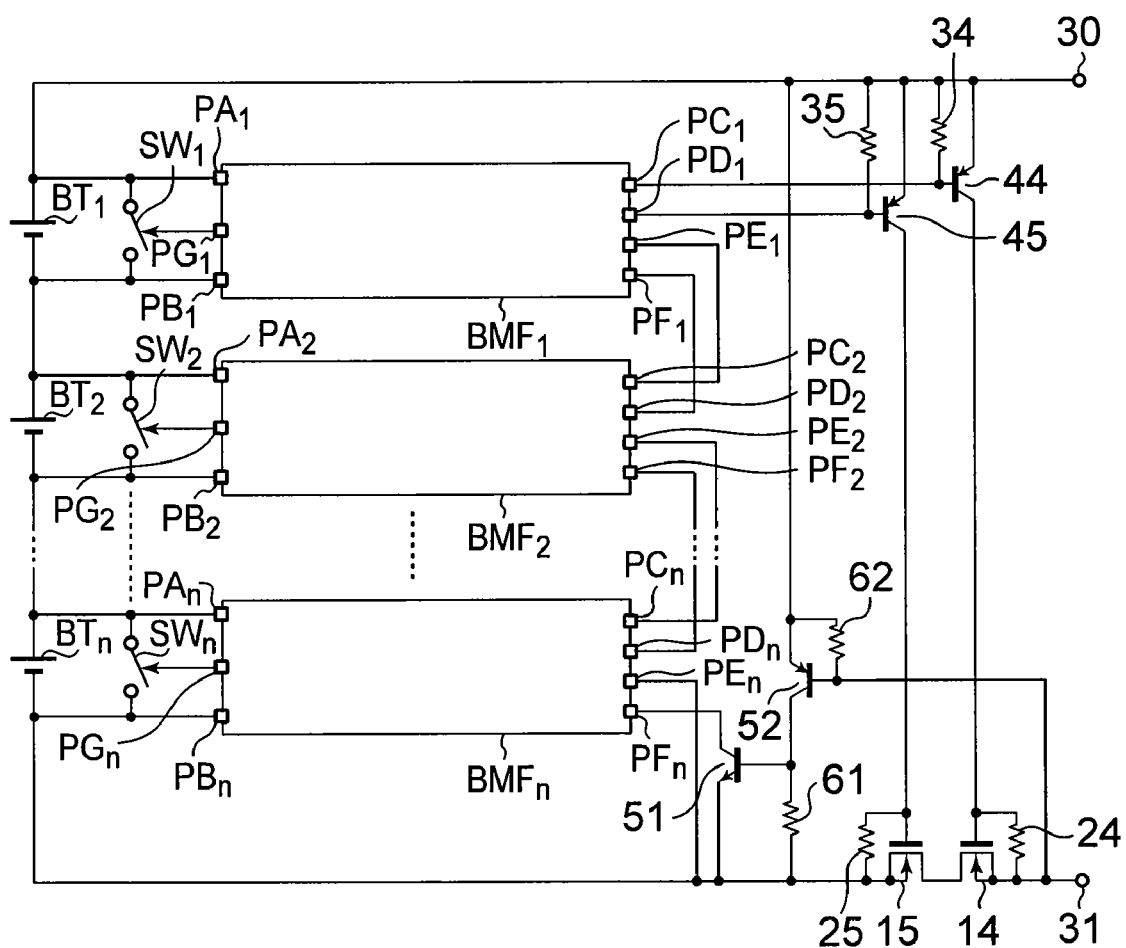
FIG. 16 A circuit configuration diagram illustrating a battery device according to a fifteenth embodiment of the present invention.

FIG. 16 is a circuit configuration diagram of a battery device according to a fifteenth embodiment. $BMF_1$ to $BMF_n$ are used as the battery state monitoring circuits as in the thirteenth embodiment. Referring to FIG. 16, the same configuration elements as those of FIG. 14 are denoted by identical symbols, and their description is omitted.

The second receiving terminal $PF_n$ of the battery state monitoring circuit $BMF_n$ is connected to a collector terminal of a third npn bipolar transistor 51. A base terminal of the third npn bipolar transistor 51 is connected to a collector terminal of a third pnp bipolar transistor 52 and one end of a fifth resistive element 61. The other end of the fifth resistive element 61 is connected to an emitter terminal of the third npn bipolar transistor 51 and the negative terminal of the lowermost battery $BT_n$. A base terminal of the third pnp bipolar transistor 52 is connected to one end of a sixth resistive element 62 and the second external terminal 31. The other end of the sixth resistive element 62 is connected to an emitter terminal of the third pnp bipolar transistor 52 and the positive terminal of the uppermost battery $BT_1$. Other connection relationships are identical with those of the thirteenth embodiment.

Subsequently, a description is given of the normal state of the battery device according to the fifteenth embodiment configured above, that is, a case in which all voltages of the batteries $BT_1$ to $BT_n$ are lower than the overcharge voltage and equal to or higher than the overdischarge voltage. When a charger is connected between the first external terminal 30 and the second external terminal 31, a base current flows in the third pnp bipolar transistor 52. Further, a base current of the third npn bipolar transistor 51 is supplied from the collector terminal of the third pnp bipolar transistor 52, with the result that the second receiving terminal $PF_n$ of the lowermost battery state monitoring circuit $BMF_n$ becomes low level.

Further, the first receiving terminal $PE_n$ of the battery state monitoring circuit $BMF_n$ is connected to the negative terminal of the battery $BT_n$, and is always low level, and hence the first output transistor $C_n$ and the second output transistor $I_n$ of the battery state monitoring circuit $BMF_n$ are turned on. As described above, this state is communicated to the upper stage, and both of the first output transistor $C_1$ and the second output transistor $I_1$ of the uppermost battery state monitoring circuit $BMF_1$ are finally turned on, and a base current is supplied to the first pnp bipolar transistor 44 and the second pnp bipolar transistor 45. The collector current of the first pnp bipolar transistor 44 flows in the first resistor 24 to generate a voltage between the gate and source of the first transistor 14, and the first transistor 14 is turned on. Likewise, the collector current of the second pnp bipolar transistor 45 turns on the second transistor 15, whereby the battery device becomes chargeable and dischargeable. Both of the first transistor 14 and the second transistor 15 are on, and hence the second external terminal 31 has the same potential as that of the negative terminal of the lowermost battery $BT_n$. This state is maintained even if the charger is removed, and hence the normal state is maintained.

Subsequently, a description is given of a state where the battery device is overdischarged, that is, a case in which a load is connected between the first external terminal 30 and the second external terminal 31, the batteries $BT_1$ to $BT_n$ are discharged, and the voltage of at least one of those batteries $BT_1$ to $BT_n$ is lower than the overdischarge voltage. In the following description, it is assumed that the voltage of the battery $BT_1$ is higher than the overdischarge voltage, and the voltage of the battery $BT_2$ is lower than the overdischarge voltage.

In this case, the overdischarge detector circuit $G_2$ of the battery state monitoring circuit $BMF_2$ outputs an overdischarge detection signal of the high level to the second NOR circuit $H_2$. In this case, an output signal of the low level is output from the third inverter $J_2$, and thus the second NOR circuit $H_2$ outputs the NOR signal of the low level to the gate terminal of the second output transistor $I_2$. As a result, the second output transistor $I_2$ is turned off.

Accordingly, the input terminal of the fourth inverter $K_1$ is pulled up to the high level by the second current source $L_1$, and an output signal of the high level is output to the second NOR circuit $H_1$ from the third inverter $J_1$. On the other hand, the overdischarge detector circuit $G_1$ outputs the overdischarge detection signal of the low level to the second NOR circuit $H_1$, and hence the second NOR circuit $H_1$ outputs the NOR signal of the low level to the gate terminal of the second output transistor $I_1$. As a result, the second output transistor $I_1$ is turned off.

When the second output transistor $I_1$ is turned off as described above, the base current of the second pnp bipolar transistor 45 is blocked, and therefore the collector current of the second pnp bipolar transistor 45 which flows in the second resistive element 25 is also blocked. As a result, the voltage between the gate and source of the second transistor 15 is eliminated, and the battery device prohibits discharge.

Upon receiving the overdischarge detection signal of the low level which has been output from the overdischarge detector circuit $G_1$, the fifth inverter $XA_1$ outputs a signal of the high level to the first AND circuit $XB_1$. The output signal of the high level from the third inverter $J_1$ is also output to the first AND circuit $XB_1$, and hence the first AND circuit $XB_1$ outputs an overdischarge cell balance signal to the first OR circuit $XD_1$.

In this case, when the voltage of the battery $BT_1$ is lower than the cell balance voltage, the cell balance circuit $M_1$ outputs no cell balance signal. However, upon receiving the overdischarge cell balance signal, the first OR circuit $XD_1$ turns on the switch $SW_1$ through the control terminal $PG_1$, and the battery $BT_1$ is discharged through the switch $SW_1$.

When the discharge of the battery device is prohibited, the potential of the second external terminal 31 is pulled up to the load, and rises up to the potential of the first external terminal 30. As a result, the base current of the third pnp bipolar transistor 52 is blocked, and therefore the collector current of the third pnp bipolar transistor 52 is also blocked. Subsequently, the base current of the third npn bipolar transistor 51 is also blocked, whereby the second receiving terminal $PF_n$ of the lowermost battery state monitoring circuit $BMF_n$ is pulled up to the high level by the second current source $L_n$.

Through the above-mentioned operation, the same operation as the overdischarge cell balance operation of the battery state monitoring circuit $BMF_1$ is repeated in the battery state monitoring circuit $BMF_n$. That is, upon receiving the overdischarge detection signal of the low level, which has been output from the overdischarge detector circuit $G_n$, the fifth inverter $XA_n$ outputs a signal of the high level to the first AND circuit $XB_n$. The output signal of the high level from the third inverter $J_n$ is also output to the first AND circuit $XB_n$, and hence the first AND circuit $XB_n$ outputs the overdischarge cell balance signal to the first OR circuit $XD_n$. When the voltage of the battery $BT_n$ is lower than the cell balance voltage, the cell balance circuit $M_n$ outputs no cell balance signal. However, upon receiving the overdischarge cell balance signal, the first OR circuit $XD_n$ turns on the switch $SW_n$ through the control terminal $PG_n$, and the battery $BT_n$ is discharged through the switch $SW_n$.

It is needless to say that the high level output signal of the third inverter $J_n$ is also output to the second NOR circuit $H_n$, and the second NOR circuit $H_n$ outputs the NOR signal of the low level to the gate terminal of the second output transistor $I_n$. As a result, the second output transistor $I_n$ is turned off. Accordingly, the overdischarge cell balance operation is repeated in the battery state monitoring circuit $BMF_{n-1}$ in the completely same manner. The repetitive operation is repeated until the battery state monitoring circuit $BMF_3$ located at a lower stage next to the battery state monitoring circuit $BMF_2$ that has detected the overdischarge of the battery $BT_2$.

Through the above-mentioned operation, all the batteries other than $BT_2$ that has actually detected overdischarge are discharged through the switch SW. As described above, discharge due to the overdischarge cell balance through the switch SW stops when discharge is advanced and the battery voltage reaches the overdischarge voltage. Accordingly, when a sufficient time has elapsed after the battery device has been discharged because of overdischarge detection, all of the batteries reach the overdischarge voltage, and take cell balance.

In the seventh and thirteenth embodiments, only the battery state monitoring circuit located at a stage upper than the battery state monitoring circuit that has detected overdischarge can take overdischarge cell balance. On the other hand, in the fifteenth embodiment, all of the battery state monitoring circuits can take overdischarge cell balance.

After the cell balance operation is advanced, and all of the batteries have reached an overdischarge voltage, a charger is connected between the first external terminal 30 and the second external terminal 31. Then, a base current flows in the third pnp bipolar transistor 52, and a base current of the third npn bipolar transistor 51 is supplied from the collector terminal of the third pnp bipolar transistor 52. As a result, the second receiving terminal $PF_n$ of the lowermost battery state monitoring circuit $BMF_n$ becomes low level. Thereafter, when charging is advanced and all of the battery voltages are returned to the overdischarge voltage or higher, the battery device becomes again dischargeable.

The circuit configuration using the $BMF_1$ to $BMF_n$ is described above as in the seventh embodiment. However, it is apparent that the same circuit configuration is available to a case in which $BMH_1$ to $BMH_n$ or $BMJ_1$ to $BMJ_n$ are used as in the ninth or eleventh embodiment. In the case where the circuit is configured by using $BMH_1$ to $BMH_n$, it is apparent that a resistive element is connected between the transmitting terminal and the receiving terminal of the respective battery state monitoring circuits.

Sixteenth Embodiment

Figure 17:
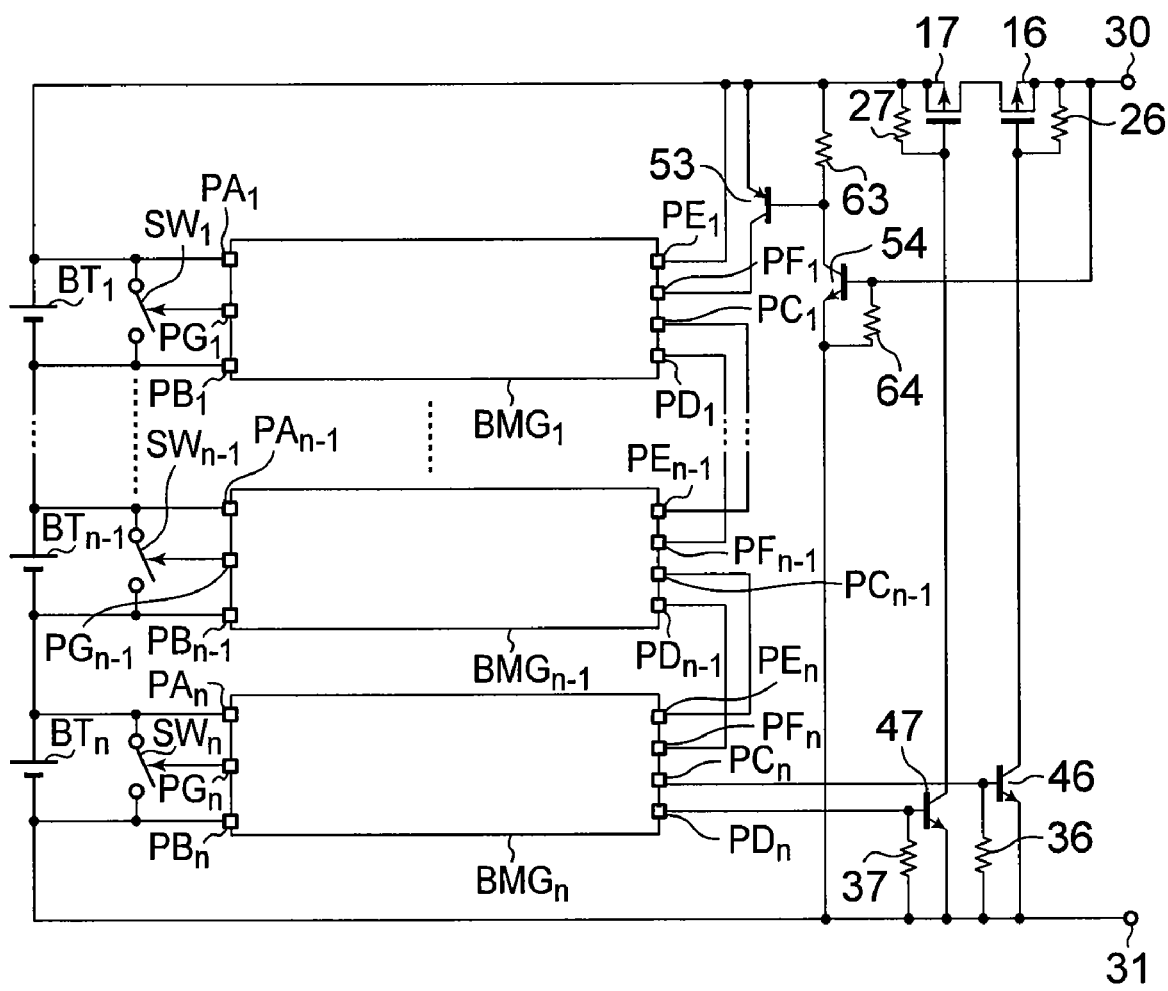
FIG. 17 A circuit configuration diagram illustrating a battery device according to a sixteenth embodiment of the present invention.

FIG. 17 is a circuit configuration diagram of a battery device according to a sixteenth embodiment. $BMG_1$ to $BMG_n$ are used as the battery state monitoring circuit as in the fourteenth embodiment. Referring to FIG. 17, the same configuration elements as those in FIG. 15 are denoted by identical symbols, and their description is omitted.

A second receiving terminal $PF_1$ of the battery state monitoring circuit $BMG_1$ is connected to a collector terminal of a third pnp bipolar transistor 53. A base terminal of the third pnp bipolar transistor 53 is connected to a collector terminal of a third npn bipolar transistor 54 and one end of a fifth resistive element 63. The other end of the fifth resistive element 63 is connected to an emitter terminal of the third pnp bipolar transistor 53 and the positive terminal of the uppermost battery $BT_1$. A base terminal of the third npn bipolar transistor 54 is connected to one end of a sixth resistive element 64 and the first external terminal 30. The other end of the sixth resistive element 64 is connected to an emitter terminal of the third npn bipolar transistor 54 and the negative terminal of the lowermost battery $BT_n$. Other connection relationships are identical with those of the fifteenth embodiment.

Subsequently, a description is given of the normal state of the battery device according to the sixteenth embodiment configured above, that is, a case in which all voltages of the batteries $BT_1$ to $BT_n$ are lower than the overcharge voltage and equal to or higher than the overdischarge voltage. When a charger is connected between the first external terminal 30 and the second external terminal 31, a base current flows in the third npn bipolar transistor 54. Further, a base current of the third pnp bipolar transistor 53 is supplied from the collector terminal of the third npn bipolar transistor 54, with the result that the second receiving terminal $PF_1$ of the uppermost battery state monitoring circuit $BMG_1$ becomes high level. Further, the first receiving terminal $PE_1$ of the battery state monitoring circuit $BMG_1$ is connected to the positive terminal of the battery $BT_1$, and is always high level, and hence the first output transistor $R_1$ and the second output transistor $V_1$ of the battery state monitoring circuit $BMG_1$ are turned on. As described above, this state is communicated to the lower stage, and both of the first output transistor $R_n$ and the second output transistor $V_n$ of the lowermost battery state monitoring circuit $BMG_n$ are finally turned on, and a base current is supplied to the first npn bipolar transistor 46 and the second bipolar transistor 47. The collector current of the first npn bipolar transistor 46 flows in the first resistor 26 to generate a voltage between the gate and source of the first transistor 16, and the first transistor is turned on. Likewise, the collector current of the second npn bipolar transistor 47 turns on the second transistor 17, whereby the battery device becomes chargeable and dischargeable. Both of the first transistor 16 and the second transistor 17 are on, and hence the first external terminal 30 has the same potential as that of the positive terminal of the uppermost battery $BT_1$. This state is maintained even if the charger is removed, and hence the normal state is maintained.

Subsequently, a description is given of a state where the battery device is overdischarged, that is, a case in which a load is connected between the first external terminal 30 and the second external terminal 31, the batteries $BT_1$ to $BT_n$ are discharged, and the voltage of at least one of those batteries $BT_1$ to $BT_n$ is lower than the overdischarge voltage. In the following description, it is assumed that the voltage of the battery $BT_n$ is higher than the overdischarge voltage, and the voltage of the battery $BT_{n-1}$ is lower than the overdischarge voltage.

In this case, the overdischarge detector circuit $G_{n-1}$ of the battery state monitoring circuit $BMG_{n-1}$ outputs an overdischarge detection signal of the high level to the second NOR circuit $H_{n-1}$. In this case, an output signal of the low level is output from the fourth inverter $W_{n-1}$, and hence the second NOR circuit $H_{n-1}$ outputs the NOR signal of the low level to the third inverter $U_{n-1}$, and the third inverter $U_{n-1}$ outputs the NOT signal of the high level to the gate terminal of the second output transistor $V_{n-1}$. As a result, the second output transistor $V_{n-1}$ is turned off.

Accordingly, the input terminal of the fourth inverter $W_n$ is pulled down to the low level by the second current source $X_n$, and an output signal of the high level is output to the second NOR circuit $H_n$ from the fourth inverter $W_n$. On the other hand, the overdischarge detector circuit $G_n$ outputs the overdischarge detection signal of the low level to the second NOR circuit $H_n$, and hence the second NOR circuit $H_n$ outputs the NOR signal of the low level to the third inverter $U_n$, and the third inverter $U_n$ outputs the NOT signal of the high level to the gate terminal of the second output transistor $V_n$. As a result, the second output transistor $V_n$ is turned off.

When the second output transistor $V_n$ is turned off as described above, the base current of the second npn bipolar transistor 47 is blocked, and therefore the collector current of the second npn bipolar transistor 47 which flows in the second resistive element 27 is also blocked. As a result, the voltage between the gate and source of the second transistor 17 is eliminated, and the battery device prohibits discharge.

Upon receiving the overdischarge detection signal of the low level which has been output from the overdischarge detector circuit $G_n$, the fifth inverter $XE_n$ outputs a signal of the high level to the first AND circuit $XF_n$. The output signal of the high level from the fourth inverter $W_n$ is also output to the first AND circuit $XF_n$, and hence the first AND circuit $XF_n$ outputs an overdischarge cell balance signal to the first OR circuit $XH_n$.

In this case, when the voltage of the battery $BT_n$ is lower than the cell balance voltage, the cell balance circuit $M_n$ outputs no cell balance signal. However, upon receiving the overdischarge cell balance signal, the first OR circuit $XH_n$, turns on the switch $SW_n$ through the control terminal $PG_n$, and the battery $BT_n$ is discharged through the switch $SW_n$.

When the discharge of the battery device is prohibited, the potential of the first external terminal 30 is pulled down to the load, and drops down to the potential of the second external terminal 31. As a result, the base current of the third npn bipolar transistor 54 is blocked, and therefore the collector current of the third npn bipolar transistor 54 is also blocked. Subsequently, the base current of the third pnp bipolar transistor 53 is also blocked, whereby the second receiving terminal $PF_1$ of the uppermost battery state monitoring circuit $BMG_1$ is pulled down to the low level by the second current source $X_1$.

Through the above-mentioned operation, the same operation as the overdischarge cell balance operation of the battery state monitoring circuit $BMG_n$ is repeated in the battery state monitoring circuit $BMG_1$. That is, upon receiving the overdischarge detection signal of the low level, which has been output from the overdischarge detector circuit $G_n$, the fifth inverter $XE_1$ outputs a signal of the high level to the first AND circuit $XF_1$.

The output signal of the high level from the fourth inverter $W_1$ is also output to the first AND circuit $XF_1$, and hence the first AND circuit XF, outputs the overdischarge cell balance signal to the first OR circuit $XH_1$. When the voltage of the battery $BT_1$ is lower than the cell balance voltage, the cell balance circuit $M_1$ outputs no cell balance signal. However, upon receiving the overdischarge cell balance signal, the first OR circuit $XH_1$ turns on the switch $SW_1$ through the control terminal $PG_1$, and the battery $BT_1$ is discharged through the switch $SW_1$.

It is needless to say that the high level output signal of the fourth inverter $W_1$ is also output to the second NOR circuit $H_1$, and the third inverter $U_1$, and the third inverter $U_1$ outputs the NOT signal of the high level to the second NOR circuit $H_1$ outputs the NOR signal of the low level to the third inverter $U_1$, and the third inverter $U_1$ outputs the NOT signal of the high level to the gate terminal of the second output transistor $V_1$. As a result, the second output transistor $V_1$ is turned off. Accordingly, the overdischarge cell balance operation is repeated in the battery state monitoring circuit $BMG_2$ in the completely same manner. The repetitive operation is repeated until the battery state monitoring circuit $BMG_{n-1}$ located at an upper stage next to the battery state monitoring circuit $BMG_{n-1}$ that has detected the overdischarge of the battery $BT_{n-1}$.

Through the above-mentioned operation, all the batteries other than $BT_{n-1}$ that has actually detected overdischarge are discharged through the switch SW. As described above, discharge due to the overdischarge cell balance through the switch SW stops when discharge is advanced and the battery voltage reaches the overdischarge voltage. Accordingly, when a sufficient time has elapsed after the battery device has been discharged because of overdischarge detection, all of the batteries reach the overdischarge voltage, and take cell balance.

In the eighth and fourteenth embodiments, only the battery state monitoring circuit located at a stage lower than the battery state monitoring circuit that has detected overdischarge can take overdischarge cell balance. On the other hand, in the sixteenth embodiment, all of the battery state monitoring circuits can take overdischarge cell balance.

After the cell balance operation is advanced, and all of the batteries have reached an overdischarge voltage, a charger is connected between the first external terminal 30 and the second external terminal 31. Then, a base current flows in the third npn bipolar transistor 54, and a base current of the third pnp bipolar transistor 53 is supplied from the collector terminal of the third npn bipolar transistor 54. As a result, the second receiving terminal $PF_1$ of the uppermost battery state monitoring circuit $BMG_1$ becomes high level. Thereafter, when charging is advanced and all of the battery voltages are returned to the overdischarge voltage or higher, the battery device becomes again dischargeable.

The circuit configuration using $BMG_1$ to $BMG_n$ as in the eighth embodiment has been described above. However, it is apparent that the same circuit configuration is available to a case of using $BMI_1$ to $BMI_n$ or $BMK_1$ to $BMK_n$ as in the tenth or twelfth embodiment. In the case of configuring the circuit by using $BMI_1$ to $BMI_n$, it is apparent that a resistive element is connected between the transmitting terminal and the receiving terminal of the respective battery state monitoring circuits.

INDUSTRIAL APPLICABILITY

The present invention can be used in a power source circuit of an electronic device using a chargeable battery such as a lithium ion cell and particularly operating with high voltage, and hence the present invention is applicable to an electric power tool and so on.

The invention claimed is:

1. A battery state monitoring circuit, comprising:
   a first voltage monitoring terminal used for connection to a positive terminal of one battery;
   a second voltage monitoring terminal used for connection to a negative terminal of the battery;
   a first transmitting terminal;
   a second transmitting terminal;
   a first receiving terminal;
   a second receiving terminal;
   a control terminal;
   an overcharge detector circuit which detects whether the battery is in an overcharged state or not, based on a voltage between the first voltage monitoring terminal and the second voltage monitoring terminal to output an overcharge detection signal indicative of the detection result;
   an overdischarge detector circuit which detects whether the battery is in an overdischarged state or not, based on the voltage between the first voltage monitoring terminal and the second voltage monitoring terminal to output an overdischarge detection signal indicative of the detection result;
   a cell balance circuit which detects whether the battery needs to be subjected to cell balance control or not, based on the voltage between the first voltage monitoring terminal and the second voltage monitoring terminal to output a cell balance signal indicative of the detection result to the control terminal;
   an overcharge information communication circuit which transmits an overcharge signal indicative of an overcharged state to an external from the first transmitting terminal when at least one of an overcharge signal indicating whether another battery is in the overcharged state or not, which has been received through the first receiving terminal, and the overcharge detection signal, is indicative of the overcharged state; and
   an overdischarge information communication circuit which transmits an overdischarge signal indicative of an overdischarged state to an external from the second transmitting terminal when at least one of an overdischarge signal indicating whether another battery is in the overdischarged state or not, which has been received through the second receiving terminal, and the overdischarge detection signal, is indicative of the overdischarged state,
   wherein the battery state monitoring circuit is configured as one semiconductor device.

2. A battery state monitoring circuit according to claim 1
   wherein the first voltage monitoring terminal is connected to an internal positive side common power supply line,
   wherein the second voltage monitoring terminal is connected to an internal negative side common power supply line,
   wherein the overcharge information communication circuit comprises:

a first current source having an input terminal connected to the positive side common power supply line, and an output terminal connected to the first receiving terminal;

a first NOR circuit which receives the overcharge detection signal and the overcharge signal as inputs to output a NOR signal of those signals; and a first n-channel type transistor having a gate terminal receiving the NOR signal of the first NOR circuit as an input, a drain terminal connected to the first transmitting terminal, and a source terminal connected to the negative side common power supply line, and wherein the overdischarge information communication circuit comprises:

a second current source having an input terminal connected to the positive side common power supply line, and an output terminal connected to the second receiving terminal;

a second NOR circuit which receives the overdischarge detection signal and the overdischarge signal as inputs to output a NOR signal of those signals; and a second n-channel type transistor having a gate terminal receiving the NOR signal of the second NOR circuit as an input, a drain terminal connected to the second transmitting terminal, and a source terminal connected to the negative side common power supply line.

3. A battery state monitoring circuit according to claim 1, wherein the first voltage monitoring terminal is connected to an internal positive side common power supply line, wherein the second voltage monitoring terminal is connected to an internal negative side common power supply line, wherein the overcharge information communication circuit comprises:

a first current source having an input terminal connected to the first receiving terminal, and an output terminal connected to the negative side common power supply line;

a first NOT circuit having an input terminal connected to the first receiving terminal;

a first OR circuit which receives the overcharge detection signal and an output signal of the first NOT circuit as inputs to output an OR signal of those signals; and a first p-channel type transistor having a gate terminal receiving the OR signal of the first OR circuit as an input, a drain terminal connected to the first transmitting terminal, and a source terminal connected to the positive side common power supply line, and wherein the overdischarge information communication circuit comprises:

a second current source having an input terminal connected to the second receiving terminal, and an output terminal connected to the negative side common power supply line;

a second NOT circuit having an input terminal connected to the second receiving terminal;

a second OR circuit which receives the overdischarge detection signal and an output signal of the second NOT circuit as inputs to output an OR signal of those signals; and a second p-channel type transistor having a gate terminal receiving the OR signal of the second OR circuit as an input, a drain terminal connected to the second transmitting terminal, and a source terminal connected to the positive side common power supply line.

4. A battery state monitoring circuit according to claim 2, further comprising:

a first diode which has an anode terminal connected to the negative side common power supply line, and a cathode terminal connected to the drain terminal of the first n-channel type transistor, and has a characteristic which allows a reverse current to flow when a reverse voltage corresponding to a voltage which exceeds a withstand voltage of the battery state monitoring circuit is applied;

a second diode which has an anode terminal connected to the negative side common power supply line, and a cathode terminal connected to the output terminal of the first current source;

a third diode which has an anode terminal connected to the negative side common power supply line, and a cathode terminal connected to the drain terminal of the second n-channel type transistor, and has a characteristic which allows the reverse current to flow when the reverse voltage corresponding to the voltage which exceeds the withstand voltage of the battery state monitoring circuit is applied; and a fourth diode which has an anode terminal connected to the negative side common power supply line, and a cathode terminal connected to the output terminal of the second current source.

5. A battery state monitoring circuit according to claim 3, further comprising:

a first diode which has an anode terminal connected to the drain terminal of the first p-channel type transistor, and a cathode terminal connected to the positive side common power supply line, and has a characteristic which allows a reverse current to flow when a reverse voltage corresponding to a voltage which exceeds a withstand voltage of the battery state monitoring circuit is applied;

a second diode which has an anode terminal connected to the input terminal of the first current source, and a cathode terminal connected to the positive side common power supply line;

a third diode which has an anode terminal connected to the drain terminal of the second p-channel type transistor, and a cathode terminal connected to the positive side common power supply line, and has a characteristic which allows the reverse current to flow when the reverse voltage corresponding to the voltage which exceeds the withstand voltage of the battery state monitoring circuit is applied; and a fourth diode which has an anode terminal connected to the input terminal of the second current source, and a cathode terminal connected to the positive side common power supply line.

6. A battery state monitoring circuit according to claim 4, further comprising:

a first resistive element which is connected between the cathode terminal of the second diode and the first receiving terminal; and a second resistive element which is connected between the cathode terminal of the fourth diode and the second receiving terminal.

7. A battery state monitoring circuit according to claim 5, further comprising:

a first resistive element which is connected between the anode terminal of the second diode and the first receiving terminal; and a second resistive element which is connected between the anode terminal of the fourth diode and the second receiving terminal.

8. A battery device, comprising:
a plurality of batteries connected in series;
the battery state monitoring circuit according to claim 1, which is disposed in correspondence with each of the plurality of batteries;
a cell balance switch circuit which is connected in parallel with the each of the plurality of batteries, and switches between connection and disconnection of two terminals according to the cell balance signal which is output from the control terminal of the battery state monitoring circuit corresponding to the each of the batteries;
a charging switch circuit which switches between permission and prohibition of charging the plurality of batteries; and
a discharging switch circuit which switches between permission and prohibition of discharging the plurality of batteries,
wherein the battery state monitoring circuit has the first voltage monitoring terminal connected to a positive terminal of a corresponding battery, the second voltage monitoring terminal connected to a negative terminal of the corresponding battery, the first transmitting terminal connected to the first receiving terminal of one adjacent battery state monitoring circuit, the second transmitting terminal connected to the second receiving terminal of the one adjacent battery state monitoring circuit, the first receiving terminal connected to the first transmitting terminal of another adjacent battery state monitoring circuit, and the second receiving terminal connected to the second transmitting terminal of the another adjacent battery state monitoring circuit,
wherein the charging switch circuit switches between permission and prohibition of charging based on the overcharge signal transmitted from the first transmitting terminal of the battery state monitoring circuit corresponding to a battery at one end among the batteries connected in series, and
wherein the discharging switch circuit switches between permission and prohibition of discharging based on the overdischarge signal transmitted from the second transmitting terminal of the battery state monitoring circuit corresponding to the battery at the one end.

9. A battery device, comprising:
a plurality of batteries connected in series;
the battery state monitoring circuit according to claim 2, which is disposed in correspondence with each of the plurality of batteries;
a cell balance switch circuit which is connected in parallel with the each of the plurality of batteries, and switches between connection and disconnection of two terminals according to the cell balance signal which is output from the control terminal of the battery state monitoring circuit which corresponds to the each of the plurality of batteries;
a first external terminal;
a second external terminal;
a charging p-channel type transistor;
a discharging p-channel type transistor;
a first bias resistive element having one end connected to a gate terminal of the charging p-channel type transistor, and another end connected to a source terminal of the charging p-channel type transistor; and
a second bias resistive element having one end connected to a gate terminal of the discharging p-channel type transistor, and another end connected to a source terminal of the discharging p-channel type transistor,
wherein the battery state monitoring circuit has the first voltage monitoring terminal connected to a positive terminal of a corresponding battery, the second voltage monitoring terminal connected to a negative terminal of the corresponding battery, the first transmitting terminal connected to the first receiving terminal of one adjacent battery state monitoring circuit, the second transmitting terminal connected to the second receiving terminal of the one adjacent battery state monitoring circuit, the first receiving terminal connected to the first transmitting terminal of another adjacent battery state monitoring circuit, and the second receiving terminal connected to the second transmitting terminal of the another adjacent battery state monitoring circuit,
wherein the battery state monitoring circuit corresponding to a battery at one end of the batteries connected in series has the first transmitting terminal connected to the gate terminal of the charging p-channel type transistor, and the second transmitting terminal connected to the gate terminal of the discharging p-channel type transistor,
wherein the discharging p-channel type transistor has the source terminal connected to a positive terminal of the battery at the one end, and a drain terminal connected to a drain terminal of the charging p-channel type transistor, and the charging p-channel type transistor has the source terminal connected to the first external terminal,
wherein a battery at another end of the batteries connected in series has a negative terminal connected to the second external terminal, and
wherein the battery state monitoring circuit corresponding to the battery at the another end has the first receiving terminal and the second receiving terminal connected to the negative terminal of the battery at the another end.

10. A battery device, comprising:
a plurality of batteries connected in series;
the battery state monitoring circuit according to claim 3, which is disposed in correspondence with each of the plurality of batteries;
a cell balance switch circuit which is connected in parallel with the each of the plurality of batteries, and switches between connection and disconnection of two terminals according to the cell balance signal which is output from the control terminal of the battery state monitoring circuit which corresponds to the each of the plurality of batteries;
a first external terminal;
a second external terminal;
a charging n-channel type transistor;
a discharging n-channel type transistor;
a first bias resistive element having one end connected to a gate terminal of the charging n-channel type transistor, and another end connected to a source terminal of the charging n-channel type transistor; and
a second bias resistive element having one end connected to a gate terminal of the discharging n-channel type transistor, and another end connected to a source terminal of the discharging n-channel type transistor,
wherein the battery state monitoring circuit has the first voltage monitoring terminal connected to a positive terminal of a corresponding battery, the second voltage monitoring terminal connected to a negative terminal of the corresponding battery, the first transmitting terminal connected to the first receiving terminal of one adjacent battery state monitoring circuit, the second transmitting terminal connected to the second receiving terminal of the one adjacent battery state monitoring circuit, the first receiving terminal connected to the first transmitting terminal of another adjacent battery state monitoring circuit, and the second receiving terminal connected to the second transmitting terminal of the another adjacent battery state monitoring circuit, wherein a battery at one end of the batteries connected in series has a positive terminal connected to the first external terminal, wherein the battery state monitoring circuit corresponding to the battery at the one end has the first receiving terminal and the second receiving terminal connected to the positive terminal of the battery at the one end, wherein the battery state monitoring circuit corresponding to a battery at another end of the batteries connected in series has the first transmitting terminal connected to the gate terminal of the charging n-channel type transistor, and the second transmitting terminal connected to the gate terminal of the discharging n-channel type transistor, and wherein the discharging n-channel type transistor has the source terminal connected to a negative terminal of the battery at the another end, and a drain terminal connected to a drain terminal of the charging n-channel type transistor, and the charging n-channel type transistor has the source terminal connected to the second external terminal.

11. A battery device, comprising:
a plurality of batteries connected in series;
the battery state monitoring circuit according to claim 4, which is disposed in correspondence with each of the plurality of batteries;
a cell balance switch circuit which is connected in parallel with the each of the plurality of batteries, and switches between connection and disconnection of two terminals according to the cell balance signal which is output from the control terminal of the battery state monitoring circuit which corresponds to the each of the plurality of batteries;
a first external terminal;
a second external terminal;
a charging p-channel type transistor;
a discharging p-channel type transistor;
a first bias resistive element having one end connected to a gate terminal of the charging p-channel type transistor, and another end connected to a source terminal of the charging p-channel type transistor; and
a second bias resistive element having one end connected to a gate terminal of the discharging p-channel type transistor, and another end connected to a source terminal of the discharging p-channel type transistor,
wherein the battery state monitoring circuit has the first voltage monitoring terminal connected to a positive terminal of a corresponding battery, the second voltage monitoring terminal connected to a negative terminal of the corresponding battery, the first transmitting terminal connected to the first receiving terminal of one adjacent battery state monitoring circuit through a resistive element, the second transmitting terminal connected to the second receiving terminal of the one adjacent battery state monitoring circuit through a resistive element, the first receiving terminal connected to the first transmitting terminal of another adjacent battery state monitoring circuit through a resistive element, and the second receiving terminal connected to the second transmitting terminal of the another adjacent battery state monitoring circuit through a resistive element,
wherein the battery state monitoring circuit corresponding to a battery at one end of the batteries connected in series has the first transmitting terminal connected to the gate terminal of the charging p-channel type transistor, and the second transmitting terminal connected to the gate terminal of the discharging p-channel type transistor,
wherein the discharging p-channel type transistor has the source terminal connected to a positive terminal of the battery at the one end, and a drain terminal connected to a drain terminal of the charging p-channel type transistor, the charging p-channel type transistor has the source terminal connected to the first external terminal,
wherein a battery at another end of the batteries connected in series has a negative terminal connected to the second external terminal, and
wherein the battery state monitoring circuit corresponding to the battery at the another end has the first receiving terminal and the second receiving terminal connected to the negative terminal of the battery at the another end.

12. A battery device, comprising:
a plurality of batteries connected in series;
the battery state monitoring circuit according to claim 5, which is disposed in correspondence with each of the plurality of batteries;
a cell balance switch circuit which is connected in parallel with the each of the plurality of batteries, and switches between connection and disconnection of two terminals according to the cell balance signal which is output from the control terminal of the battery state monitoring circuit which corresponds to the each of the plurality of batteries;
a first external terminal;
a second external terminal;
a charging n-channel type transistor;
a discharging n-channel type transistor;
a first bias resistive element having one end connected to a gate terminal of the charging n-channel type transistor, and another end connected to a source terminal of the charging n-channel type transistor; and
a second bias resistive element having one end connected to a gate terminal of the discharging n-channel type transistor, and another end connected to a source terminal of the discharging n-channel type transistor,
wherein the battery state monitoring circuit has the first voltage monitoring terminal connected to a positive terminal of a corresponding battery, the second voltage monitoring terminal connected to a negative terminal of the corresponding battery, the first transmitting terminal connected to the first receiving terminal of one adjacent battery state monitoring circuit through a resistive element, the second transmitting terminal connected to the second receiving terminal of the one adjacent battery state monitoring circuit through a resistive element, the first receiving terminal connected to the first transmitting terminal of another adjacent battery state monitoring circuit through a resistive element, and the second receiving terminal connected to the second transmitting terminal of the another adjacent battery state monitoring circuit through a resistive element,
wherein a battery at one end of the batteries connected in series has a positive terminal connected to the first external terminal,
wherein the battery state monitoring circuit corresponding to the battery at the one end has the first receiving terminal and the second receiving terminal connected to the positive terminal of the battery at the one end,
wherein the battery state monitoring circuit corresponding to a battery at another end of the batteries connected in series has the first transmitting terminal connected to the gate terminal of the charging n-channel type transistor, and the second transmitting terminal connected to the gate terminal of the discharging n-channel type transistor, and wherein the discharging n-channel type transistor has the source terminal connected to a negative terminal of the battery at the another end, and a drain terminal connected to a drain terminal of the charging n-channel type transistor, and the charging n-channel type transistor has the source terminal connected to the second external terminal.

13. A battery state monitoring circuit according to claim 1, comprising an overdischarge cell balance circuit which outputs a cell balance signal to the control terminal upon receiving the overdischarge signal received through the second receiving terminal, and stops the cell balance signal upon receiving the overdischarge detection signal from the overdischarge detector circuit.

14. A battery state monitoring circuit according to claim 2, comprising:
an overdischarge cell balance circuit including:
a first NOT circuit having an input terminal connected to an output terminal of the overdischarge detector circuit; and
a first AND circuit which receives an input signal of the second receiving terminal and an output signal of the first NOT circuit as inputs, and outputs an AND signal of those signals; and
a first OR circuit which receives an output signal of the overdischarge cell balance circuit and an output signal of the cell balance circuit as inputs, and outputs an OR signal of those signals.

15. A battery state monitoring circuit according to claim 3, comprising:
an overdischarge cell balance circuit including:
a third NOT circuit having an input terminal connected to an output terminal of the overdischarge detector circuit; and
a first AND circuit which receives an output signal of the second NOT circuit and an output signal of the third NOT circuit as inputs, and outputs an AND signal of those signals; and
a third OR circuit which receives an output signal of the overdischarge cell balance circuit and an output signal of the cell balance circuit as inputs, and outputs an OR signal of those signals.

16. A battery state monitoring circuit according to claim 4, comprising:
an overdischarge cell balance circuit including:
a first NOT circuit having an input terminal connected to an output terminal of the overdischarge detector circuit; and
a first AND circuit which receives an input signal of the second receiving terminal and an output signal of the first NOT circuit as inputs, and outputs an AND signal of those signals; and
a first OR circuit which receives an output signal of the overdischarge cell balance circuit and an output signal of the cell balance circuit as inputs, and outputs an OR signal of those signals.

17. A battery state monitoring circuit according to claim 5, comprising:
an overdischarge cell balance circuit including:
a third NOT circuit having an input terminal connected to an output terminal of the overdischarge detector circuit; and
a first AND circuit which receives the output signal of the second NOT circuit and an output signal of the third NOT circuit as inputs, and outputs an AND signal of those signals; and
a third OR circuit which receives the output signal of the overdischarge cell balance circuit and the output signal of the cell balance circuit as inputs, and outputs an OR signal of those signals.

18. A battery device, comprising:
a plurality of batteries connected in series;
the battery state monitoring circuit according to claim 13, which is disposed in correspondence with each of the plurality of batteries;
a cell balance switch circuit which is connected in parallel with the each of the plurality of batteries, and switches between connection and disconnection of two terminals according to the cell balance signal which is output from the control terminal of the battery state monitoring circuit corresponding to the each of the batteries;
a charging switch circuit which switches between permission and prohibition of charging the plurality of batteries; and
a discharging switch circuit which switches between permission and prohibition of discharging the plurality of batteries,
wherein the battery state monitoring circuit has the first voltage monitoring terminal connected to a positive terminal of a corresponding battery, the second voltage monitoring terminal connected to a negative terminal of the corresponding battery, the first transmitting terminal connected to the first receiving terminal of one adjacent battery state monitoring circuit, the second transmitting terminal connected to the second receiving terminal of the one adjacent battery state monitoring circuit, the first receiving terminal connected to the first transmitting terminal of another adjacent battery state monitoring circuit, and the second receiving terminal connected to the second transmitting terminal of the another adjacent battery state monitoring circuit,
wherein the charging switch circuit switches between permission and prohibition of charging based on the overcharge signal transmitted from the first transmitting terminal of the battery state monitoring circuit corresponding to a battery at one end among the batteries connected in series, and
wherein the discharging switch circuit switches between permission and prohibition of discharging based on the overdischarge signal transmitted from the second transmitting terminal of the battery state monitoring circuit corresponding to the battery at the one end.

19. A battery device, comprising:
a plurality of batteries connected in series;
the battery state monitoring circuit according to claim 14, which is disposed in correspondence with each of the plurality of batteries;
a cell balance switch circuit which is connected in parallel with the each of the plurality of batteries, and switches between connection and disconnection of two terminals according to the cell balance signal output from the control terminal of the battery state monitoring circuit corresponding to the each of the plurality of batteries;
a first external terminal;
a second external terminal;
a charging p-channel type transistor;
a discharging p-channel type transistor;
a first bias resistive element having one end connected to a gate terminal of the charging p-channel type transistor, and another end connected to a source terminal of the charging p-channel type transistor; and a second bias resistive element having one end connected to a gate terminal of the discharging p-channel type transistor, and another end connected to a source terminal of the discharging p-channel type transistor, wherein the battery state monitoring circuit has the first voltage monitoring terminal connected to a positive terminal of a corresponding battery, the second voltage monitoring terminal connected to a negative terminal of the corresponding battery, the first transmitting terminal connected to the first receiving terminal of one adjacent battery state monitoring circuit, the second transmitting terminal connected to the second receiving terminal of the one adjacent battery state monitoring circuit, the first receiving terminal connected to the first transmitting terminal of another adjacent battery state monitoring circuit, and the second receiving terminal connected to the second transmitting terminal of the another adjacent battery state monitoring circuit, wherein the battery state monitoring circuit corresponding to a battery at one end of the plurality of batteries connected in series has the first transmitting terminal connected to the gate terminal of the charging p-channel type transistor, and the second transmitting terminal connected to the gate terminal of the discharging p-channel type transistor, wherein the discharging p-channel type transistor has the source terminal connected to a positive terminal of the battery at the one end, and a drain terminal connected to a drain terminal of the charging p-channel type transistor, and the charging p-channel type transistor has the source terminal connected to the first external terminal, wherein a battery at another end of the plurality of batteries connected in series has a negative terminal connected to the second external terminal, and wherein the battery state monitoring circuit corresponding to the battery at the another end has the first receiving terminal and the second receiving terminal connected to the negative terminal of the battery at the another end.

20. A battery device, comprising:
a plurality of batteries connected in series;
the battery state monitoring circuit according to claim 15, which is disposed in correspondence with each of the plurality of batteries;
a cell balance switch circuit which is connected in parallel with the each of the plurality of batteries, and switches between connection and disconnection of two terminals according to the cell balance signal output from the control terminal of the battery state monitoring circuit corresponding to the each of the plurality of batteries;
a first external terminal;
a second external terminal;
a charging n-channel type transistor;
a discharging n-channel type transistor;
a first bias resistive element having one end connected to a gate terminal of the charging n-channel type transistor, and another end connected to a source terminal of the charging n-channel type transistor; and
a second bias resistive element having one end connected to a gate terminal of the discharging n-channel type transistor, and another end connected to a source terminal of the discharging n-channel type transistor,
wherein the battery state monitoring circuit has the first voltage monitoring terminal connected to a positive terminal of a corresponding battery, the second voltage monitoring terminal connected to a negative terminal of the corresponding battery, the first transmitting terminal connected to the first receiving terminal of one adjacent battery state monitoring circuit, the second transmitting terminal connected to the second receiving terminal of the one adjacent battery state monitoring circuit, the first receiving terminal connected to the first transmitting terminal of another adjacent battery state monitoring circuit, and the second receiving terminal connected to the second transmitting terminal of the another adjacent battery state monitoring circuit, wherein a battery at one end of the plurality of batteries connected in series has a positive terminal connected to the first external terminal, wherein the battery state monitoring circuit corresponding to the battery at the one end has the first receiving terminal and the second receiving terminal connected to the positive terminal of the battery at the one end, wherein the battery state monitoring circuit corresponding to a battery at another end of the plurality of batteries connected in series has the first transmitting terminal connected to the gate terminal of the charging n-channel type transistor, and the second transmitting terminal connected to the gate terminal of the discharging n-channel type transistor, and wherein the discharging n-channel type transistor has the source terminal connected to a negative terminal of the battery at the another end, and a drain terminal connected to a drain terminal of the charging n-channel type transistor, and the charging n-channel type transistor has the source terminal connected to the second external terminal.

21. A battery device, comprising:
a plurality of batteries connected in series;
the battery state monitoring circuit according to claim 16, which is disposed in correspondence with each of the plurality of batteries;
a cell balance switch circuit which is connected in parallel with the each of the plurality of batteries, and switches between connection and disconnection of two terminals according to the cell balance signal which is output from the control terminal of the battery state monitoring circuit which corresponds to the each of the plurality of batteries;
a first external terminal;
a second external terminal;
a charging p-channel type transistor;
a discharging p-channel type transistor;
a first bias resistive element having one end connected to a gate terminal of the charging p-channel type transistor, and another end connected to a source terminal of the charging p-channel type transistor; and
a second bias resistive element having one end connected to a gate terminal of the discharging p-channel type transistor, and another end connected to a source terminal of the discharging p-channel type transistor,
wherein the battery state monitoring circuit has the first voltage monitoring terminal connected to a positive terminal of a corresponding battery, the second voltage monitoring terminal connected to a negative terminal of the corresponding battery, the first transmitting terminal connected to the first receiving terminal of one adjacent battery state monitoring circuit through a resistive element, the second transmitting terminal connected to the second receiving terminal of the one adjacent battery state monitoring circuit through a resistive element, the first receiving terminal connected to the first transmitting terminal of another adjacent battery state monitoring circuit through a resistive element, and the second receiving terminal connected to the second transmitting terminal of the another adjacent battery state monitoring circuit through a resistive element, wherein the battery state monitoring circuit corresponding to a battery at one end of the plurality of batteries connected in series has the first transmitting terminal connected to the gate terminal of the charging p-channel type transistor, and the second transmitting terminal connected to the gate terminal of the discharging p-channel type transistor, wherein the discharging p-channel type transistor has the source terminal connected to a positive terminal of the battery at the one end, and a drain terminal connected to a drain terminal of the charging p-channel type transistor, the charging p-channel type transistor has the source terminal connected to the first external terminal, wherein a battery at another end of the plurality of batteries connected in series has a negative terminal connected to the second external terminal, and wherein the battery state monitoring circuit corresponding to the battery at the another end has the first receiving terminal and the second receiving terminal connected to the negative terminal of the battery at the another end.

22. A battery device, comprising:

a plurality of batteries connected in series;

the battery state monitoring circuit according to claim 17, which is disposed in correspondence with each of the plurality of batteries;

a cell balance switch circuit which is connected in parallel with the each of the plurality of batteries, and switches between connection and disconnection of two terminals according to the cell balance signal which is output from the control terminal of the battery state monitoring circuit which corresponds to the each of the plurality of batteries;

a first external terminal;

a second external terminal;

a charging n-channel type transistor;

a discharging n-channel type transistor;

a first bias resistive element having one end connected to a gate terminal of the charging n-channel type transistor, and another end connected to a source terminal of the charging n-channel type transistor; and a second bias resistive element having one end connected to a gate terminal of the discharging n-channel type transistor, and another end connected to a source terminal of the discharging n-channel type transistor, wherein the battery state monitoring circuit has the first voltage monitoring terminal connected to a positive terminal of a corresponding battery, the second voltage monitoring terminal connected to a negative terminal of the corresponding battery, the first transmitting terminal connected to the first receiving terminal of one adjacent battery state monitoring circuit through a resistive element, the second transmitting terminal connected to the second receiving terminal of the one adjacent battery state monitoring circuit through a resistive element, the first receiving terminal connected to the first transmitting terminal of another adjacent battery state monitoring circuit through a resistive element, and the second receiving terminal connected to the second transmitting terminal of the another adjacent battery state monitoring circuit through a resistive element, wherein a battery at one end of the plurality of batteries connected in series has a positive terminal connected to the first external terminal, wherein the battery state monitoring circuit corresponding to the battery at the one end has the first receiving terminal and the second receiving terminal connected to the positive terminal of the battery at the one end, wherein the battery state monitoring circuit corresponding to a battery at another end of the plurality of batteries connected in series has the first transmitting terminal connected to the gate terminal of the charging n-channel type transistor, and the second transmitting terminal connected to the gate terminal of the discharging n-channel type transistor, and wherein the discharging n-channel type transistor has the source terminal connected to a negative terminal of the battery at the another end, and a drain terminal connected to a drain terminal of the charging n-channel type transistor, and the charging n-channel type transistor has the source terminal connected to the second external terminal.

23. A battery device, comprising:

a plurality of batteries connected in series;

the battery state monitoring circuit according to claim 1, which is disposed in correspondence with each of the plurality of batteries;

a cell balance switch circuit which is connected in parallel with the each of the plurality of batteries, and switches between connection and disconnection of two terminals according to the cell balance signal output from the control terminal of the battery state monitoring circuit corresponding to the each of the batteries;

a first external terminal;

a second external terminal;

a charging n-channel type transistor;

a discharging n-channel type transistor;

a first bias resistive element having one end connected to a gate terminal of the charging n-channel type transistor, and another end connected to a source terminal of the charging n-channel type transistor;

a second bias resistive element having one end connected to a gate terminal of the discharging n-channel type transistor, and another end connected to a source terminal of the discharging n-channel type transistor;

a charging control switch circuit; and a discharging control switch circuit, wherein the battery state monitoring circuit has the first voltage monitoring terminal connected to a positive terminal of a corresponding battery, the second voltage monitoring terminal connected to a negative terminal of the corresponding battery, the first transmitting terminal connected directly or through a resistive element to the first receiving terminal of one adjacent battery state monitoring circuit, the second transmitting terminal connected directly or through a resistive element to the second receiving terminal of the one adjacent battery state monitoring circuit, the first receiving terminal connected directly or through a resistive element to the first transmitting terminal of another adjacent battery state monitoring circuit, and the second receiving terminal connected directly or through a resistive element to the second transmitting terminal of the another adjacent battery state monitoring circuit, wherein the charging control switch circuit is connected between the first external terminal and the gate terminal of the charging n-channel type transistor, and a control terminal of the charging control switch circuit is connected to the first transmitting terminal of the battery state monitoring circuit corresponding to a battery at one end among the batteries connected in series, wherein the discharging control switch circuit is connected between the first external terminal and the gate terminal of the discharging n-channel type transistor, and a control terminal of the discharging control switch circuit is connected to the second transmitting terminal of the battery state monitoring circuit corresponding to the battery at the one end among the batteries connected in series, wherein the first external terminal is connected to a positive terminal of the battery at the one end;

wherein the discharging n-channel type transistor has the source terminal connected to a negative terminal of a battery at another end among the batteries connected in series, a drain terminal connected to a drain terminal of the charging n-channel type transistor, and the charging n-channel type transistor has the source terminal connected to the second external terminal, and wherein the first receiving terminal and the second receiving terminal of the battery state monitoring circuit corresponding to the battery at the another end are connected to the negative terminal of the battery at the another end.

24. A battery device, comprising:
a plurality of batteries connected in series;
the battery state monitoring circuit according to claim 1, which is disposed in correspondence with each of the plurality of batteries;
a cell balance switch circuit which is connected in parallel with the each of the plurality of batteries, and switches between connection and disconnection of two terminals according to the cell balance signal output from the control terminal of the battery state monitoring circuit corresponding to each of the batteries;
a first external terminal;
a second external terminal;
a charging p-channel type transistor;
a discharging p-channel type transistor;
a first bias resistive element having one end connected to a gate terminal of the charging p-channel type transistor, and another end connected to a source terminal of the charging p-channel type transistor;
a second bias resistive element having one end connected to a gate terminal of the discharging p-channel type transistor, and another end connected to a source terminal of the discharging p-channel type transistor;
a charging control switch circuit; and
a discharging control switch circuit, wherein the battery state monitoring circuit has the first voltage monitoring terminal connected to a positive terminal of a corresponding battery, the second voltage monitoring terminal connected to a negative terminal of the corresponding battery, the first transmitting terminal connected directly or through a resistive element to the first receiving terminal of one adjacent battery state monitoring circuit, the second transmitting terminal connected directly or through a resistive element to the second receiving terminal of the one adjacent battery state monitoring circuit, the first receiving terminal connected directly or through a resistive element to the first transmitting terminal of another adjacent battery state monitoring circuit, and the second receiving terminal connected directly or through a resistive element to the second transmitting terminal of the another adjacent battery state monitoring circuit, wherein the charging control switch circuit is connected between the second external terminal and the gate terminal of the charging p-channel type transistor, and a control terminal of the charging control switch circuit is connected to the first transmitting terminal of the battery state monitoring circuit corresponding to a battery at one end among the batteries connected in series, wherein the discharging control switch circuit is connected between the second external terminal and the gate terminal of the discharging p-channel type transistor, and a control terminal of the discharging control switch circuit is connected to the second transmitting terminal of the battery state monitoring circuit corresponding to the battery at the one end among the batteries connected in series, wherein the second external terminal is connected to a negative terminal of the battery at the one end;

wherein the discharging p-channel type transistor has the source terminal connected to a positive terminal of a battery at another end among the batteries connected in series, a drain terminal connected to a drain terminal of the charging p-channel type transistor, and the charging n-channel type transistor has the source terminal connected to the first external terminal, and wherein the first receiving terminal and the second receiving terminal of the battery state monitoring circuit corresponding to the battery at the another end are connected to the positive terminal of the battery at the another end.

25. A battery device according to claim 23, further comprising a cell balance control switch circuit which monitors a voltage of the second external terminal, and transmits an overdischarge signal to the second receiving terminal of the battery state monitoring circuit corresponding to the battery at the another end upon detecting which discharge is prohibited.

26. A battery device according to claim 24, further comprising a cell balance control switch circuit which monitors a voltage of the first external terminal, and transmits an overdischarge signal to the second receiving terminal of the battery state monitoring circuit corresponding to the battery at the another end upon detecting which discharge is prohibited.

* * * * *